US009441112B2

(12) United States Patent
Sun et al.

(10) Patent No.: US 9,441,112 B2
(45) Date of Patent: Sep. 13, 2016

(54) PRESSURE SENSITIVE ADHESIVES, COATINGS, AND FILMS FROM PLANT OILS

(75) Inventors: Xiuzhi Susan Sun, Manhattan, KS (US); Byungjun Kollbe Ahn, Davis, CA (US); Donghai Wang, Manhattan, KS (US)

(73) Assignee: KANSAS STATE UNIVERSITY RESEARCH FOUNDATION, Manhattan, KS (US)

(*) Notice: Subject to any disclaimer, the term of this patent is extended or adjusted under 35 U.S.C. 154(b) by 0 days.

(21) Appl. No.: 13/980,830

(22) PCT Filed: Jan. 20, 2012

(86) PCT No.: PCT/US2012/022044
§ 371 (c)(1),
(2), (4) Date: Aug. 22, 2013

(87) PCT Pub. No.: WO2012/100171
PCT Pub. Date: Jul. 26, 2012

(65) Prior Publication Data
US 2013/0330549 A1    Dec. 12, 2013

Related U.S. Application Data

(60) Provisional application No. 61/434,765, filed on Jan. 20, 2011.

(51) Int. Cl.
*C08L 91/02* (2006.01)
*C09D 191/00* (2006.01)
(Continued)

(52) U.S. Cl.
CPC ............ *C08L 91/02* (2013.01); *C08L 91/00* (2013.01); *C08L 93/04* (2013.01); *C09D 191/00* (2013.01);
(Continued)

(58) Field of Classification Search
CPC ...... C08L 91/02; C08L 93/04; C09D 191/02; C09D 193/04; C09J 191/02; C09J 193/04; C09J 7/0207; C09J 2201/606; C09J 2491/00; C09J 2493/00
See application file for complete search history.

(56) References Cited

U.S. PATENT DOCUMENTS 2,392,639 A * 1/1946 Brinker et al. .......... 106/169.19
3,035,069 A * 5/1962 Findley et al. ............... 554/149
(Continued)

FOREIGN PATENT DOCUMENTS

WO      2007140102       12/2007
WO   WO 2011023255 A1 * 3/2011

OTHER PUBLICATIONS

Ahn, B.—"Design and Preparation of Plant Oil-Based Polymers and their Applications, Abstract of Dissertation" Kansas State University (2011).*

(Continued)

*Primary Examiner* — Scott R Walshon
(74) *Attorney, Agent, or Firm* — Hovey Williams LLP

(57) ABSTRACT

Compositions useful for preparing pressure sensitive adhesives, coatings, and/or films are provided, along with methods of making and using the same. The compositions are made from renewable, plant-based materials. The compositions comprise plant oil triglycerides that are polymerized and crosslinked to yield polymer matrices. Plant-based carriers and/or tackifiers can be used in the invention, including epoxidized plant oil triglycerides, acrylated epoxidized plant oil triglycerides, and dihydroxylated plant oil triglycerides. Natural tackifiers such as rosin esters and terpenes can also be used in the compositions. Dihydroxylated plant oil triglyceride tackifiers for use in biobased and synthetic adhesives are also provided.

12 Claims, 34 Drawing Sheets

(51) Int. Cl.
*C09J 191/00* (2006.01)
*C08L 91/00* (2006.01)
*C09D 193/04* (2006.01)
*C09J 193/04* (2006.01)
*C08L 93/04* (2006.01)
*C09J 7/02* (2006.01)
*C08K 5/103* (2006.01)
*C08K 5/1515* (2006.01)

(52) U.S. Cl.
CPC .......... C09D 193/04 (2013.01); C09J 7/0207 (2013.01); C09J 191/00 (2013.01); C09J 193/04 (2013.01); C08K 5/103 (2013.01); C08K 5/1515 (2013.01); Y10T 428/2865 (2015.01); Y10T 428/31844 (2015.04)

(56) References Cited

U.S. PATENT DOCUMENTS

| | | | |
|---|---|---|---|
| 6,646,033 B2 | 11/2003 | Wool et al. | |
| 6,890,982 B2* | 5/2005 | Borsinger | C09J 23/0853 524/272 |
| 8,796,351 B2* | 8/2014 | Koch | 522/183 |
| 2003/0092829 A1* | 5/2003 | Klauck et al. | 524/555 |
| 2008/0058448 A1 | 3/2008 | Flanigan et al. | |
| 2009/0275715 A1* | 11/2009 | Boyles et al. | 526/208 |
| 2010/0261806 A1 | 10/2010 | Koch | |
| 2012/0059087 A1 | 3/2012 | Koch et al. | |
| 2012/0156484 A1* | 6/2012 | Vendamme et al. | 428/355 R |
| 2013/0078464 A1* | 3/2013 | Li | C09J 7/0207 428/355 EP |

OTHER PUBLICATIONS

Ogunniyi, D.S. —"Castor Oil: A Vital Industrial Raw Material", Bioresource Technology vol. 97, pp. 1086-1091 (2006).*

The International Search Report and Written Opinion dated Aug. 30, 2013 in related PCT/US2012/022044 application.

Henna, Phillip; "Biobased Thermosets from the Free-Radical Copolymerization of Conjugated Linseed Oil," Journal of Applied Polymer Science, vol. 104, 979-985 (2007).

Bunker, Shana P. "Synthesis and Characterization of Monomers and Polymers for Adhesive from Methyl Oleate," Journal of Polymeric Science: Polymer Chemistry, vol. 40, 451-458 (2002).

David, S.Begila "Studies on Acrylated Epoxydised Triglyceride Resin-Co-Butyl Methacrylate towards the Development of Biodegradable Pressure Sensitive Adhesives," Journal Mater Sci: Master Med, Jun. 27, 2008.

Wool, Richard P. "Polymer-Solid Interface Connectivity and Adhesion: Design of a Bio-Based Pressure Sensitive Adhesive," www.che.udel.edu/pdf/woolpaper.pdf, Feb. 2007.

* cited by examiner

PRESSURE SENSITIVE ADHESIVES, COATINGS, AND FILMS FROM PLANT OILS

CROSS-REFERENCE TO RELATED APPLICATIONS

The present application is the National Stage of International Application No. PCT/US2012/022044, filed Jan. 20, 2012, which claims the priority benefit of U.S. Provisional Patent Application Ser. No. 61/434,765, filed Jan. 20, 2011, entitled THERMALLY STABLE TRANSPARENT PRESSURE SENSITIVE ADHESIVES FROM PLANT OILS, each of which is incorporated by reference in its entirety herein.

BACKGROUND OF THE INVENTION

1. Field of the Invention

The present invention relates to pressure sensitive adhesives, coatings, and films formulated from plant-based materials.

2. Description of Related Art

Pressure sensitive adhesives (PSAs) are defined as adhesives having tacky or sticky functional groups that do not cure or dry under ambient conditions. They can be adhered to other surfaces using only light pressure, and do not require any light, heat, or water to activate the adhesive nature of the composition. PSAs are usually based on an elastomer (carrier) compounded with a suitable tackifier. Some PSAs are repositionable. In other words, they form only a temporary bond and can be removed and re-adhered without leaving behind a residue. Some PSAs are designed for repeated use and do not substantially lose their initial tackiness or adhesion capability even when stuck and unstuck from various surfaces. The ubiquitous Post-it® note is an example of a product using a PSA. PSAs find many uses, including surface protection films, masking tapes, bookmark and note papers, price marking labels, promotional graphics materials, as well as for biomedical applications (e.g., wound care dressings, electrodes, athletic tape, drug patches, etc.). PSA compositions can also be used to form transparent films and coatings. Commercially-available PSAs are commonly made from mainly petroleum-based or synthetic materials. A decrease in fossil resources has urged the development of sustainable materials using renewable feedstocks, including plant-based materials.

Flexible materials are also of great interest in research and development of advanced electronic devices, including flexible solar cells, semiconductors, and displays. Current PSAs have limited application for electronic devices. For example, acrylate and rubber-based PSAs have very low thermal stability including a low glass transition temperature, high melting point, and a large coefficient of thermal expansion. Also silicone-based PSAs avoid these drawbacks, they are typically too expensive in comparison. They are also not made of bio-based materials.

Sustainable materials are of great interest as a replacement for non-renewable fossil resources. Plant oils, including a broad range of oleo-chemicals from plant oils such as methyl oleates and glycerols, are a ready-to-use feedstock and are generally used as additives in coating, paint, lubricant and plastic industries. However, existing attempts to create bio-based PSAs do not yield a satisfactory product. For examples, many bio-based PSAs have long curing times, making them unsuitable for actual commercial use. Other bio-based PSAs only incorporate a small amount of plant-based materials and still rely on petroleum-based materials for the bulk of their compositions. Still further bio-based PSAs have inferior properties, including poor shear strength, tack, and/or peel strength. They also have poor shelf-life, again, limiting their use in an actual commercial setting. Thus, there remains a need in the art for improved PSAs, films, and coatings that use sustainable materials, but achieve properties comparable to existing commercial PSAs, films, and coatings formulated with synthetic ingredients.

SUMMARY OF THE INVENTION

The present invention is broadly concerned with plant-based compositions and methods for pressure sensitive adhesives, coatings, and/or films that overcome the problems of previous biobased adhesives, coatings, and/or films. In one aspect, a composition useful as a pressure sensitive adhesive, coating, and/or film is provided. The composition comprises a polymer matrix comprising plant oil triglyceride polymers, wherein the composition comprises greater than about 50% by weight plant-based materials, based upon the total solids in the composition taken as 100% by weight.

In another aspect, the invention is concerned with a further composition useful for forming a pressure sensitive adhesive, coating, and/or film. The composition comprises a carrier and a tackifier, wherein at least one of the carrier or tackifier is a plant oil triglyceride. Advantageously, the composition comprises greater than about 50% by weight plant-based materials, based upon the total solids in the composition taken as 100% by weight.

The combination of a substrate having a surface, and a layer of an adhesive, coating, or film adjacent the substrate surface. The layer is formed from an adhesive, coating, and/or film composition according to one or more of the embodiments described herein.

A method of forming a composition useful as a pressure sensitive adhesive, coating, or film is also provided. The method comprises providing a composition comprising a carrier, a tackifier, and optional catalyst, applying the composition to a substrate, and curing the composition to form said pressure sensitive adhesive, coating, or film. Advantageously, at least one of the carrier or tackifier is a plant oil triglyceride, and the composition comprises at least about 50% by weight plant-based materials, based upon the total solids in the composition taken as 100% by weight.

The invention in one or more aspects is also concerned with the use of dihydroxylated plant oil triglyceride as a tackifier for a pressure sensitive adhesive composition, as well as pressure sensitive adhesives comprising a carrier and a tackifier, wherein the tackifier is a dihydroxylated plant oil triglyceride.

The invention is also concerned with a method of forming a pressure sensitive adhesive. The method comprises providing an epoxidized plant oil triglyceride and converting a portion of said epoxidized plant oil triglyceride to dihydroxylated plant oil triglyceride to yield a mixture of epoxidized plant oil triglycerides and dihydroxylated plant oil triglycerides. An acid catalyst is added to the mixture to yield a precursor composition. The precursor composition is applied to a substrate, and cured to yield a crosslinked polymer matrix comprising the epoxidized plant oil triglyceride copolymerized with the dihydroxylated plant oil triglyceride.

A pressure sensitive adhesive composition comprising UV-polymerized, acrylated epoxidized plant oil triglycerides is also provided. The composition is substantially free of any tackifiers, and comprises greater than about 95% by weight of the acrylated epoxidized plant oil triglycerides, based upon the total weight of the composition taken as 100% by weight.

A method of forming a pressure sensitive adhesive is also provided. The method comprises providing a composition comprising an acrylated epoxidized plant oil triglyceride and optional photoinitiator, applying the composition to a substrate surface; and exposing the composition to activating radiation to yield a crosslinked polymer matrix comprising the acrylated epoxidized plant oil triglyceride. The composition comprises greater than about 95% by weight of the acrylated epoxidized plant oil triglyceride, based upon the total weight of said composition taken as 100% by weight.

The invention is also concerned with methods of using the pressure sensitive adhesives, coatings, and/or films described herein, for example in flexible electronic devices (e.g., solar cell, semiconductor, organic light-emitting diode and display), reusable tapes, sticky notes, medical and pharmaceutical devices (e.g., electrodes, skin wound care, medical tapes, band-aids, etc.), and screen protectors for electronic displays (e.g., computers, tablets, phones, televisions, etc.). The pressure sensitive adhesives in one or more embodiments are repositionable and can be repeatedly re-adhered without losing their initial tackiness.

BRIEF DESCRIPTION OF THE DRAWINGS

FIG. 10a is a schematic for the reaction of epoxide 5 with an excess of i-propanol in 10 wt. % of $H_3PO_4$ in Example 39;

FIGS. 10b-10c show the results of NMR analysis of the reaction in FIG. 10a;

FIG. 11a is a $^1$H NMR spectroscopy graph of the reaction in FIG. 10a;

FIG. 11b is a silent $^{31}$P NMR spectrum of the alcoholysis products 9a-b from FIG. 10a;

FIG. 14a shows a reaction scheme for the formation of a PSA copolymeric matrix from ESO and DSO in Example 40;

FIG. 14b shows NMR spectra confirming the chemistry of the proposed reaction scheme in FIG. 14a;

FIG. 24c shows graphs of the typical JKR data for AESO PSA self-adhesion. (a) a3 vs P and (b) G vs P for AESO PSA sample 7;

FIG. 24d shows graphs of typical JKR data for adhesion between PDMS and AESO PSA sample 9 (a) a3 vs P and (b) G vs P;

DETAILED DESCRIPTION

Figure 1:
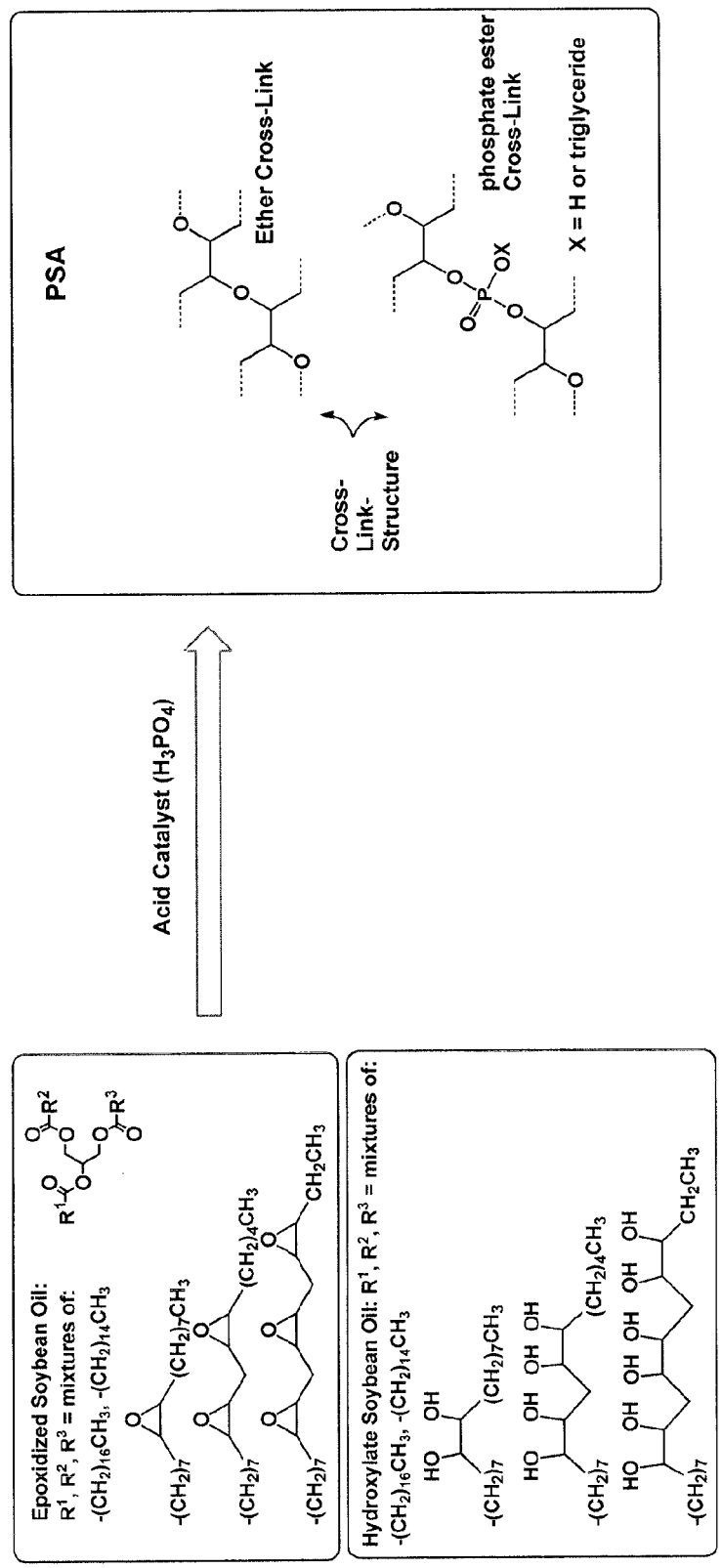
FIG. 1 is a schematic reaction of the preparation of PSAs from functionalized plant oil triglycerides in Example 37.

The present invention is concerned with biobased pressure sensitive adhesive compositions from inexpensive, sustainable, environmentally-friendly resources. The inventive compositions can also be used to prepare coatings or films suitable for a variety of uses described herein. The inventive compositions generally comprise a carrier and a tackifier, wherein at least one of the carrier and/or tackifier is a plant-based material. As used herein, the term "plant-based" material, refers to ingredients that are derived from plants, whether through chemical or biological processes, including the functionalized plant oil triglycerides described herein. In some embodiments, both the carrier and the tackifier are each a plant-based material. In other words, the compositions are preferably substantially free of non-plant-based materials, including petroleum-based compounds or synthetic polymers and/or elastomers, such as petrol-based acrylates, acrylics, silicones, synthetic rubbers (e.g., isoprenes, isobutylenes, ethylene propylene diene monomer, urethanes, butadienes), polypropylenes, and the like. In one or more embodiments, the compositions comprise greater than 50% by weight plant-based materials, preferably greater than about 75% by weight plant-based materials, and even more preferably greater than about 90% by weight plant-based materials, based upon the total weight of the solids in the composition taken as 100% by weight. In other embodiments, the compositions comprise greater than about 95% by weight plant-based materials, preferably greater than about 97% by weight plant-based materials, and even more preferably greater than about 99% plant-based materials, based upon the total weight of solids in the composition taken as 100% by weight. The carrier and tackifier can each be from the same or a different type of plant oil. In some embodiments, the tackifier can be derived from the carrier in a one-pot synthesis procedure described herein. In another embodiments a plant-based carrier can be used with a non-plant-based tackifier, or a non-plant-based carrier can be used with a plant-based tackier.

Regardless of the embodiment, suitable plant-based materials for use in the invention include functionalized plant oil triglycerides. That is, the plant-based materials preferably have not been broken down into linear components prior to use in the invention, and thus the glycerol moiety is still present in precursor and cured compositions of the invention. Exemplary plant oils for use in the invention include soybean, canola, camelina, corn, sunflower, peanut, and the like. Functionalized plant oils particularly preferred for use as a plant-based carrier include epoxidized plant oil (EPO) triglycerides and acrylated epoxidized plant oil (AEPO) triglycerides. EPO triglycerides are commercially available, and can also be prepared using conventional techniques, including those described in the working examples below. For plant-based tackifiers, functionalized plant oil triglycerides can be prepared by opening the double bonds of the fatty acids of the plant oil triglycerides, and grafting functional (sticky) groups (e.g., —OH, —NH$_2$, —COOH, —POOH, —SOOH) onto those opened double bonds. A particularly preferred plant-based tackifier for use in the invention is dihydroxylated plant oil (DPO). Rosin esters and terpenes, are another category of plant-based tackifiers that can be used in the invention. Such tackifiers are commercially available (e.g., Foral 85, Sylvalite RE 80HP, DERCOLYTE LTG, and DERCOLYTE TS 105). Mixtures of tackifiers may also be used in the inventive compositions. Synthetic and/or petroleum-based carriers or tackifiers may also be used in conjunction with the plant-based materials described herein in some embodiments of the invention.

In one or more embodiments, a composition suitable for use as a PSA, coating, or film, can be prepared by mixing a carrier and tackifier together to form a precursor composition. Additional ingredients that can be present in the composition, depending upon the embodiment, include catalysts, initiators, solvent systems, preservatives, thickeners, and plasticizers. It will be appreciated that the ratio of carrier to tackifier in the composition will vary widely depending on functional groups of the tackifier and/or carrier, the specific plant oils used, application specifications, substrate surface properties, etc. The ratio of functionalized soybean oil (ESO) carrier to functionalized soybean oil tackifier (DSO) will typically range from about 1:0.1 to about 1:1, more preferably from about 1:0.5 to about 1:1.5, and even more preferably from about 1:1.

In one aspect, the precursor composition can be prepared by mixing a carrier and a tackifier in a solvent system. The combined amount of carrier and tackifier present in the composition will typically range from about 20% to about 80% by weight, more preferably from about 30% to about 70% by weight, and even more preferably from about 40% to about 60% by weight, based upon the total weight of the precursor composition taken as 100% by weight. Suitable solvent systems will include a solvent selected from the group consisting of water, alcohols, methyl acetate, tetrahydrofuran, methanechloride, and mixtures thereof. When present, the solvent system will typically be used at a level of from about 20% to about 80% by weight, more preferably from about 30% to about 70% by weight, and even more preferably from about 40% to about 60% by weight, based upon the total weight of the precursor composition taken as 100% by weight.

An acid catalyst can be added to the composition to initiate copolymerization of the carrier and tackifier and yield a crosslinked (co)polymer matrix. Advantageously, formation of the PSA preferably occurs much more quickly than existing biobased PSAs. Specifically, in situ polymerization and crosslinking occurs within about 1 second to about 10 minutes after addition after addition of the acid catalyst. The amount of catalyst will typically be from about 1% to about 20% by weight, more preferably from about 3% to about 10% by weight, and even more preferably from about 4% to about 7% by weight, based upon the total weight of the precursor composition taken as 100% by weight. Suitable acid catalysts include all Brønsted Acids, and Lewis Acids, such as boron trifluoride, trifluoroacetic acid, phosphoric acid, perchloric acid, sulfuric acid, triflic acid, and the like. In some embodiments, the acid catalyst also functions as a crosslinking agent and participates in crosslinking. In other embodiments, the acid catalyst does not participate in crosslinking and does not function as a crosslinking agent. Regardless, in either embodiment, the composition is preferably substantially free of additional or any crosslinking agents. In other words, when an acid catalyst crosslinking agent present, it is preferably the only crosslinking agent present in the composition, and no additional crosslinking agents are present. Where the acid catalyst does not function as a crosslinking agent, the composition is substantially free of any crosslinking agents at all. Exemplary "added" crosslinking agents that are preferably excluded from the present compositions include aminoplasts/melamines, vinyl ethers, glycourils, multifunctional epoxies, anhydrides, silanes, peroxides, thiadiazoles, and the like.

A layer of the composition is then formed on a substrate surface, followed by evaporation of the solvent system. The composition layer can be formed by brushing, rolling, spin-coating, pouring, and/or spraying the composition onto the substrate surface. Suitable substrates include virtually any solid surface, such as glass, paper, plastic, metal, silicon wafers, electronic displays, marbles, coated woods, composites, and combinations thereof. The composition can be cured (dried) by subjecting the composition to ambient temperatures (~22° C.) for about 5 seconds to about 5 minutes, preferably from about 5 seconds to about 3 minutes, and even more preferably from about 1 minute to about 3 minutes. The coated substrate can also be heated to further facilitate evaporation and curing of the composition. Thus, the composition can be dried by subjecting the composition to a temperature of from about 22 to about 110° C. for about 5 minutes or less, preferably for about 3 minutes or less, and more preferably for about 1 minute or less to evaporate the solvents.

It will be appreciated that the thickness of the cured layer will depend upon the desired end-used of the composition. For PSAs, the layer preferably has an average thickness of from about 500 nm to about 0.5 mm, more preferably from about 500 nm to about 10 μm, and even more preferably from about 500 nm to about 1 μm. For coatings and films, the average thickness can range from about 500 nm to about 1 mm, and more preferably from about 500 nm to about 0.5 mm, and even more preferably from about 500 nm to about 10 μm. The "average thickness," as used herein, is the median thickness calculated after measuring the thickness of the cured layer in 5 different places. The cured layer preferably has a substantially uniform thickness across its surface area.

In one or more embodiments, the resulting (cured) composition or layer comprises crosslinked plant oil triglyceride polymers (or copolymers) having crosslinkages selected from the group consisting of esters, ethers, and combinations thereof. In preferred embodiments, the composition will consist essentially (or even consist) of the crosslinked plant oil triglyceride polymers (or copolymers). The crosslinked polymers will also include sticky group moieties (e.g., —OH, etc., described above) having a free end (i.e., pendant from the crosslinked matrix). When DPO is used as a tackifier, the crosslinked polymers will comprise pendant hydroxyl moieties. In a particularly preferred embodiment, the cured composition will comprise a crosslinked matrix comprising copolymers of EPO and DPO, having crosslinkages selected from the group consisting of esters (especially phosphate esters), ethers, and combinations thereof.

In a further aspect of the invention, the precursor composition can be prepared by mixing a carrier and a tackifier without a solvent system. That is, the composition, in some embodiments, is substantially free of any solvents, and more preferably is solvent-less (i.e., about 0% by weight added solvent, not inclusive of inherent moisture in the carrier, tackifier or other ingredients). The term "substantially free," as used herein means that the composition contains less than about 1% by weight, and preferably less than about 0.1% by weight of that particular ingredient, based upon the total weight of the composition taken as 100% by weight. A photoinitiator can optionally be added to the composition along with the carrier and tackifier. Suitable photoinitiators include low dose cationic photoinitiators, such as iodonium antimonate salts (e.g., PC-2506; Polyset company, Mechanicville, N.Y.), radical photoinitiators, such as alpha hydroxyketones (e.g., DAROCUR® 1173; BASF resins, Wyandotte, Mich.), and the like. When present, the composition preferably comprises from about 1% to about 10% by weight photoinitiator, more preferably from about 3% to about 7% by weight, and even more preferably from about 3% to about 5% by weight photoinitiator, based upon the total weight of the precursor composition taken as 100% by weight. However, in some embodiments, the composition is substantially free of any initiators or catalysts. Thus, depending upon whether or not a photoinitiator is present, the combined amount of carrier and tackifier present in the solvent-less composition will typically range from about 60% to about 100% by weight, more preferably from about 75% to about 100% by weight, and even more preferably from about 90% to about 99% by weight, based upon the total weight of the precursor composition taken as 100% by weight.

A layer of the solvent-less precursor composition is formed on a substrate surface. Suitable substrates include those described above. The layer can be applied to the surface by rolling, brushing, pouring, and/or spraying the composition onto the substrate surface. The coated substrate is then exposed to UV radiation to cure the layer. The thickness of the cured layer will vary depending upon the end-use, as described above for the solvent-based composition. Exposure to the UV radiation causes the cationic polymerization and self-crosslinking of the carrier and tackifier(s). In some embodiments, the exposing process may be repeated multiple times until the desired level of curing is achieved. It will be appreciated that the total UV dose used for radiation will depend upon the end use (e.g., PSA vs. coating), as well as the thickness of the composition layer (to achieve complete through curing). When a photoinitiator is present, the total radiation dose will generally range from about 3 to about 500 mJ/cm$^2$, more preferably from about 3 to about 300 mJ/cm², and even more preferably from about 5 to about 50 mJ/cm². Without a photoinitiator, the total radiation dose will generally range from about 600 to about 2000 mJ/cm², more preferably from about 800 to about 1800 mJ/cm², and even more preferably from about 1000 to about 1700 mJ/cm².

The resulting cured composition will comprise crosslinked plant oil triglyceride polymers, and preferably copolymers of the carrier and tackifier. The copolymer preferably self-crosslinks. Thus, the composition is preferably substantially free of added crosslinking agents. In one or more embodiments, the crosslinked plant oil triglycerides will comprise crosslinkages selected from the group consisting of ether, alkyl chain, and —COOC crosslinkages. The crosslinked plant oil triglycerides will also comprise sticky group moieties (e.g., —OH, and other groups above, as well as rosin esters) having a free end (i.e., pendant from the crosslinked matrix). When DPO is used as a tackifier, the crosslinked polymers will comprise pendant hydroxyl moieties. In a particularly preferred embodiment, the cured composition will comprise a crosslinked matrix comprising copolymers of EPO and a tackifier (preferably DPO and/or rosin ester), having ether crosslinkages. In a further preferred embodiment, the cured composition will comprise a crosslinked matrix comprising copolymers of AEPO and a tackifier (preferably DPO and/or rosin ester), having ether crosslinkages. In yet another preferred embodiment, the crosslinked matrix will comprise a copolymer of a carrier and DPO tackifier.

Depending upon the degree of crosslinking and the level of free sticky groups available, the inventive compositions are suitable for use as a PSA, coating, and/or film. The polymerized composition will preferably have a shelf-life of at least about 6 months, preferably at least about 8 months, and more preferably at least about 1 year. The term shelf-life as used herein to refer to the amount of time that the product remains shelf-stable, meaning that it will not degrade, deteriorate, or otherwise lose its functionality as a PSA, coating, and/or film.

In one or more embodiments, the polymerized/cured composition will also preferably be substantially transparent in the visible region. More specifically, a 500-nm layer of the cured composition will have a % light transmittance of at least about 80%, preferably at least about 90%, and even more preferably at least about 95% at wavelengths between about 300-800 nm. Thus, in one or more embodiments, the composition is preferably substantially free of any pigments, dyes, chromophores, and/or other light attenuating moieties.

The cured composition will also preferably be substantially insoluble in organic solvents, including chloroform, methane chloride, tetrahydrofuran, ethyl acetate, methyl acetate, acetone, ethyl ether, dimethylformamide and hexane. The cured composition will also preferably be resistant to moisture and dissolution in water.

The cured composition will also preferably have a low coefficient of thermal expansion of less than about 20 ppm/K, more preferably less than about 15 ppm/K, and even more preferably less than about 14.08 ppm/K. The cured composition will also have a peel strength of at least about 0.5 N/cm more preferably at least about 3 N/cm, and even more preferably at least about 4.5 N/cm, when subjected to a peel adhesion strength test. The shear strength of the cured composition will preferably be at least about 30,000 minutes with a 1 kg weight, and even more preferably at least about 60,000 minutes with a 1 kg weight.

In a further embodiment of the invention, a composition suitable for use as a PSA, coating, or film is provided which comprises an acrylated epoxidized plant oil (AEPO) triglyceride. The precursor composition is substantially free of any solvent or external crosslinkers. A photoinitiator may optionally be included in the composition at the levels described above; however, the composition in this embodiment is substantially free of any tackifiers. In some embodiments, the composition consists essentially (or even consists) of the AEPO. In other embodiments, the composition consists essentially (or even consists) of AEPO and a photoinitiator. The composition can be cured via free radical polymerization (and self-crosslinking) of the AEPO, using the UV curing method described above. The composition can comprise up to about 100% by weight AEPO, more preferably from about 50% to about 100% by weight, and even more preferably from about 75% to about 97% by weight, based upon the total weight of the precursor composition taken as 100% by weight. Depending upon the total radiation dosage, the composition is particularly suitable for use in forming a high shear strength PSA, with excellent adhesion to glossy surfaces such as glass, but low adhesion to paper or skin. The level of curing can be modulated to also create a PSA having excellent adhesion to skin (similar to a band-aid adhesive), but cohesion failure on glossy surfaces, such as glass.

Additional advantages of the various embodiments of the invention will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

EXAMPLES

The following examples set forth methods in accordance with the invention. It is to be understood, however, that these examples are provided by way of illustration and nothing therein should be taken as a limitation upon the overall scope of the invention.

Examples 1-3

One-Step Method for Making PSAs Using Epoxidized Soybean Oil with Different Amounts of O-Phosphoric Acid (85% Purity) and Effect of Reaction Time on their Adhesion Force Values 1. Materials and Instruments Epoxidized Soybean Oil (ESO): available from Scientific Polymer Products, Inc., Ontario, N.Y.

Ethanol (200 proof): absolute, anhydrous, denatured, ACS grade, available from Pharmco Products, Inc., Brookfield, Conn.

O-Phosphoric Acid (85% purity): ACS grade, available from Fisher Scientific.

Polyester (PET) Films: 200 gauge adhesion treated one side, 8.5"×11" sheets, available from Papertec Inc., Elizabeth, N.J.

Incubator shaker: Model I2400, New Brunswick Scientific Inc., Edison, N.J.

Oven: Blue M Electric Company, Blue Island, Ill.

Peel tester: Model MV-110, Imada Inc., Northbrook, Ill.

2. Preparation of Pressure Sensitive Adhesives (PSA)

Solvent was prepared with 3, 3.5, and 4 g of O-phosphoric acid (6%, 7%, and 8% based on ESO in Examples 1, 2, and 3, respectively) and 50 mL of 200 proof ethanol (ratio of ethanol to ESO was 1:1, volume to weight) by mixing them in a 250-mL screw cap Erlenmeyer flask under ambient conditions for a few minutes. Next, 50 g of ESO was added to each flask with the solvent mixture. The flask was sealed and the mixture reacted in an incubator shaker at 40° C. with continuous shaking at 260 rpm. At the designated reaction times (0-390 min, as shown in Table 1), the PSAs were sampled, cured, and peel tested as described below.

3. PSA Curing

A 3.0 g (equivalent to 30 g/m2 spreading amount) sample of each PSA was uniformly spread onto a polyester (PET) film on the side with adhesion treatment. The PSA coated films were cured in an oven at 130° C. for 5 min. The cured films were then cut into strips 24-mm (1-in.) in width and 279 mm (11-in) in length according to ASTM method D3330/D 3330M-04.

4. Adhesion Peel Test

The 90-degree peel adhesion test was performed using ASTM method D3330/D 3330M-04. For each test, a PSA film strip was adhered to the test surface of a 1.1-mm thick stainless steel panel (50 mm×125 mm) having a bright annealed finish. A hard rubber-covered steel roller with a weight of 2.04-kg was used to assure the PSA film was uniformly adhered onto the substrate using one pass back and forth. The substrate with PSA film was then firmly mounted onto the peel tester. The film was pulled up at a 90° peel angle by moving the free end of the strip away from the substrate panel at a speed of 5.0 mm/s. The force recorded in the first 25 mm was disregarded, and then the average force obtained during peeling of the next 50 mm was used as the adhesion value. Results were recorded in Newton per centimeter (N/cm).

5. Results and Discussion

The 90° peel adhesion test results are summarized in Table 1.

TABLE 1

| Example | | Reaction time (min) | | | | | | | | | | | | |
|---|---|---|---|---|---|---|---|---|---|---|---|---|---|---|
| | | 40 | 60 | 90 | 120 | 150 | 180 | 210 | 240 | 270 | 300 | 330 | 360 | 390 |
| 1 | Adhesion force (N/cm) | | | | 0.23 | 0.25 | 0.35 | | 0.49 | 0.61 | 0.52 | | 0.69 | |
| | Adhesive on panel* | | | | − | − | − | | + | + | + | | | |
| 2 | Adhesion force (N/cm) | | | | 0.21 | 0.28 | 0.34 | 0.49 | 0.46 | 0.65 | 1.04 | 1.69 | 2.46 | 2.43 |
| | Adhesive on panel* | − | − | − | − | − | − | − | − | + | ++ | ++ | ++ | +++ |
| 3 | Adhesion force (N/cm) | 0.12 | 0.17 | 0.29 | 0.42 | 0.59 | 1.82 | 2.55 | 0.55 | | | | | |
| | Adhesive on panel* | − | − | − | − | − | ++ | ++ | +++ | | | | | |

*Legend: −, no adhesive remained on the stainless steel panel; +, a little bit adhesive remained on the stainless steel panel; ++, a lot of adhesive layer remained on the stainless steel panel; +++, a lot of adhesive remained on the stainless steel panel and threadlike adhesive attachments were observed between panel and plastic film as it was pulled away.

In each of Example 1-3, the adhesion force values increased with the increase of reaction time till a peak reaction time at which maximum peel strength appeared, after that the adhesion force values decreased. The amount of phosphoric acid in the mixture of reactants significantly influenced the peak reaction times: as the amount of phosphoric acid increased, the peak reaction time decreased. Increasing the amount of phosphoric acid seemed to cause the PSA to become so sticky that it remained on the stainless steel panels after the peel tests.

Examples 4-5

One-Step Method for Making PSAs Using Epoxidized Soybean Oil with O-Phosphoric Acid (85% Purity) and Effects of Curing Time and Temperature on their Adhesion Force Values 1. Materials and Instruments The materials and instruments used in Examples 4-5 are the same as those listed above in Examples 1-3.

2. Preparation of Pressure Sensitive Adhesives (PSA)

Solvent was prepared with 3.5 g of O-phosphoric acid (7% based on ESO) and 50 mL of 200 proof ethanol (ratio of ethanol to ESO was 1:1, volume to weight) by mixing them in a 250-mL screw cap Erlenmeyer flask under ambient conditions for a few minutes. Next, 50 g of ESO was added to the flask with the solvent mixture. The flask was then sealed and the mixture reacted in an incubator shaker for 240 min at 40° C., with continuous shaking at 260 rpm. The resulting PSA was then sampled, cured, and peel tested as described below.

3. PSA Curing

A 3.0-g sample of the PSA was uniformly spread onto polyester (PET) films on the side with adhesion treatment. The PSA-coated films were then cured in an oven at 130° C. for 1, 3, 5, and 10 min, respectively, in Example 4, and at 150° C. for 1, 3, and 5 min, respectively, in Example 5. The cured films were then cut into strips 24-mm (1-in.) in width and 279-mm (11-in) in length according to ASTM method D3330/D 3330M-04.

4. Adhesion Peel Test

The adhesion peel test was carried out using the same procedure as described in Examples 1-3.

5. Results and Discussion

The 90° peel adhesion test results are summarized in Table 2.

TABLE 2

| Example | Curing temperature (° C.) | | Curing time (min) | | | |
|---|---|---|---|---|---|---|
| | | | 1 | 3 | 5 | 10 |
| 4 | 130 | Adhesion force (N/cm) | 0.34 | 0.47 | 0.54 | 1.08 |
| | | Adhesive remained on panel* | – | – | – | ++ |

TABLE 2-continued

| Example | Curing temperature (° C.) | | Curing time (min) | | | |
|---|---|---|---|---|---|---|
| | | | 1 | 3 | 5 | 10 |
| 5 | 150 | Adhesion force (N/cm) | 0.5 | 0.87 | 1.48 | |
| | | Adhesive remained on panel* | – | + | ++ | |

*Legend: –, no adhesive remained on the stainless steel panel; +, a little bit adhesive remained on the stainless steel panel; ++, a lot of adhesive layer remained on the stainless steel panel.

In both Examples 4 and 5, the adhesion force values increased with the increase of curing time and curing temperature. However, increasing the curing time and temperature might bring about a problem that adhesive became so sticky that it remains on the stainless steel panels after the peel tests.

Examples 6-9

One-Step Method for Making PSAs Using Epoxidized Soybean Oil with O-Phosphoric Acid (85% Purity) and Effects of Reaction Time and Temperature on their Adhesion Force Values 1. Materials and Instruments The materials and instruments used in Examples 4-5 are the same as those listed above in Examples 1-3.

2. Preparation of Pressure Sensitive Adhesives (PSA)

Solvent was prepared with 3.5 g of O-phosphoric acid (7% based on ESO) and 50 mL of 200 proof ethanol (ratio of ethanol to ESO was 1:1, volume to weight), by mixing them in a 250-mL screw cap Erlenmeyer flask under ambient conditions for a few minutes. Next, 50 g of ESO was added to the flask with the solvent mixture. The flask was then sealed and the mixture reacted in an incubator shaker at 28.3° C. (room temperature), 30° C., 40° C., and 55° C., in Examples 6, 7, 8, and 9, respectively, with continuous shaking at 260 rpm. At the designated reaction times (0-300 min, as shown in Table 3), the PSAs were sampled, cured, and peel tested as described below.

3. PSA Curing

PSA curing was carried out as described in Examples 1-3.

4. Adhesion Peel Test

The adhesion peel test was carried out as described in Examples 1-3.

5. Results and Discussion

The 90° peel adhesion test results are summarized in Table 3.

TABLE 3

| Example | Reaction temperature (° C.) | | Reaction time (min) | | | | | |
|---|---|---|---|---|---|---|---|---|
| | | | 60 | 80 | 120 | 180 | 240 | 300 |
| 6 | 28.3 | Adhesion force (N/cm) | | | | 0.13 | 0.18 | 0.18 |
| | | Adhesive remained on panel* | | | | – | – | – |
| 7 | 30 | Adhesion force (N/cm) | | | | 0.15 | 0.18 | 0.20 |
| | | Adhesive remained on panel* | | | | – | – | – |
| 8 | 40 | Adhesion force (N/cm) | | | 0.23 | 0.35 | 0.49 | 0.52 |
| | | Adhesive remained on panel* | | | – | – | – | – |
| 9 | 55 | Adhesion force (N/cm) | 0.44 | 0.59 | 2.30 | | | |
| | | Adhesive remained on panel* | – | – | ++ | | | |

*Legend: –, no adhesive remained on the stainless steel panel; ++, a lot of adhesive layer remained on the stainless steel panel.

In all of the Examples (6, 7, 8, and 9), the adhesion force values increased with the increase of reaction temperature and reaction time. No difference was observed between 28.3° C. and 30° C. Increasing the reaction time and temperature might bring about a problem that adhesive becomes so sticky that it remains on the stainless steel panels after the peel tests.

Example 10

One-Step Method for Making PSAs Using Epoxidized Soybean Oil with O-Phosphoric Acid (99.999% Purity) and Effects of Reaction Time and Temperature on their Adhesion Force Values 1. Materials and Instruments O-Phosphoric Acid (99.999% purity): Crystals, ACS grade, available from Sigma-Aldrich, Inc., St. Louis, Mo.

Other instruments and materials used in this example were the same as those in Examples 1-3.

2. Preparation of Pressure Sensitive Adhesives (PSA)

Solvent was prepared with 3.0 g of O-phosphoric acid (99.999% purity, 6% based on ESO) and 50 mL of 200 proof ethanol (ratio of ethanol to ESO was 1:1, volume to weight), by mixing them in a 250-mL screw cap Erlenmeyer flask at room conditions for a few min. Next, 50 g of ESO was added to the flask with the solvent mixture. The flask was then sealed and the mixture reacted in an incubator shaker at 40° C. with continuous shaking at 260 rpm. At the designated reaction times (300-420 min, as shown in Table 4), the PSAs were sampled, cured, and peel tested as described below.

3. PSA Curing

PSA curing was carried out as described in Examples 1-3.

4. Adhesion Peel Test

Adhesion peel test was carried out as described in Examples 1-3.

5. Results and Discussion

The 90° peel adhesion test results are summarized in Table 4.

TABLE 4

| Example | Reaction time (min) | | | | |
|---|---|---|---|---|---|
| | 300 | 330 | 360 | 390 | 420 |
| 10 Adhesion force (N/cm) | 0.52 | 0.79 | 0.82 | 0.98 | 1.76 |
| Adhesive remained on panel* | − | + | + | + | ++ |

*Legend: −, no adhesive remained on the stainless steel panel; +, a little bit adhesive remained on the stainless steel panel; ++, a lot of adhesive layer remained on the stainless steel panel.

The adhesion force values increased with the increase of reaction time. However, increasing the reaction time might bring about a problem that the adhesive becomes so sticky that it remains on the stainless steel panels after the peel tests.

Example 11

One-Step Method for Making PSAs Using Epoxidized Soybean Oil with O-Phosphoric Acid (85% Purity) and Effects of Alcohols on their Adhesion Force Values 1. Materials and Instruments Ethanol (190 proof): denatured, ACS grade, available from Pharmco Products, Inc., Brookfield, Conn.
Methanol: ACS grade, available from Fisher Scientific.
1-Propanol: ACS grade, available from Fisher Scientific.
2-Propanol: ACS grade, available from Fisher Scientific.
1-Butanol: ACS grade, available from Fisher Scientific.
Other instruments and materials used in this example were the same as those in Examples 1-3.

2. Preparation of Pressure Sensitive Adhesives (PSA)

Solvents were prepared by mixing 3.5 g of O-phosphoric acid (85% purity, 7% based on ESO) with 50 mL of methanol, 200-proof ethanol, 190-proof ethanol, 1-propanol, 2-propanol, or 1-butanol (ratio of alcohols to ESO was 1:1, volume to weight) respectively, in 250-mL screw cap Erlenmeyer flasks under ambient conditions for a few minutes. Next, 50 g of ESO was added to each flask with the solvent mixtures. The flasks were sealed and the mixtures reacted in an incubator shaker at 40° C. for 240 min with continuous shaking at 260 rpm. The PSAs were sampled, cured, and peel tested as described below.

3. PSA Curing

PSA curing was carried out as described in Examples 1-3.

4. Adhesion Peel Test

Adhesion peel test was carried out as described in Examples 1-3.

5. Results and Discussion

The 90° peel adhesion test results are summarized in Table 5. The adhesion force values were different with different alcohols. Ethanol, 2-propanol, 1-propanol, and 1-butanol were good for producing PSA.

TABLE 5

| | Alcohol | | | | | |
|---|---|---|---|---|---|---|
| Example | Methanol | 200-proof Ethanol | 190-proof Ethanol | 2-Propanol | 1-Propanol | 1-Butanol |
| 11 Adhesion force (N/cm) | | 0.54 | 0.21 | 0.26 | 0.45 | 0.48 |
| Adhesive remained on panel* | ++++ | − | +++ | − | − | − |

*Legend: −, no adhesive remained on the stainless steel panel; +++ a lot of adhesive remained on the stainless steel panel and threadlike adhesive attached between panel and plastic film; ++++ oily stage after curing.

Example 12

One-Step Method for Making PSAs Using Epoxidized Soybean Oil with O-Phosphoric Acid (85% Purity) and Effects of Solvent Amount on their Adhesion Force Values 1. Materials and Instruments Materials and instruments used in this example were the same as those in Examples 1-3.

2. Preparation of Pressure Sensitive Adhesives (PSA)

Solvents were prepared by mixing 3.5 g of O-phosphoric acid (85% purity, 7% based on ESO) with 40, 45, and 50 mL of ethanol (ratios of ethanol to ESO were about 0.8:1, 0.9:1, and 1:1, respectively, volume to weight) respectively, in 250-mL screw cap Erlenmeyer flasks under ambient conditions for a few minutes. Next, 50 g of ESO was added to each flask with the solvent mixtures. The flasks were then sealed and the mixtures reacted in an incubator shaker at 40° C. for 240 min with continuous shaking at 260 rpm. The PSAs were sampled, cured, and peel tested as described below.

3. PSA Curing

PSA curing was carried out as described in Examples 1-3.

4. Adhesion Peel Test

Adhesion peel test was carried out as described in Examples 1-3.

5. Results and Discussion

The 90° peel adhesion test results are summarized in Table 6. The adhesion force values increased with the decrease of ethanol amount. Decreasing the ethanol amount might bring about a problem that the adhesive becomes so sticky that it remains on the stainless steel panels after the peel tests.

TABLE 6

| | Ratio of ethanol to ESO, volume to weight | | |
|---|---|---|---|
| Example | 0.8:1 | 0.9:1 | 1:1 |
| 12 Adhesion force (N/cm) | 0.90 | 0.91 | 0.54 |
| Adhesive remained on panel* | + | + | − |

*Legend: −, no adhesive remained on the stainless steel panel; +, a little bit adhesive remained on the stainless steel panel.

Examples 13-14

One-Step Method for Making PSAs Using Mixture of Epoxidized Soybean Oil and Castor Oil with O-Phosphoric Acid (85% Purity) and Effects of Oil Fraction and Reaction Time on their Adhesion Force Values 1. Materials and Instruments Castor Oil: USP grade, available from Sigma-Aldrich, Inc., St. Louis, Mo.

Other instruments and materials used in this example were the same as those in Examples 1-3.

2. Preparation of Pressure Sensitive Adhesives (PSA)

Solvent was prepared by mixing 3.5 g of O-phosphoric acid (85% purity, 7% based on weight of oil) with 50 mL of ethanol (ratio of ethanol to oil was 1:1, volume to weight) in a 250-mL screw cap Erlenmeyer flask at room conditions for a few minutes. Then a mixture of ESO and Castor oil was added to the flask with the solvent mixture. The total weight of oil was 50 g and the ratios of Castor Oil to ESO were 15:85, 10:90, 5:95, and 0:100 (weight to weight), respectively, in each oil mixture. The flasks were sealed and the mixtures reacted in an incubator shaker at 40° C. with continuous shaking at 260 rpm. The PSAs were sampled, cured, and peel tested as described below at the reaction times of 180 and 240 min in Examples 13 and 14, respectively.

3. PSA Curing

PSA curing was carried out as described in Examples 1-3.

4. Adhesion Peel Test

Adhesion peel test was carried out as described in Examples 1-3.

5. Results and Discussion

The 90° peel adhesion test results are summarized in Table 7. Generally, the adhesion force values increased with the increase of castor oil amount. The effect of castor oil amount on adhesion force values was less significant when reaction time was 180 min. Increasing the castor oil amount might bring about a problem that the adhesive becomes so sticky that it remains on the stainless steel panels after the peel tests.

TABLE 7

| Example | Reaction time (min) | | Oil fraction (Caster Oil:ESO, by weight) | | | |
| --- | --- | --- | --- | --- | --- | --- |
| | | | 15:85 | 10:90 | 5:95 | 0:100 |
| 13 | 180 | Adhesion force (N/cm) | 0.51 | 0.32 | 0.38 | 0.34 |
| | | Adhesive remained on panel* | – | – | – | – |
| 14 | 240 | Adhesion force (N/cm) | 0.72 | 1.94 | 0.89 | 0.54 |
| | | Adhesive remained on panel* | +++ | ++ | + | – |

*Legend: –, no adhesive remained on the stainless steel panel; +, a little bit adhesive remained on the stainless steel panel; ++, a lot of adhesive layer remained on the stainless steel panel; +++ a lot of adhesive remained on the stainless steel panel and threadlike adhesive was observed attached between panel and plastic film.

Examples 15-16

One-Step Method for Making PSAs Using Mixture of Epoxidized Soybean Oil, Dihydroxylated Soybean Oil, and Castor Oil with O-Phosphoric Acid (85% Purity) and Effects of Oil Fraction and Reaction Time on their Adhesion Force Values 1. Materials and Instruments Castor Oil: USP grade, available from Sigma-Aldrich, Inc., St. Louis, Mo.

Diethyl Ether: Anhydrous, ACS grade, available from Fisher Scientific.

Perchloric Acid: 60-62% (w/w), ACS grade, available from Fisher Scientific.

Sodium Chloride: Crystals, ACS grade, available from Fisher Scientific.

Sodium Sulfate: Anhydrous, ACS grade, available from Fisher Scientific.

Tetrahydrofuran (THF): ACS grade, available from Fisher Scientific.

Rotary evaporator: Model Re11, BUCHI Laboratory Equipment, Switzerland.

Other materials and instruments used in this example were the same as those in Examples 1-3.

2. Preparation of Dihydroxylated Soybean Oil (DSO)

10 g of Epoxidized Soybean Oil (ESO) and 10 mL of tetrahydrofuran (THF) aqueous solution (ratio of THF to water was 3:2, vol/vol) containing 1% perchloric acid (HClO4) were placed in a 500 mL flask. The mixture was stirred at 260 rpm for 12 hr at room temperature (24° C.). The reaction product was then extracted with 30 mL of diethyl ether. The ether fraction was washed with 20-mL saturated aqueous solution of sodium chloride four times till pH neared to 7.0, then the product was dried with sodium sulfate ($Na_2SO_4$), and the ether was removed under vacuum at 40-45° C. by a rotary evaporator.

3. Preparation of Pressure Sensitive Adhesives (PSA)

For each adhesive, the solvent was prepared by mixing 3.5 g of O-phosphoric acid (85% purity, 7% based on weight of oil) with 50 mL of ethanol (ratio of ethanol to oil was 1:1, volume to weight) in a 250-mL screw cap Erlenmeyer flask at room (ambient) conditions for a few minutes. Next, a mixture of oil(s) was added to each flask with the solvent mixture. The total weight of oil was 50 g and the ratios of DSO to Castor Oil to ESO were 20:0:80, 10:0:90, 10:10:80, and 0:0:100 (weight to weight to weight), respectively, in each oil mixture. The flasks were sealed and the mixtures reacted in an incubator shaker at 40° C. with continuous shaking at 260 rpm. The PSAs were then sampled, cured, and peel tested as described below at the reaction times of 180 and 240 min in Examples 15 and 16, respectively.

4. PSA Curing and Adhesion Peel Test

PSA curing and Adhesion peel test was carried out as described in Examples 1-3.

5. Results and Discussion

The 90° peel adhesion test results are summarized in Table 8. The adhesion force values increased with the increase of DSO and castor oil amount. Increasing the DSO and castor oil amount caused the adhesive to become so sticky that it remained on the stainless steel panels after the peel tests.

TABLE 8

| Example | Reaction time (min) | | Oil fraction (DSO:Caster Oil:ESO, by weight) | | | |
|---|---|---|---|---|---|---|
| | | | 20:0:80 | 10:0:90 | 10:10:80 | 0:0:100 |
| 15 | 180 | Adhesion force (N/cm) | 2.08 | 0.51 | 1.36 | 0.34 |
| | | Adhesive remained on panel* | ++ | − | +++ | − |
| 16 | 240 | Adhesion force (N/cm) | | 1.01 | | 0.54 |
| | | Adhesive remained on panel | | + | | − |

Legend: −, no adhesive remained on the stainless steel panel; +, a little bit adhesive remained on the stainless steel panel; ++, a lot of adhesive layer remained on the stainless steel panel; +++ a lot of adhesive remained on the stainless steel panel and threadlike adhesive attached between panel and plastic film.

Example 17

One-Step Method for Making PSAs Using Epoxidized Soybean Oil with O-Phosphoric Acid (85% Purity) and Effects of Spreading Amounts on their Adhesion Force Values 1. Materials and Instruments Materials and instruments used in this example were the same as those in Examples 1-3.

2. Preparation of Pressure Sensitive Adhesives (PSA)

Solvent was prepared by mixing 3.5 g of O-phosphoric acid (85% purity, 7% based on ESO) with 50 mL of 200 proof ethanol (ratio of ethanol to ESO was 1:1, volume to weight) in a 250-mL screw cap Erlenmeyer flask at room conditions for a few minutes. Next, 50 g of ESO was added to the flask with the solvent mixture. The flask was then sealed and the mixture reacted in an incubator shaker for 240 min at 40° C. with continuous shaking at 260 rpm. The resulting PSA was sampled, cured, and peel tested as described below.

3. PSA Curing

For curing, 1.5-, 3.0-, 4.5-, and 6.0-g samples (equivalent to 15, 30, 45, and 60 g/m2 spreading amount) of the PSA were uniformly spread onto polyester (PET) films on the side with adhesion treatment. The PSA-coated films were cured in an oven at 130° C. for 5 min. The films with cured PSA were cut into strips 24-mm (1-in.) in width and 279 mm (11-in) in length according to ASTM method D3330/D 3330M-04.

4. Adhesion Peel Test

The adhesion peel test was carried out as described in Examples 1-3.

5. Results and Discussion

The 90° peel adhesion test results are summarized in Table 9. The adhesion force values increased with the increase of spreading amount. 30 g/m² spreading amount was proper. Increasing the spreading amount caused the adhesive to become so sticky that it remained on the stainless steel panels after the peel tests.

TABLE 9

| | | Spreading amount (g/m², weight to area) | | | |
|---|---|---|---|---|---|
| | Example | 15 | 30 | 45 | 60 |
| 17 | Adhesion force (N/cm) | 0.45 | 0.54 | 0.67 | 1.14 |
| | Adhesive remained on panel* | − | − | + | + |

*Legend: −, no adhesive remained on the stainless steel panel; +, a little bit adhesive remained on the stainless steel panel.

Example 18

One-Step Method for Making PSAs Using Epoxidized Soybean Oil with Mixture of O-Phosphoric Acid (85% purity) and Maleic Anhydride 1. Materials and Instruments Maleic Anhydride (MA): ACS grade, available from Sigma-Aldrich, Inc., St. Louis, Mo.

Other materials and instruments used in this example were the same as those in Examples 1-3.

2. Preparation of Pressure Sensitive Adhesives (PSA)

Solvents were prepared by mixing: 1) 3.0 g of O-phosphoric acid (6% based on ESO), 2) 3.0 g of O-phosphoric acid (6% based on ESO) plus 0.5 g of maleic Anhydride (1% based on ESO), 3) 3.5 g of O-phosphoric acid (7% based on ESO), and 4) 3.5 g of O-phosphoric acid (7% based on ESO) plus 0.5 g of maleic Anhydride (1% based on ESO), respectively, with 50 mL of 200 proof ethanol (ratio of ethanol to ESO was 1:1, volume to weight) in 250-mL screw cap Erlenmeyer flasks at room conditions for a few minutes. Next, 50 g of ESO was added to each flask with the solvent mixtures. The flasks were sealed and the mixtures reacted in an incubator shaker for 240 min at 40° C. with continuous shaking at 260 rpm. The PSA samples were sampled, cured, and peel tested as described below.

3. PSA Curing

PSA curing was carried out as described in Examples 1-3.

4. Adhesion Peel Test

Adhesion peel test was carried out as described in Examples 1-3.

5. Results and Discussion

The 90° peel adhesion test results were summarized in Table 10. In all samples, the adhesion force values increased with maleic anhydride added. Adding maleic anhydride caused the adhesive to become so sticky that it remained on the stainless steel panels after the peel tests.

TABLE 10

| | | Ratios of O-Phosphoric Acid (PA) to ESO, or Maleic Anhydride (MA) to ESO, weight to weight | | | |
|---|---|---|---|---|---|
| | Example | 6% PA | 6% PA + 1% MA | 7% PA | 7% PA + 1% MA |
| 18 | Adhesion force (N/cm) | 0.49 | 0.87 | 0.54 | 0.95 |
| | Adhesive remained on panel* | + | + | − | ++ |

*Legend: −, no adhesive remained on the stainless steel panel; +, a little bit adhesive remained on the stainless steel panel; ++, a lot of adhesive layer remained on the stainless steel panel.

Example 19

One-Step Method for Making PSAs Using Epoxidized Soybean Oil with Mixture of O-Phosphoric Acid (85% Purity) and Effect of Storage Time on their Adhesion Force Values 1. Materials and Instruments
Materials and instruments used in this example were the same as those in Examples 1-3.
2. Preparation of Pressure Sensitive Adhesives (PSA)
Solvent was prepared by mixing 3.5 g of O-phosphoric acid (85% purity, 7% based on ESO) with 50 mL of 200 proof ethanol (ratio of ethanol to ESO was 1:1, volume to weight) in a 250-mL screw cap Erlenmeyer flask at room conditions for a few minutes. Next, 50 g of ESO was added to the flask with the solvent mixture. The flask was then sealed and the mixture reacted in an incubator shaker for 240 min at 40° C. with continuous shaking at 260 rpm. Then the PSA was stored at room temperature (28° C.), and sampled, cured, and peel tested as described below at storage times of 0, 1, 2, 3, 4, 5, 6, and 7 hr, respectively.
3. PSA Curing
PSA curing was carried out as described in Examples 1-3.
4. Adhesion Peel Test
The adhesion peel test was carried out as described in Examples 1-3.
5. Results and Discussion
The 90° peel adhesion test results were summarized in Table 11. Adhesion force values increased with the increase of storage time. Increasing the storage time caused the adhesive to become so sticky that it remained on the stainless steel panels after the peel tests.

TABLE 11

| | Storage time (h) | | | | | | | |
|---|---|---|---|---|---|---|---|---|
| Example | 0 | 1 | 2 | 3 | 4 | 5 | 6 | 7 |
| 19 Adhesion force (N/cm) | 0.55 | 0.68 | 0.77 | 1.16 | 1.48 | 1.99 | 2.66 | 2.25 |
| Adhesive remained on panel* | − | − | − | + | ++ | ++ | ++ | +++ |

*Legend: −, no adhesive remained on the stainless steel panel; +, a little bit adhesive remained on the stainless steel panel; ++, a lot of adhesive layer remained on the stainless steel panel; +++, a lot of adhesive remained on the stainless steel panel and threadlike adhesive attached between panel and plastic film.

Examples 20-21

One-Step Method for Making PSAs Using Epoxidized Soybean Oil with O-Phosphoric Acid (85% Purity) and Effect of Storage Time on Cured PSA 1. Materials and Instruments
Materials and instruments used in this example were the same as those in Examples 1-3.
2. Preparation of Pressure Sensitive Adhesives (PSA)
Solvent was prepared by mixing 3.5 g of O-phosphoric acid (85% purity, 7% based on ESO) with 50 mL of 200 proof ethanol (ratio of ethanol to ESO was 1:1, volume to weight) in a 250-mL screw cap Erlenmeyer flask at room conditions for a few minutes. Next, 50 g of ESO was added to the flask with the solvent mixture. The flask was then sealed and the mixture reacted in an incubator shaker at 40° C. with continuous shaking at 260 rpm. The PSA was sampled, cured, and peel tested as described below at the reaction times of 180 and 240 min in Examples 20 and 21, respectively.
3. PSA Curing
A 3.0-g sample (equivalent to 30 g/m² spreading amount) of the PSA was uniformly spread onto polyester (PET) films on the side with adhesion treatment. The PSA coated films were cured in an oven at 130° C. for 5 min. The films with cured PSA were then stored at room temperature. At the designated storage times (0-76 days, as shown in Table 12), the films with cured PSA were cut into strips 24-mm (1-in.) in width and 279 mm (11-in) in length according to ASTM method D3330/D 3330M-04.
3. Adhesion Peel Test
The adhesion peel test was carried out as described in Examples 1-3.
5. Results and Discussion
The 90° peel adhesion test results were summarized in Table 12. The adhesion force values increased with the increase of storage time. Increasing the storage time caused the adhesive to become so sticky that it remained on the stainless steel panels after the peel tests. The cured PSA was not stable during storage.

TABLE 12

| | | | Storage time (d) | | | | |
|---|---|---|---|---|---|---|---|
| Example | Reaction time (min) | | 0 | 29 | 41 | 47 | 76 |
| 20 | 180 | Adhesion force (N/cm) | 0.29 | 0.32 | | 1.03 | 1.75 |
| | | Adhesive remained on panel* | − | − | − | + | ++ |
| 21 | 240 | Adhesion force (N/cm) | 0.46 | 0.79 | | | |
| | | Adhesive remained on panel* | − | − | ++ | | |

*Legend: −, no adhesive remained on the stainless steel panel; +, a little bit adhesive remained on the stainless steel panel; ++, a lot of adhesive layer remained on the stainless steel panel.

Example 22

One-Step Method for Making PSAs Using Epoxidized Soybean Oil with O-Phosphoric Acid (85% Purity) and Comparison in Adhesion Force Values with Different Commercial Tapes 1. Materials and Instruments
Lab label tape I: purple paper tape, 19-mm in width, available from local market.
Lab label tape II: yellow paper tape, 24-mm in width, available from local market.

Scotch® tape: transparent plastic film tape, 18.5 mm in width, available from local market.

Duct tape: grey, 76-mm in width, available from local market.

Post-it® notes: yellow paper tape, 16-mm in width, available from local market.

Other materials and instruments used in this example were the same as those in Examples 1-3.

2. Preparation of Pressure Sensitive Adhesives (PSA)

Solvent was prepared by mixing 3.5 g of O-phosphoric acid (85% purity, 7% based on ESO) with 50 mL of 200 proof ethanol (ratio of ethanol to ESO was 1:1, volume to weight) in a 250-mL screw cap Erlenmeyer flask at room conditions for a few min. Next, 50 g of ESO was added to the flask with the solvent mixture. The flask was then sealed and the mixture reacted in an incubator shaker for 240 min at 40° C. with continuous shaking at 260 rpm. The PSA was sampled, cured, and peel tested as described below.

3. PSA Curing

PSA curing was carried out as described in Examples 1-3.

4. Adhesion Peel Test

The adhesion peel test was carried out as described in Examples 1-3.

5. Results and Discussion

The 90° peel adhesion test results were summarized in Table 13. In general, the adhesion force value of PSA made from ESO was weaker than commercial tapes.

TABLE 13

|  | Commercial tape | | | | | |
| --- | --- | --- | --- | --- | --- | --- |
| Example | Lab label tape I | Lab label tape II | Scotch® tape | Duct tape | Post-it® tape | PSA from ESO |
| 23 Adhesion force (N/cm) | 1.10 | 0.94 | 0.81 | 2.99 | 0.15 | 0.54 |
| Adhesive remained on panel* | – | – | – | – | – | – |

*Legend: –, no adhesive remained on the stainless steel panel.

Example 23

Latex Prepared from Epoxidized Soybean Oil: Phosphoric Acid as Reagent without Using Molecular Sieves (Latex Storage Stability at Room Temperature)

1. Materials and Instruments

Epoxidized Soybean Oil (ESO): available from Scientific Polymer Products, Inc., Ontario, N.Y.

Ethanol (200 proof): absolute, anhydrous, denatured, ACS grade, available from Pharmco Products, Inc., Brookfield, Conn.

O-Phosphoric Acid (85% purity): ACS grade, available from Fisher Scientific.

Polyester (PET) Films: 200 gauge adhesion treated one side, 8.5"×11" sheets, available from Papertec Inc., Elizabeth, N.J.

Incubator shaker: Model I2400, New Brunswick Scientific Inc., Edison, N.J.

Rotary evaporator: Model Re11, BUCHI Laboratory Equipment, Switzerland

Oven: Blue M Electric Company, Blue Island, Ill.

Peel tester: Model MV-110, Imada Inc., Northbrook, Ill.

2. Latex Preparation

Solvent was prepared by mixing 3 g of O-phosphoric acid (~3.0% based on ESO) with 100 mL of ethanol (ratio of ethanol to ESO was 1:1, volume to weight) in a 500-mL screw cap Erlenmeyer flask at room conditions for a few minutes. Next, 100 g of ESO was added to the flask with the solvent mixture. The flask was then sealed and the mixture reacted in an incubator shaker at 50° C. for 12 days with continuous shaking at 200 rpm. The reacted mixture was cooled to room temperature. The latex was obtained by evaporating the ethanol from the reacted mixture using a rotary evaporator at 30-45° C. under vacuum. The prepared Latex contained 3% O-phosphoric acid (based on ESO) and 2.2% solvent (by weight), and was stored at room temperature for further uses. To evaluate the effects of storage time on PSA properties, the latex was sampled for making PSA at storage times of 0, 11, 29, 58, 88, 116, 147, and 179 days, respectively, as shown in Table 14.

3. Preparation of Pressure Sensitive Adhesives (PSA)

M g (4.5-5.5 g, weighted accurately) of the latex was dissolved in [(100%−2.2%)−2.2%/0.785]*M mL ethanol in a 125-mL Erlenmeyer flask, and shaken manually for 30-60 sec or until the mixture is clear. Then [(7%−3%)*(100%−2.2%)]*M g of phosphoric acid (4% by weight of ESO) was added to the flask and shaken manually for 30-60 sec or until the mixture became a clear syrup, which was considered the PSA.

4. PSA Curing

A 3.0 g sample of the PSA was uniformly spread onto a polyester (PET) film on the side with adhesion treatment. The PSA coated film was cured in an oven at 130° C. for 5 min. The film with cured PSA was cut into strips 24-mm (1-in.) in width and 279 mm (11-in) in length according to ASTM method D3330/D 3330M-04.

5. Adhesion Peel Test

The 90° peel adhesion test was performed using the ASTM method D3330/D 3330M-04. A PSA film strip was adhered to the test surface of a stainless steel panel (50 mm×125 mm) with 1.1 mm in thickness and a bright annealed finish. A hard rubber-covered steel roller with weight of 2.04-kg was used to assure the PSA film was uniformly adhered onto the substrate using one pass back and forth. The substrate with PSA film was firmly mounted onto the peel tester. The film was pulled up at a 90° peel direction by moving the free end of the strip away from the substrate panel at a speed of 5.0 mm/s. The force recorded in the first 25 mm was disregarded, and the average force obtained during peeling of the next 50 mm was used as the adhesion value. Results were reported in Newton per centimeter (N/cm).

6. Results and Discussion

The 90° peel adhesion test results are summarized in Table 14. The PSA made from the latex had an initial adhesion force of 0.44 N/cm. No residue was observed on the stainless steel panels after the peel tests using the PSA made from the latex stored at room temperature (about 26° C.) for up to 6 months, indicating the latex was very stable.

TABLE 14

|  | Storage time (day) | | | | | | | |
| --- | --- | --- | --- | --- | --- | --- | --- | --- |
|  | 0 | 11 | 29 | 58 | 88 | 116 | 147 | 179 |
| Adhesion force (N/cm) | 0.44 | 0.42 | 0.55 | 0.73 | 0.74 | 0.55 | 0.75 | 0.63 |

TABLE 14-continued

| | Storage time (day) | | | | | | |
|---|---|---|---|---|---|---|---|
| | 0 | 11 | 29 | 58 | 88 | 116 | 147 | 179 |
| Adhesive remained on panel* | – | – | – | – | – | – | – | – |

*Legend: –, no adhesive remained on the stainless steel panel.

Example 24

Latex Prepared from Epoxidized Soybean Oil: Phosphoric Acid as Reagent without Using Molecular Sieves (Latex Storage Stability at Room Temperature)

1. Materials and Instruments

Materials and instruments used in this example were the same as those in Example 23.

2. Latex Preparation

Solvent was prepared by mixing 3.5 g of O-phosphoric acid (~3.5% based on ESO) with 100 mL of ethanol (ratio of ethanol to ESO was 1:1, volume to weight) in a 500-mL screw cap Erlenmeyer flask at room conditions for a few min. Next, 100 g of ESO was added to the flask with the solvent mixture. The flask was sealed and the mixture reacted in an incubator shaker at 50° C. for 24 hours with continuous shaking at 200 rpm. The reacted mixture was cooled to room temperature. The latex was obtained by evaporating the ethanol from the reacted mixture using a rotary evaporator at 30-45° C. under vacuum. The prepared Latex contained 3.5% O-phosphoric acid (based on ESO) and 8.0% solvent (by weight), and was stored at room temperature for further uses. To evaluate the effects of storage time on PSA properties, the latex was sampled for making PSA at storage times of 0, 6, 21, 39, 68, 98, 126, and 157 days, respectively, as shown in Table 15.

3. Preparation of Pressure Sensitive Adhesives (PSA)

M g (4.5-5.5 g, weighted accurately) of the latex was dissolved in [(100%–8.0%)–8.0%/0.785]*M mL ethanol in a 125-mL Erlenmeyer flask, and shaken manually for 30-60 sec or until the mixture is clear. Then [(7%–3.5%)*(100%–8.0%)]*M g of phosphoric acid (3.5% by weight of ESO) was added to the flask and shaken manually for 30-60 sec or until the mixture became a clear syrup, which was considered the PSA.

4. PSA Curing

PSA curing was carried out as described in Example 23.

5. Adhesion Peel Test

Adhesion peel test was carried out as described in Example 23.

6. Results and Discussion

The 90° peel adhesion test results are summarized in Table 15. The PSA made from the latex had an initial adhesion force of 0.52 N/cm. The adhesion force of the PSAs kept almost no change (from 0.52 to 0.56 N/cm) during the early 21 days of storage, and then increased slowly from 0.56 to 0.76 N/cm in the second and third month. In the fourth and fifth months the adhesion force of the PSAs increased significantly. A little adhesive residue was observed on the stainless steel panels after the peel tests using the PSA made from the latex stored at room temperature (about 26° C.) for 4-5 months. The latex could be stored at least for 3 months.

TABLE 15

| | Storage time (day) | | | | | | |
|---|---|---|---|---|---|---|---|
| | 0 | 6 | 21 | 39 | 68 | 98 | 126 | 157 |
| Adhesion force (N/cm) | 0.52 | 0.39 | 0.56 | 0.77 | 0.77 | 0.76 | 1.00 | 1.02 |
| Adhesive remained on panel* | – | – | – | – | – | – | + | + |

*Legend: –, no adhesive remained on the stainless steel panel; +, a little bit adhesive remained on the stainless steel panel.

Example 25

Latex Prepared from Epoxidized Soybean Oil: Phosphoric Acid as Reagent Using Molecular Sieves for Water Drying (Latex Storage Stability at Room Temperature)

1. Materials and Instruments

Molecular Sieves: 3A, beads, 8-12 mesh, available from Sigma-Aldrich, Inc., St. Louis, Mo.

The other instruments and materials used in this example were the same as those in Example 23.

2. Latex Preparation

Solvent was prepared by mixing 3 g of O-phosphoric acid (~3.0% based on ESO) with 100 mL of ethanol (ratio of ethanol with ESO was 1:1, volume to weight), and 3.6 g of distilled water (2% by weight of the total amount of ESO, ethanol, and phosphoric acid) in a 500-mL screw cap Erlenmeyer flask at room conditions for a few min. Next, 100 g of ESO was added to the flask with the solvent mixture. The flask was then sealed and the mixture reacted in an incubator shaker at 50° C. for 12 hours with continuous shaking at 200 rpm. The reacted mixture was cooled to room temperature and then dried with 20 g of molecular sieves for 10 min. The latex was obtained by evaporating the ethanol from the dried mixture using a rotary evaporator at 30-45° C. under vacuum. The prepared Latex contained 3% O-phosphoric acid (based on ESO) and 9.5% solvent (by weight), and was stored at room temperature for further uses. To evaluate the effects of storage time on PSA properties, the latex was sampled for making PSA at storage times of 0, 5, 34, 64, 92, and 123 days, respectively, as shown in Table 16.

3. Preparation of Pressure Sensitive Adhesives (PSA)

M g (4.5-5.5 g, weighted accurately) of the latex was dissolved in [(100%–9.5%)–9.5%/0.785]*M mL ethanol in a 125-mL Erlenmeyer flask, and shaken manually for 30-60 sec or until the mixture is clear. Then [(7%–3%)*(100%–9.5%)]*M g of phosphoric acid (4% by weight of ESO) was added to the flask and shaken manually for 30-60 sec or until the mixture became a clear syrup, which was considered the PSA.

4. PSA Curing

PSA curing was carried out as described in Example 23.

5. Adhesion Peel Test

The adhesion peel test was carried out as described in Example 23.

6. Results and Discussion

The 90° peel adhesion test results are summarized in Table 16. The PSA made from the latex had an initial adhesion force of 0.33 N/cm. The adhesion force of the PSAs increased steadily but slowly from 0.33 to 0.57 N/cm during the first month of storage of the latex, leveled off during the second month, then increased sharply from 0.56 to 1.06 N/cm in the third month. A little adhesive residue was observed on the stainless steel panels after the peel tests using the PSA made from the latex stored at room temperature (about 26° C.) for 3 months, which indicated that the latex could be stored at least for 2 months.

TABLE 16

| | Storage time (day) | | | | | |
|---|---|---|---|---|---|---|
| | 0 | 5 | 34 | 64 | 92 | 123 |
| Adhesion force (N/cm) | 0.33 | 0.45 | 0.57 | 0.56 | 1.06 | 2.26 |
| Adhesive remained on panel* | − | − | − | − | + | ++ |

*Legend: −, no adhesive remained on the stainless steel panel; +, a little bit adhesive remained on the stainless steel panel; ++, a lot of adhesive layer remained on the stainless steel panel.

Example 26

Latex Prepared from Epoxidized Soybean Oil: Anhydrous Phosphoric Acid as Reagent without Using Molecular Sieves (Latex Storage Stability at 50° C.)

1. Materials and Instruments

O-Phosphoric Acid (99.999% purity): Crystals, ACS grade, available from Sigma-Aldrich, Inc., St. Louis, Mo.

The other instruments and materials used in this example were the same as those in Example 23.

2. Latex Preparation

Solvent was prepared by mixing 3 g of O-phosphoric acid (99.999% purity, ~3.0% based on ESO) with 100 mL of ethanol (ratio of ethanol to ESO was 1:1, volume to weight) in a 500-mL screw cap Erlenmeyer flask at room conditions for a few min. Next, 100 g of ESO was added to the flask with the solvent mixture. The flask was then sealed and the mixture reacted in an incubator shaker at 50° C. for 72 hours with continuous shaking at 200 rpm. The reacted mixture was cooled to room temperature. The latex was obtained by evaporating the ethanol from the reacted mixture using a rotary evaporator at 30-45° C. under vacuum. The prepared Latex contained 3% O-phosphoric acid (based on ESO) and 8.0% solvent (by weight), and was stored at 50° C. with continuous shaking at 200 rpm for further uses. To evaluate the effects of storage time on PSA properties, the latex was sampled for making PSA at storage times of 0, 3, 5, 10, 15, and 29 days, respectively, as shown in Table 17.

3. Preparation of Pressure Sensitive Adhesives (PSA)

M g (4.5-5.5 g, weighted accurately) of the latex was dissolved in [(100%−8.0%)−8.0%/0.785]*M mL ethanol in a 125-mL Erlenmeyer flask, and shaken manually for 30-60 sec or until the mixture is clear. Then [(7%−3%)*(100%−8.0%)]*M g of phosphoric acid (85% purity, ~4% by weight of ESO) was added to the flask and shaken manually for 30-60 sec or until the mixture became a clear syrup, which was considered the PSA.

4. PSA Curing

PSA curing was carried out as described in Example 23.

5. Adhesion Peel Test

The adhesion peel test was carried out as described in Example 23.

6. Results and Discussion

The 90° peel adhesion test results are summarized in Table 17. The PSA made from the latex had an initial adhesion force of 0.56 N/cm. The adhesion force of the PSAs had no change during the first 5 days of storage of the latex, and then increased sharply from 0.55 to 1.52 N/cm in one month. A lot of adhesive residue was observed on the stainless steel panels after the peel tests using the PSA made from the latex stored at 50° C. with continuous shaking at 200 rpm for the 29th day, which indicated that the latex was unstable at higher temperature.

TABLE 17

| | Storage time (day) | | | | | |
|---|---|---|---|---|---|---|
| | 0 | 3 | 5 | 10 | 15 | 29 |
| Adhesion force (N/cm) | 0.56 | 0.48 | 0.55 | 0.84 | 0.64 | 1.52 |
| Adhesive remained on panel* | − | − | − | + | + | ++ |

*Legend: −, no adhesive remained on the stainless steel panel; +, a little bit adhesive remained on the stainless steel panel; ++, a lot of adhesive layer remained on the stainless steel panel.

Example 27

Latex Prepared from Epoxidized Soybean Oil: Phosphoric Acid as Reagent (Effect of Reaction Time)

1. Materials and Instruments

Materials and instruments used in this example were the same as those in Example 23.

2. Latex Preparation

Solvent was prepared by mixing 1.5 g of O-phosphoric acid (~3.0% based on ESO) with 50 mL of ethanol (ratio of ethanol to ESO was 1:1, volume to weight) in a 250-mL screw cap Erlenmeyer flask at room conditions for a few min. Next, 50 g of ESO was added to the flask with the solvent mixture. The flask was then sealed and the mixture reacted in an incubator shaker at 50° C. with continuous shaking at 200 rpm. To evaluate the effects of reaction time on PSA properties, the Latex was sampled for making PSA at reaction times of 2, 3, 9, 10, 14, and 22 days, respectively, as shown in Table 18.

3. Preparation of Pressure Sensitive Adhesives (PSA)

M g (4.5-5.5 g, weighted accurately) of the latex was dissolved in [(100%−43.3%)−43.3%/0.785]*M mL ethanol in a 125-mL Erlenmeyer flask, and shaken manually for 30-60 sec or until the mixture is clear. Then [(7%−3%)*(100%−43.3%)]*M g of phosphoric acid (~4% by weight of ESO) was added to the flask and shaken manually for 30-60 sec or until the mixture became a clear syrup, which was considered the PSA.

4. PSA Curing

PSA curing was carried out as described in Example 23.

5. Adhesion Peel Test

The adhesion peel test was carried out as described in Example 23.

6. Results and Discussion

The 90° peel adhesion test results are summarized in Table 18. The PSA made from the latex had an initial adhesion force of 0.33 N/cm in the 2nd day. The adhesion force of the PSAs increased slowly to 0.66 N/cm when reaction time was 14 days, and then increased sharply to 1.13 N/cm, and a little adhesive residue was observed on the stainless steel panels after the peel tests using the PSA made from the latex sampled at the reaction time of 22 days.

TABLE 18

| | Reaction time (day) | | | | | |
|---|---|---|---|---|---|---|
| | 2 | 3 | 9 | 10 | 14 | 22 |
| Adhesion force (N/cm) | 0.33 | 0.39 | 0.37 | 0.40 | 0.66 | 1.13 |
| Adhesive remained on panel* | – | – | – | – | – | + |

*Legend: –, no adhesive remained on the stainless steel panel; +, a little bit adhesive remained on the stainless steel panel.

Example 28

Latex Prepared from Epoxidized Soybean Oil: Phosphoric Acid as Reagent without Using Molecular Sieves (Effect of Reaction Time)

1. Materials and Instruments

Materials and instruments used in this example were the same as those in Example 23.

2. Latex Preparation

Solvent was prepared by mixing 1.5 g of O-phosphoric acid (~3.0% based on ESO) with 25 mL of ethanol (ratio of ethanol to ESO was 0.5:1, volume to weight) in a 250-mL screw cap Erlenmeyer flask at room conditions for a few min. Next, 50 g of ESO was added to the flask with the solvent mixture. The flask was sealed and the mixture reacted in an incubator shaker at 50° C. with continuous shaking at 200 rpm. To evaluate the effects of reaction time on PSA properties, the Latex was sampled for making PSA at reaction times of 4, 10, 14, 22, 31, 40, and 49 days, respectively, as shown in Table 19.

3. Preparation of Pressure Sensitive Adhesives (PSA)

M g (4.5-5.5 g, weighted accurately) of the latex was dissolved in [(100%–27.6%)–27.6%/0.785]*M mL ethanol in a 125-mL Erlenmeyer flask, and shaken manually for 30-60 sec or until the mixture is clear. Then [(7%–3%)*(100%–27.6%)]*M g of phosphoric acid (~4% by weight of ESO) was added to the flask and shaken manually for 30-60 sec or until the mixture became a clear syrup, which was considered the PSA.

4. PSA Curing

PSA curing was carried out as described in Example 23.

5. Adhesion Peel Test

The adhesion peel test was carried out as described in Example 23.

6. Results and Discussion

The 90° peel adhesion test results are summarized in Table 19. The PSA made from the latex had an initial adhesion force of 0.24 N/cm in the 4th day. The adhesion force of the PSAs increased slowly but steadily within 49 days when the Latex was incubated at 50° C. with continuous shaking at 200 rpm. No residue was observed on the stainless steel panels.

TABLE 19

| | Storage time (day) | | | | | | |
|---|---|---|---|---|---|---|---|
| | 4 | 10 | 14 | 22 | 31 | 40 | 49 |
| Adhesion force (N/cm) | 0.24 | 0.28 | 0.31 | 0.38 | 0.37 | 0.49 | 0.46 |
| Adhesive remained on panel* | – | – | – | – | – | – | – |

*Legend: –, no adhesive remained on the stainless steel panel.

Example 29

Latex Prepared from Epoxidized Soybean Oil: Phosphoric Acid as Reagent without Using Molecular Sieves (Effect of Reaction Time)

1. Materials and Instruments

Materials and instruments used in this example were the same as those in Example 23.

2. Latex Preparation

Solvent was prepared by mixing 2.0 g of O-phosphoric acid (~4.0% based on ESO) with 25 mL of ethanol (ratio of ethanol to ESO was 0.5:1, volume to weight) in a 250-mL screw cap Erlenmeyer flask at room conditions for a few min. Next, 50 g of ESO was added to the flask with the solvent mixture. The flask was sealed and the mixture reacted in an incubator shaker at 50° C. with continuous shaking at 200 rpm. To evaluate the effects of reaction time on PSA properties, the Latex was sampled for making PSA at reaction times of 1, 6, 12, and 19 days, respectively, as shown in Table 20.

3. Preparation of Pressure Sensitive Adhesives (PSA)

M g (4.5-5.5 g, weighted accurately) of the latex was dissolved in [(100%–27.4%)–27.4%/0.785]*M mL ethanol in a 125-mL Erlenmeyer flask, and shaken manually for 30-60 sec or until the mixture is clear. Then [(7%–4%)*(100%–27.4%)]*M g of phosphoric acid (~3% by weight of ESO) was added to the flask and shaken manually for 30-60 sec or until the mixture became a clear syrup, which was considered the PSA.

4. PSA Curing

PSA curing was carried out as described in Example 23.

5. Adhesion Peel Test

The adhesion peel test was carried out as described in Example 23.

6. Results and Discussion

The 90° peel adhesion test results are summarized in Table 20. The PSA made from the latex had an initial adhesion force of 0.21 N/cm in the first day. The adhesion force of the PSAs increased steadily in 12 days when the Latex was incubated at 50° C. with continuous shaking at 200 rpm and no residue was observed on the stainless steel panels. The adhesion force increased rapidly from 12 days to 19 days, and little residue was observed on the stainless steel panels in the 19th day.

TABLE 20

| Reaction time (day) | 1 | 6 | 12 | 19 |
|---|---|---|---|---|
| Adhesion force (N/cm) | 0.21 | 0.38 | 0.58 | 0.96 |
| Adhesive remained on panel* | – | – | – | + |

*Legend: –, no adhesive remained on the stainless steel panel; +, a little bit adhesive remained on the stainless steel panel.

Example 30

Latex Prepared from Epoxidized Soybean Oil: Phosphoric Acid as Reagent without Using Molecular Sieves (Effect of Reaction Time)

1. Materials and Instruments

Materials and instruments used in this example were the same as those in Example 23.

2. Latex Preparation

Solvent was prepared by mixing 1.75 g of O-phosphoric acid (~3.5% based on ESO) with 50 mL of ethanol (ratio of ethanol to ESO was 1:1, volume to weight) in a 250-mL screw cap Erlenmeyer flask at room conditions for a few min. Next, 50 g of ESO was added to the flask with the solvent mixture. The flask was then sealed and the mixture reacted in an incubator shaker at 50° C. with continuous shaking at 200 rpm. To evaluate the effects of reaction time on PSA properties, the Latex was sampled for making PSA at reaction times of 1 and 9 days, respectively, as shown in Table 21.

3. Preparation of Pressure Sensitive Adhesives (PSA)

M g (4.5-5.5 g, weighted accurately) of the latex was dissolved in [(100%−43.1%)−43.1%/0.785]*M mL ethanol in a 125-mL Erlenmeyer flask, and shaken manually for 30-60 sec or until the mixture is clear. Then [(7%−3.5%)*(100%−43.1%)]*M g of phosphoric acid (~3.5% by weight of ESO) was added to the flask and shaken manually for 30-60 sec or until the mixture became a clear syrup, which was considered the PSA.

4. PSA Curing

PSA curing was carried out as described in Example 23.

5. Adhesion Peel Test

The adhesion peel test was carried out as described in Example 23.

6. Results and Discussion

The 90° peel adhesion test results are summarized in Table 21. The PSA made from the latex had an initial adhesion force of 0.48 N/cm in the first day. The adhesion force of the PSA increased rapidly to 1.77 N/cm when the Latex was incubated at 50° C. with continuous shaking at 200 rpm, and a lot of residue was observed on the stainless steel panels in the 9th day.

TABLE 21

| Reaction time (day) | 1 | 9 |
|---|---|---|
| Adhesion force (N/cm) | 0.48 | 1.77 |
| Adhesive remained on panel* | − | + + |

*Legend: −, no adhesive remained on the stainless steel panel; + +, a lot of adhesive layer remained on the stainless steel panel.

Example 31

Latex Prepared from Epoxidized Soybean Oil: Phosphoric Acid as Reagent without Using Molecular Sieves (Effect of Reaction Time)

1. Materials and Instruments

Materials and instruments used in this example were the same as those in Example 23.

2. Latex Preparation

Solvent was prepared by mixing 1.0 g of O-phosphoric acid (~2% based on ESO) with 50 mL of ethanol (ratio of ethanol to ESO was 1:1, volume to weight) in a 250-mL screw cap Erlenmeyer flask at room conditions for a few min. Next, 50 g of ESO was added to the flask with the solvent mixture. The flask was sealed and the mixture reacted in an incubator shaker at 50° C. with continuous shaking at 200 rpm. To evaluate the effects of reaction time on PSA properties, the Latex was sampled for making PSA at reaction times of 3 and 10 days, respectively, respectively, as shown in Table 22.

3. Preparation of Pressure Sensitive Adhesives (PSA)

M g (4.5-5.5 g, weighted accurately) of the latex was dissolved in [(100%−43.5%)−43.5%/0.785]*M mL ethanol in a 125-mL Erlenmeyer flask, and shaken manually for 30-60 sec or until the mixture is clear. Then [(7%−2%)*(100%−43.5%)]*M g of phosphoric acid (~5% by weight of ESO) was added to the flask and shaken manually for 30-60 sec or until the mixture became a clear syrup, which was considered the PSA.

4. PSA Curing

PSA curing was carried out as described in Example 23.

5. Adhesion Peel Test

The adhesion peel test was carried out as described in Example 23.

6. Results and Discussion

The 90° peel adhesion test results are summarized in Table 22. The PSA made from the latex had an initial adhesion force of 0.22 N/cm in the 3rd day. The adhesion force of the PSA remained unchanged when the Latex was incubated at 50° C. with continuous shaking at 200 rpm for 10 days, and no residue was observed on the stainless steel panels.

TABLE 22

| Storage time (day) | 3 | 10 |
|---|---|---|
| Adhesion force (N/cm) | 0.22 | 0.24 |
| Adhesive remained on panel* | − | − |

*Legend: −, no adhesive remained on the stainless steel panel.

Example 32

Latex Prepared from Epoxidized Soybean Oil: Anhydrous Phosphoric Acid as Reagent without Using Molecular Sieves 1. Materials and Instruments Materials and instruments used in this example were the same as those in Example 26.

2. Latex Preparation

Solvent was prepared by mixing 1.0 g of O-phosphoric acid (99.999% purity, ~2% based on ESO) with 50 mL of ethanol (ratio of ethanol to ESO was 1:1, volume to weight) in a 250-mL screw cap Erlenmeyer flask at room conditions for a few min. Next, 50 g of ESO was added to the flask with the solvent mixture. The flask was then sealed and the mixture reacted in an incubator shaker at 50° C. with continuous shaking at 200 rpm. To evaluate the effects of reaction time on PSA properties, the Latex was sampled for making PSA at reaction times of 10 and 14 days, respectively, as shown in Table 23.

3. Preparation of Pressure Sensitive Adhesives (PSA)

M g (4.5-5.5 g, weighted accurately) of the latex was dissolved in [(100%−43.5%)−43.5%/0.785]*M mL ethanol in a 125-mL Erlenmeyer flask, and shaken manually for 30-60 sec or until the mixture is clear. Then [(7%−2%)*(100%−43.5%)]*M g of phosphoric acid (85% purity, ~5% by weight of ESO) was added to the flask and shaken manually for 30-60 sec or until the mixture became a clear syrup, which was considered the PSA.

4. PSA Curing

PSA curing was carried out as described in Example 23.

5. Adhesion Peel Test

The adhesion peel test was carried out as described in Example 23.

6. Results and Discussion

The 90° peel adhesion test results are summarized in Table 23. The adhesion force of the PSA was unchanged when the Latex was incubated at 50° C. with continuous shaking at 200 rpm for 14 days, and no residue was observed on the stainless steel panels.

TABLE 23

| Storage time (day) | 10 | 14 |
|---|---|---|
| Adhesion force (N/cm) | 0.24 | 0.20 |
| Adhesive remained on panel* | – | – |

*Legend: –, no adhesive remained on the stainless steel panel.

Example 33

Latex Prepared from Epoxidized Soybean Oil: Phosphoric Acid as Reagent without Using Molecular Sieves 1. Materials and Instruments Materials and instruments used in this example were the same as those in Example 23.

2. Latex Preparation

Solvent was prepared by mixing 0.5 g of O-phosphoric acid (~1% based on ESO) with 50 mL of ethanol (ratio of ethanol to ESO was 1:1, volume to weight) in a 250-mL screw cap Erlenmeyer flask at room conditions for a few min. Next, 50 g of ESO was added to the flask with the solvent mixture. The flask was then sealed and the mixture reacted in an incubator shaker at 50° C. for 10 days with continuous shaking at 200 rpm. The latex was sampled for making PSA.

3. Preparation of Pressure Sensitive Adhesives (PSA)

M g (4.5-5.5 g, weighted accurately) of the latex was dissolved in [(100%–43.7%)–43.7%/0.785]*M mL ethanol in a 125-mL Erlenmeyer flask, and shaken manually for 30-60 sec or until the mixture is clear. Then [(7%–1%)*(100%–43.7%]*M g of phosphoric acid (85% purity, ~6% by weight of ESO) was added to the flask and shaken manually for 30-60 sec or until the mixture became a clear syrup, which was considered the PSA.

4. PSA Curing

PSA curing was carried out as described in Example 23.

5. Adhesion Peel Test

The adhesion peel test was carried out as described in Example 23.

6. Results and Discussion

The PSA made from the latex had an initial adhesion force of 0.12 N/cm in the 10th day, and no residue was observed on the stainless steel panels.

Example 34

Latex Prepared from Epoxidized Soybean Oil: Phosphoric Acid as Reagent without Using Molecular Sieves 1. Materials and Instruments Materials and instruments used in this example were the same as those in Example 23.

2. Latex Preparation

Solvent was prepared by mixing 0.5 g of O-phosphoric acid (~1% based on ESO) with 50 mL of ethanol (ratio of ethanol to ESO was 1:1, volume to weight) in a 250-mL screw cap Erlenmeyer flask at room conditions for a few min. Next, 50 g of ESO was added to the flask with the solvent mixture. The flask was sealed and the mixture reacted in an incubator shaker at 50° C. for 3 days with continuous shaking at 200 rpm. The latex was sampled for making PSA.

3. Preparation of Pressure Sensitive Adhesives (PSA)

M g (4.5-5.5 g, weighted accurately) of the latex was dissolved in [(100%–43.7%)–43.7%/0.785]*M mL ethanol in a 125-mL Erlenmeyer flask, and shaken manually for 30-60 sec or until the mixture is clear. Then [(6%–1%)*(100%–43.7%)]*M g of phosphoric acid (85% purity, ~5% by weight of ESO) was added to the flask and shaken manually for 30-60 sec or until the mixture became a clear syrup, which was considered the PSA.

4. PSA Curing

PSA curing was carried out as described in Example 23.

5. Adhesion Peel Test

The adhesion peel test was carried out as described in Example 23.

6. Results and Discussion

The PSA made from the latex had an initial adhesion force of 0.13 N/cm and no residue was observed on the stainless steel panels.

Example 35

Latex Prepared from Epoxidized Soybean Oil: Anhydrous Phosphoric Acid as Reagent without Using Molecular Sieves 1. Materials and Instruments Materials and instruments used in this example were the same as those in Example 26.

2. Latex Preparation

Solvent was prepared by mixing 1.5 g of O-phosphoric acid (99.999% purity, ~3% based on ESO) with 50 mL of ethanol (ratio of ethanol to ESO was 1:1, volume to weight) in a 250-mL screw cap Erlenmeyer flask at room conditions for a few min. Next, 50 g of ESO was added to the flask with the solvent mixture. The flask was then sealed and the mixture reacted in an incubator shaker at 50° C. with continuous shaking at 200 rpm. To evaluate the effects of reaction time on PSA properties, the Latex was sampled for making PSA at reaction times of 1, 9, 13, and 18 days, respectively, as shown in Table 24.

3. Preparation of Pressure Sensitive Adhesives (PSA)

M g (4.5-5.5 g, weighted accurately) of the latex was dissolved in [(100%–43.3%)–43.3%/0.785]*M mL ethanol in a 125-mL Erlenmeyer flask, and shaken manually for 30-60 sec or until the mixture is clear. Then [(6.5%–3%)*(100%–43.3%)]*M g of phosphoric acid (85% purity, ~3.5% by weight of ESO) was added to the flask and shaken manually for 30-60 sec or until the mixture became a clear syrup, which was considered the PSA.

4. PSA Curing

PSA curing was carried out as described in Example 23.

5. Adhesion Peel Test

The adhesion peel test was carried out as described in Example 23.

6. Results and Discussion

The 90° peel adhesion test results are summarized in Table 24. The PSA made from the latex had an initial adhesion force of 0.44 N/cm in the first day, and increased to 0.63 N/cm in the 9th day when the Latex was incubated at 50° C. with continuous shaking at 200 rpm and no residue was observed on the stainless steel panels. Although the adhesion force was unchanged, a little residue was observed on the stainless steel panels during the 18th day.

TABLE 24

| Reaction time (day) | 1 | 9 | 13 | 18 |
|---|---|---|---|---|
| Adhesion force (N/cm) | 0.44 | 0.62 | 0.82 | 0.78 |
| Adhesive remained on panel* | − | − | − | + |

*Legend: −, no adhesive remained on the stainless steel panel; +, a little bit adhesive remained on the stainless steel panel.

Example 36

Latex Prepared from Epoxidized Soybean Oil: Anhydrous Phosphoric Acid as Reagent without Using Molecular Sieves 1. Materials and Instruments Materials and instruments used in this example were the same as those in Example 26.

2. Latex Preparation

Solvent was prepared by mixing 1.5 g of O-phosphoric acid (99.999% purity, ~3% based on ESO) with 50 mL of ethanol (ratio of ethanol to ESO was 1:1, volume to weight) in a 250-mL screw cap Erlenmeyer flask at room conditions for a few min. Next, 50 g of ESO was added to the flask with the solvent mixture. The flask was then sealed and the mixture reacted in an incubator shaker at 50° C. with continuous shaking at 200 rpm. To evaluate the effects of reaction time on PSA properties, the Latex was sampled for making PSA at reaction times of 3, 4, 7, 10, 14, and 17 days, respectively, as shown in Table 25.

3. Preparation of Pressure Sensitive Adhesives (PSA)

M g (4.5-5.5 g, weighted accurately) of the latex was dissolved in [(100%−43.3%)−43.3%/0.785]*M mL ethanol in a 125-mL Erlenmeyer flask, and shaken manually for 30-60 sec or until the mixture is clear. Then [(6%−3%)*(100%−43.3%)]*M g of phosphoric acid (85% purity, ~3% by weight of ESO) was added to the flask and shaken manually for 30-60 sec or until the mixture became a clear syrup, which was considered the PSA.

4. PSA Curing

PSA curing was carried out as described in Example 23.

5. Adhesion Peel Test

The adhesion peel test was carried out as described in Example 23.

6. Results and Discussion

The 90° peel adhesion test results are summarized in Table 25. The PSA made from the latex had an initial adhesion force of 0.44 N/cm in the 3rd day. The adhesion force of the PSAs increased steadily in 7 days when the Latex was incubated at 50° C. with continuous shaking at 200 rpm and no residue was observed on the stainless steel panels. A little residue was observed on the stainless steel panels in the 10th day, and a lot of adhesive residues were observed after 2 weeks of reaction.

TABLE 25

| | Reaction time (day) | | | | | |
|---|---|---|---|---|---|---|
| | 3 | 4 | 7 | 10 | 14 | 17 |
| Adhesion force (N/cm) | 0.21 | 0.54 | 0.58 | 0.62 | 0.82 | No test |
| Adhesive remained on panel* | − | − | − | + | ++ | ++ |

*Legend: −, no adhesive remained on the stainless steel panel; +, a little bit adhesive remained on the stainless steel panel; ++, a lot of adhesive layer remained on the stainless steel panel.

Example 37

Qualitative Polymerization Assays with Various Acid Catalysts

In this Example, various acid catalysts were used for preparation of PSAs from plaint oils. 1:1 mixtures of epoxidized soybean oil and hydroxylated soybean oil (FIG. 1) were mixed in the presence of 10 mol % of various acid catalysts listed in Table 26 below.

TABLE 26

| Acid/Lewis acid | HCl/ diethyl ether | TiCl/ $CH_2Cl_2$ | $CF_3SO_3H$/ $CH_2Cl_2$ | $HClO_4$ (70% in water) | $H_3PO_4$ (85% in water) |
|---|---|---|---|---|---|
| Formation of a tacky film | − | + | + | + | + |
| Timescale of polymerization | − | 1-2 seconds | 1-2 seconds | 5 minutes | 5 minutes |

Example 38

PSA from High Oleic Sunflower Oil

For this Example, high oleic sunflower oil was used as the raw material. The sunflower oil was first epoxidized by dissolving in methylene chloride and meta-chloroperberizoic acid (M-CPBA). Hydroxyl groups were added to the epoxidized oil to partially hydroxylize the oil using 1% perchloric acid ($HClO_4$) in $H_2O$/THF (2/3) solvent for 6 hours. Reaction times can be varied depending on type of acids used and adhesion strength required. After removing solvent and washing out the $HClO_4$, about 0.01% of acid (i.e., trifluoric acetic acid (TFA), phosphoric acid, perchloric acid, sulfuric acid, or triflic acid) was added to the partially epoxidized and partially hydroxylized oil, and well mixed. The sample was then coated onto various substrates, and cured at 90° C. for 40 min.

Based on NMR analysis, the ratio of epoxidized sites and hydroxyl groups was about 2:1 at mole base for the $HCLO_4$ sample. This concept was confirmed by mixing pure epoxidized oil with pure dihydroxyl oil at ratio of 1:2 (mole base) in the presence of small amount of TFA.

Adhesion strength was roughly tested following the standard method for PSA for loop test (ASTM D6195-03). The adhesion strength of the plant oil-based PSA sample was 11.6 Kpa (on paper) and 14.6 KPa (on aluminum foil). Commercial PSA tested with paper has an adhesion strength of 20.6 KPa for Scotch® tape, 16.5 KPa for label tape, 25.9 KPa for packaging tape, and 18.8 KPa for Duct tape. TFA and phosphoric acid resulted in better adhesion.

Example 39

Chemical Structures and Mechanisms of ESO PSAs

Figure 2:
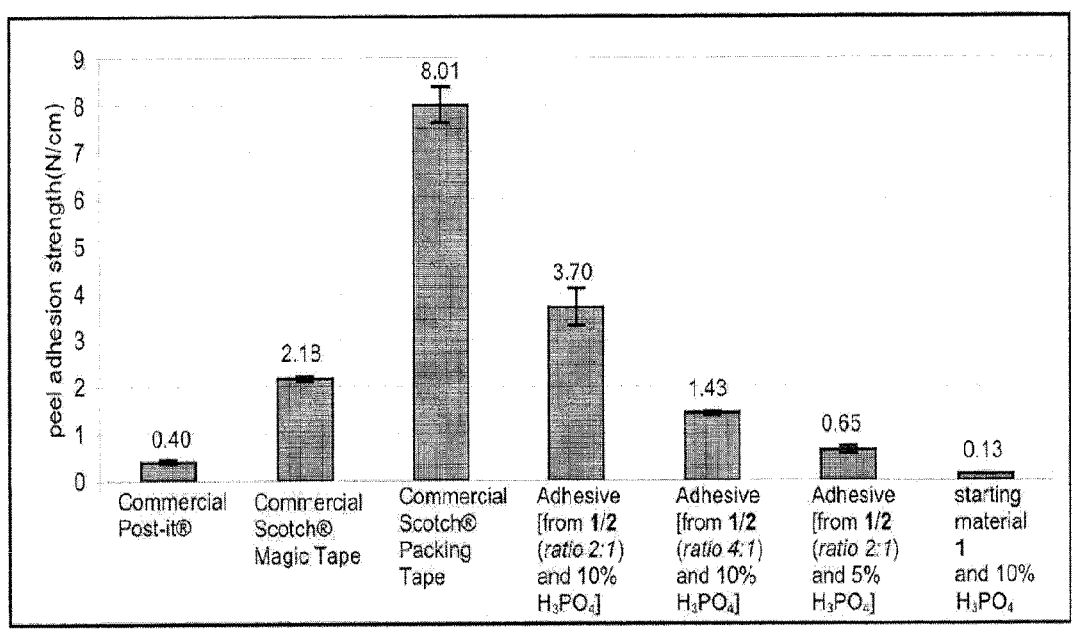
FIG. 2 is a graph comparing the peel adhesion strength of the inventive PSAs to several commercially-available adhesives from Example 39.

Mixtures of ESO (1) and DSO (2) in methanechloride (50 w/w % solution) were treated with $H_3PO_4$ (10 w/w % of ESO) and within 10 minutes a noticeable increase in viscosity and stickiness were observed. After overnight drying at room temperature on a polyterephthalate (PET) film, the ESO/DSO polymer had formed that displayed considerable peel strength. The peel strength of the PSA was, to a large part, dependent on the ratio of 1 to 2. By using a 2:1 mixture of 1 and 2 we obtained a stronger peel adhesion strength than commercial Magic Tape (FIG. 2). Changing the ratio to 4:1 and reducing amount of $H_3PO_4$ to 5% (w/w) resulted in decreased peel strength.

Figure 3:
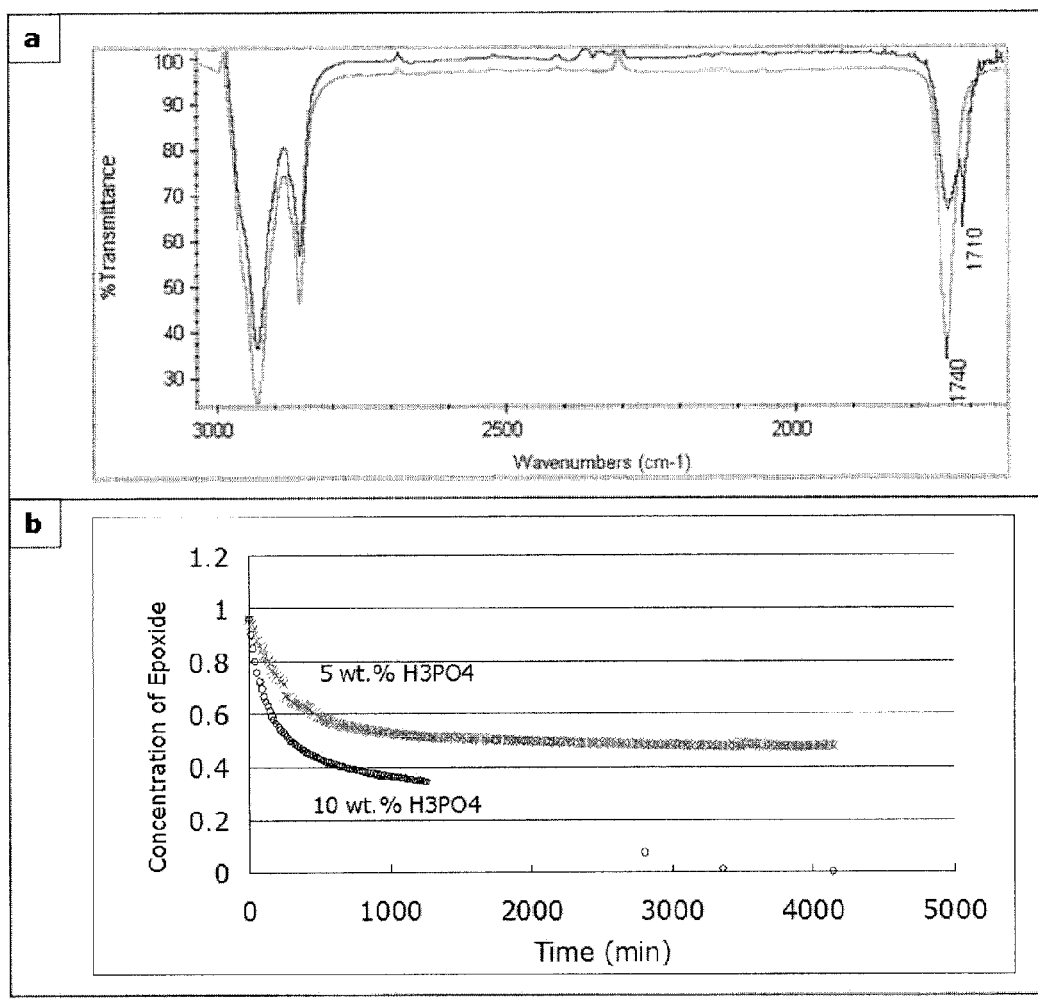
FIG. 3a shows the Fourier transform infrared (FTIR) spectra from the shelf-life analysis of the PSAs in Example 39.
FIG. 3b is a graph of the progression of reducing epoxide monitored by $^1$H NMR spectroscopy in Example 39.

However, despite the outstanding peel strength of 2:1 (ESO:DSO) with 10 w/w % $H_3PO_4$, it disintegrates noticeably, rendering an oil after 1 month of storage. A newly appeared carboxylic peak at 1710 on Fourier transform infrared (FTIR) spectra (FIG. 3a) demonstrates that triglyceride ester crosslinkages were broken in the presence of moisture via acid-catalyzed ester hydrolysis. In order to try to obtain improved shelf life, liquid-liquid extraction was conducted; however, polar tackfier (DSO) was washed out with the water layer even after several trials of centrifugation at 1,000-3,000 rpm for 1-15 min.; resulting in a loss of adhesion properties which was easily noticed by hand after drying. The amount of $H_3PO_4$ that might be consumed when establishing phosphate crosslinkage was then reduced to determine its effect. Tracking the progression of reducing epoxide [δ 2.84 ($CH_{epoxide}$)] monitored by $^1H$ NMR spectroscopy revealed that phosphoric acid was completely consumed by reducing the amount (FIG. 3b). The epoxide concentration was determined for each data point by $^1H$ NMR integration of the CH-epoxide signal. Based on this result, an improved shelf life of a PSA with 5% (w/w) $H_3PO_4$ was obtained. There was no degradation into oil in when stored under ambient conditions for more than 6 months.

Figure 4:
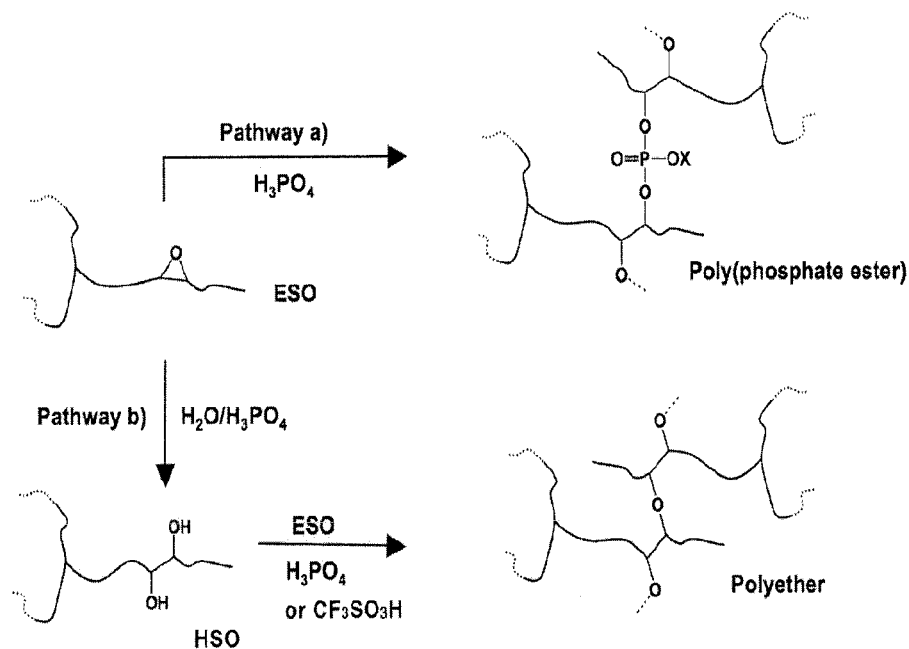
FIG. 4 is a reaction scheme of the polymerization and crosslinking that occurs during formation of the inventive PSAs in Example 39.
Figure 4:
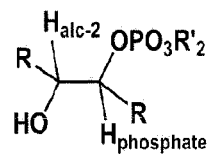
Figure 4:
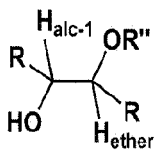
Figure 4:
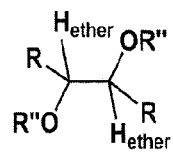
Figure 4:
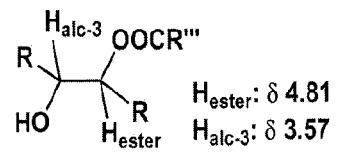

In order to understand the nature of the underlying polymeric networks on a chemical level, we investigated the possibility of both phosphate ester as well as polyether linkages. (FIG. 4). The formation of 2-hydroxyphosphates from epoxides and phosphoric acid consistent with pathway a is known. On the other hand, ample precedence for the establishment of ether networks from the acid-catalyzed reaction of epoxides with nucleophilic alcohols via an activated monomer mechanism (AM) consistent with pathway b has also been provided. If pathway b contributes to the overall polymeric network at least in part, calculated addition of polyols to the reaction mixture would amplify initiation events during polymerization. This would allow for the control of molecular weight at a level suitable for generation of PSAs.

Figure 5:
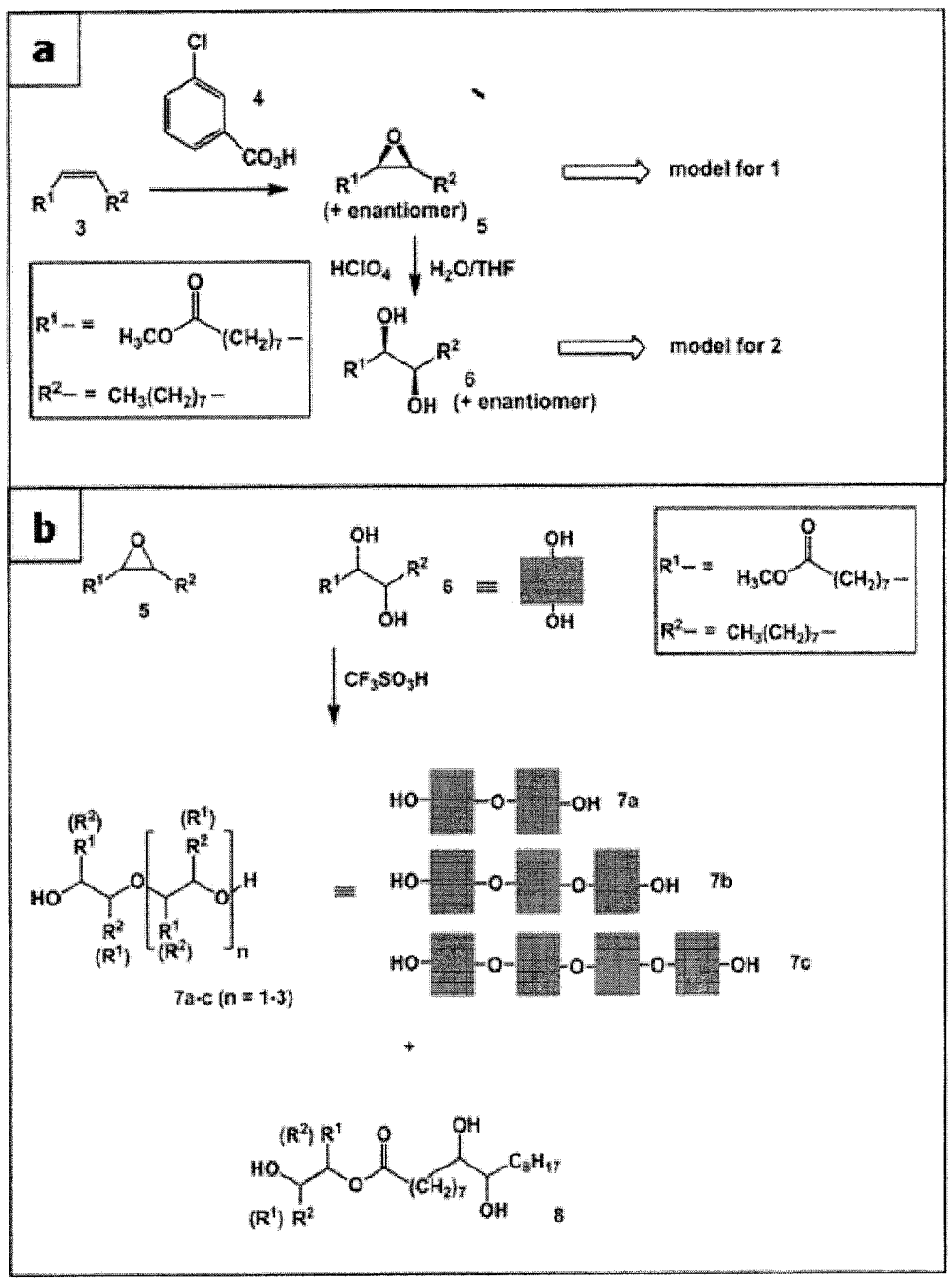
FIGS. 5a-b show reaction schemes for the investigation of the chemical crosslinking from Example 39.

To rationally understand and manipulate to polymer formation from 1 and 2 in the presence of $H_3PO_4$ we embarked on mechanistic investigations on the establishment of chemical connections in the cross-links. In doing so, we substituted soybean oil derivatives 1 and 2, that constitute mixtures of triglyceride esters, with less complex single-chain model compounds 5 and 6; compound 5 was derived from epoxidation of methyl oleate (3) with meta-chlorobenzoic acid, (4) (FIG. 5a).

Figure 6:
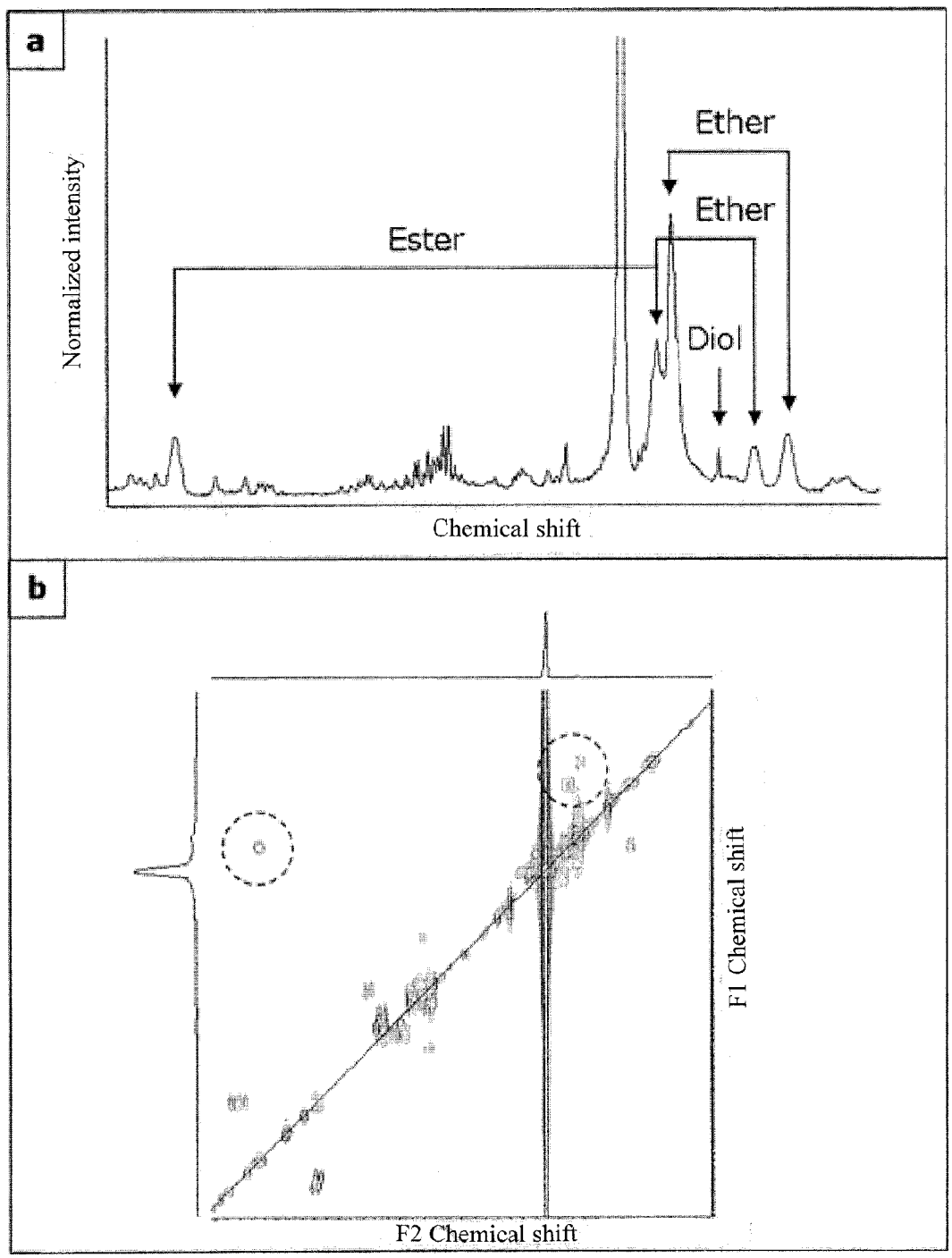
FIGS. 6a-6b show the NMR analyses of reaction of compounds 5 and 6 with $CF_3SOH$ in Example 39.

In order to probe for the possibility an acid catalyzed polymerization analogous to pathway a (FIG. 4), we mixed 5 and 6 in the presence of the strong acid trifluoromethanesulfonic acid ($CF_3SOH$). A rapid gelation occurred within 1-2 seconds of adding $CF_3SO_3H$ and subsequent $^1H$ NMR analysis revealed the formation of Polymer-1-2-T (FIG. 5b) containing a mixture of short chain polyethers (7). Their structural identity was confirmed by $^1H$-$^1H$ COSY nuclear magnetic resonance (NMR) (FIG. 6a); the cross-peaks between two alcoholic C—H signals ($H_{alc-1}$, FIG. 4) at δ 3.31 and 3.22 that were residing in the direct vicinity of ether linkages ($H_{ether}$) at δ 3.51 (FIG. 4) were particularly revealing. During the reaction, 9(10)-hydroxy-10(9)-di (or tri) stearate (8) (FIG. 4) was produced as a by-product from acid-catalyzed transesterification; this was verified by a cross-peak between an esterified secondary alcohol signal ($H_{ester}$, δ 4.81) and a separate alcohol signal ($H_{alc-3}$, δ 3.57) (FIG. 6).

Electrospray ionization mass spectroscopy (ESI-MS) of Polymer-5-6-T revealed the presence of oligomer 7a-b, which contained 2-3 repeat units (m/z=665.5, 977.8). No incorporation products containing the $CF_3SO_3$-moieties into any of the products were observed by ESI-MS.

Figure 7:
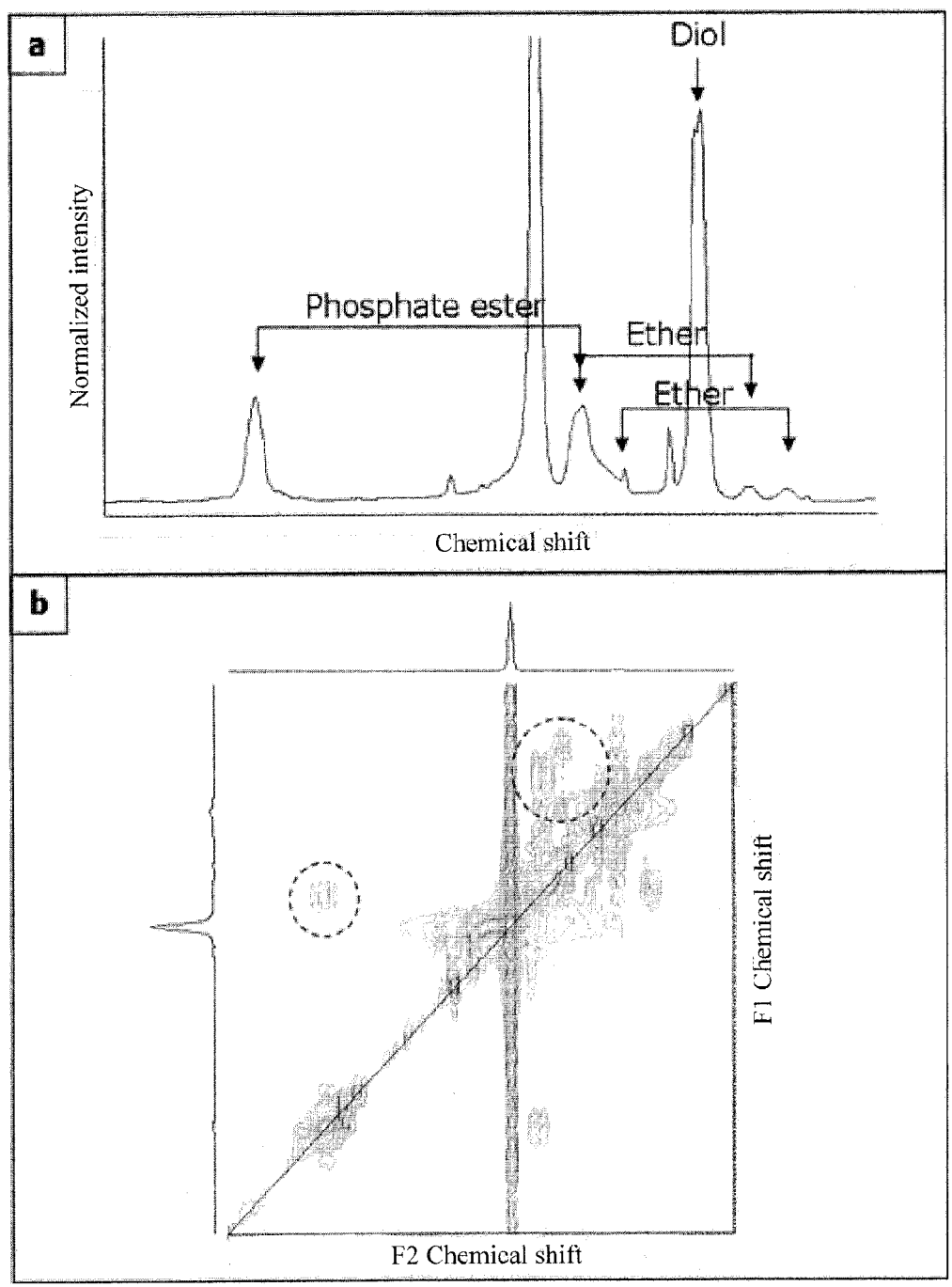
FIGS. 7a-7b show the NMR analyses of reaction of compounds 5 and 6 with $H_3PO_4$ in Example 39.
Figure 8:
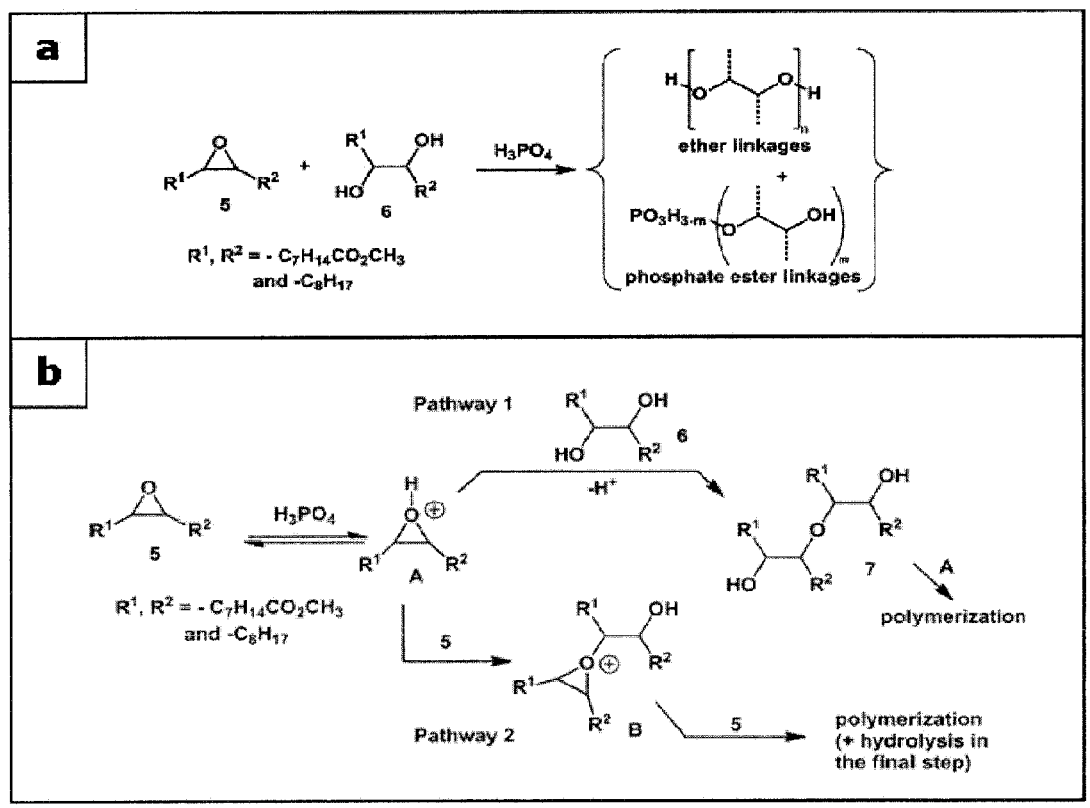
FIGS. 8a-8b show reaction pathways for formation of the PSA polymers in Example 39.

The formation of Polymer-5-6-P from 2:1 mixtures of 5 and 6 in the presence of $H_3PO_4$ was followed by $^1H$ NMR spectroscopy in $CDCl_3$. Product signals at δ 3.54-3.59 ($H_{ether}$, FIG. 7) and δ 3.31, 3.22 ($H_{alc-1}$) were nearly identical to $^1H$ NMR signals from Polymer-5-6-T (FIG. 5b) and indicate that polyether formation does in fact occur in the reaction of 5 and 6 in the presence of $H_3PO_4$. In addition, we detected three partially overlapping signals in the range of δ4.07-4.32 that we attributed to the presence of phosphate esters ($H_{phosphate}$ FIG. 5a). Rapid early growth of the signal at d 4.09 was interpreted as the initial build-up of a monophosphate-moieties (FIG. 8a, m=1).

The ESI-MS spectra of Polymer-5-6-P in the positive ion mode showed $Na^+$-adducts of polyethers 7a-c (FIG. 5b) as well as tertiary phosphate esters 10-12. Compound 11 represents a hybrid system that contains ethers and phosphate linkages. In contrast, acidic primary and secondary phosphate esters 13-17 were detected in the negative ion mode as [M-$H^+$] phosphate anions. In comparison, Polymer-5-6-T (formed from 5 and 6 and trifluoromethanesulfonic acid) displayed peaks from polyethers 7a-b (as $Na^+$ adducts). This highlights that phosphate ester formation occur parallel with polyether formation. The reaction of 5 with $H_3PO_4$ in the absence of 6 produced the expected signals associated with phosphate ester cross-linkages δ 4.09-4.32 ($H_{phosphate}$) and ether moieties at δ 3.58-3.63 ($H_{ether}$). Moreover, the appearance of diol 6 (δ 3.39) from apparent epoxide hydrolysis was detected. This demonstrates that the nature of cross-links is identical in both Polymer-5-P and Polymer-5-6-P. Apparently, their different material properties are the consequence of different molecular weights which in turn are modulated by the relative abundances of epoxide 5 and diol 6 in the original mixture.

Figure 9:
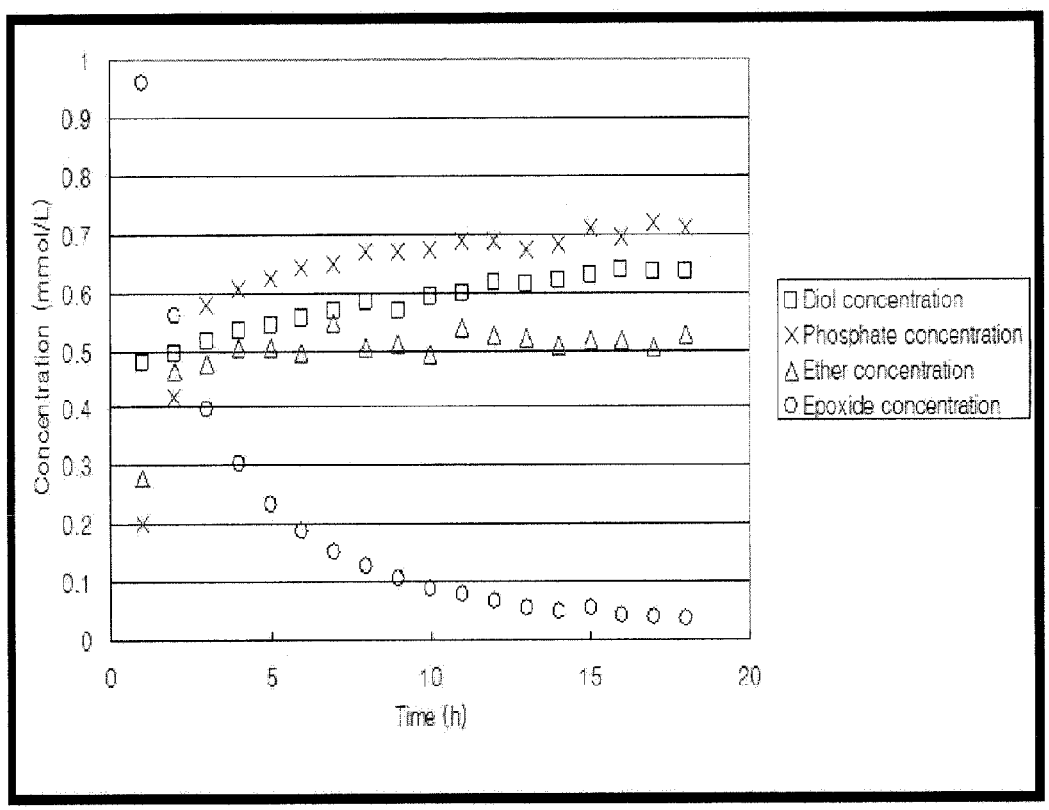
FIG. 9 is a graph of $^1$H NMR spectroscopy results from tracking the formation of Polymer-5-6-P from epoxide 5, diol 6, and $H_3PO_4$ in Example 39.

Tracking the formation of Polymer-5-6-P from epoxide 5, diol 6 and $H_3PO_4$ by $^1H$ NMR spectroscopy (FIG. 9) revealed a near-constant ratio of total ether integral to total phosphate ester integral over the course of the reaction (1:1.4). We also found that diol 6, which was absent at the beginning of the reaction, was built up over time presumably from hydrolysis of 5 and residual water from the 85% $H_3PO_4$ solution. Two possible routes (Pathways 1 and 2, FIG. 8b) could explain the formation of (poly) ethers under the reaction conditions. In pathway 1, diol 6 acts as the nucleophile to attack an activated oxonium species A (derived from O-protonation of 5) in an alcoholysis reaction. The formed 'dimer' 7 would engage in further attacks on A in the context of a living polymerization. This route would therefore incorporate exactly one molecule 6 into the growing chain. In the alternative pathway 2, intermediate A is nucleophilically attacked by another epoxide molecule 5 to form trialkyloxonium species B. Polymerization would continue in this manner until hydrolysis occurs in the termination step. Unlike Pathway 1, no incorporation of diol 6 into the growing chain would be expected in Pathway 2.

Figure 10:
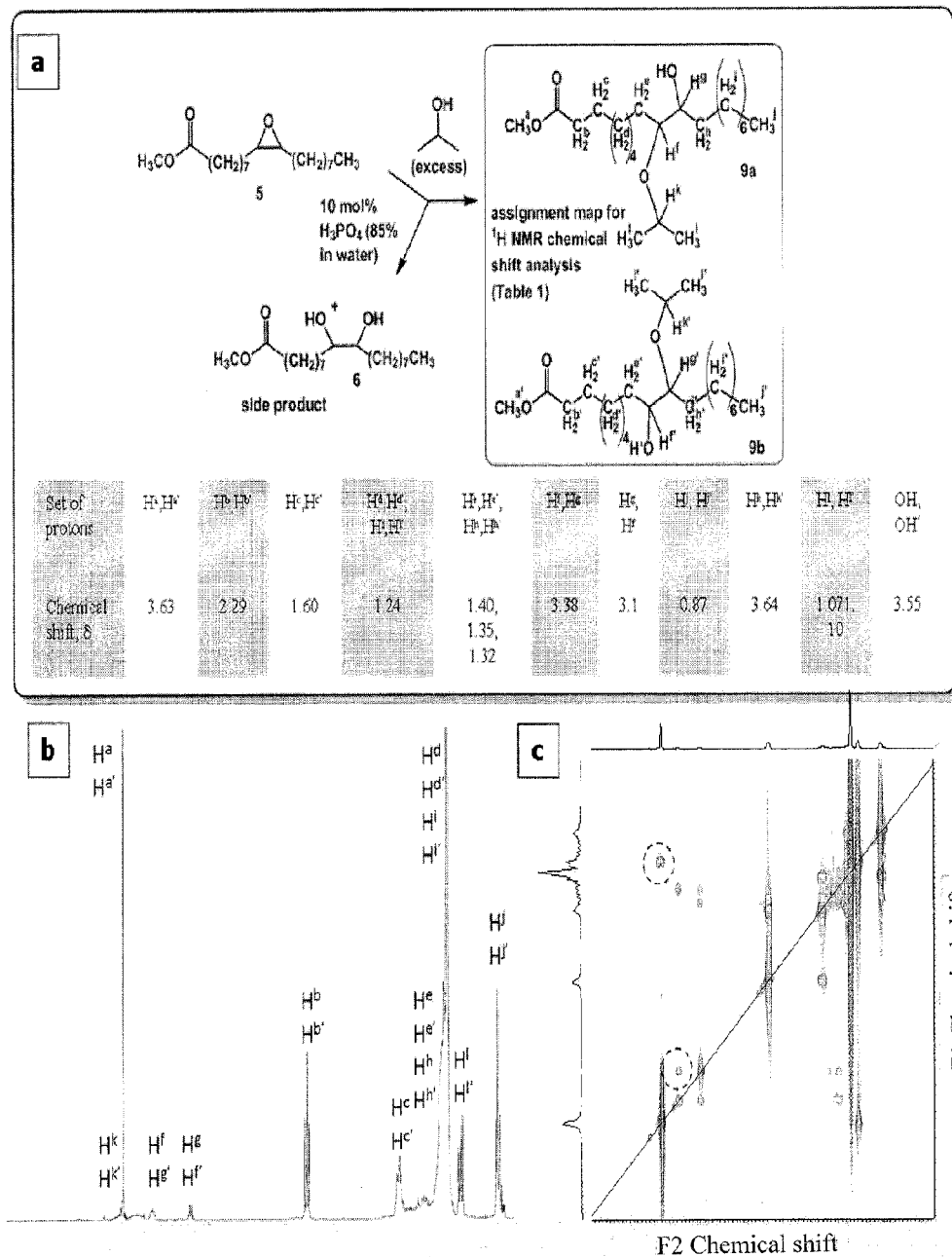
Figure 11:
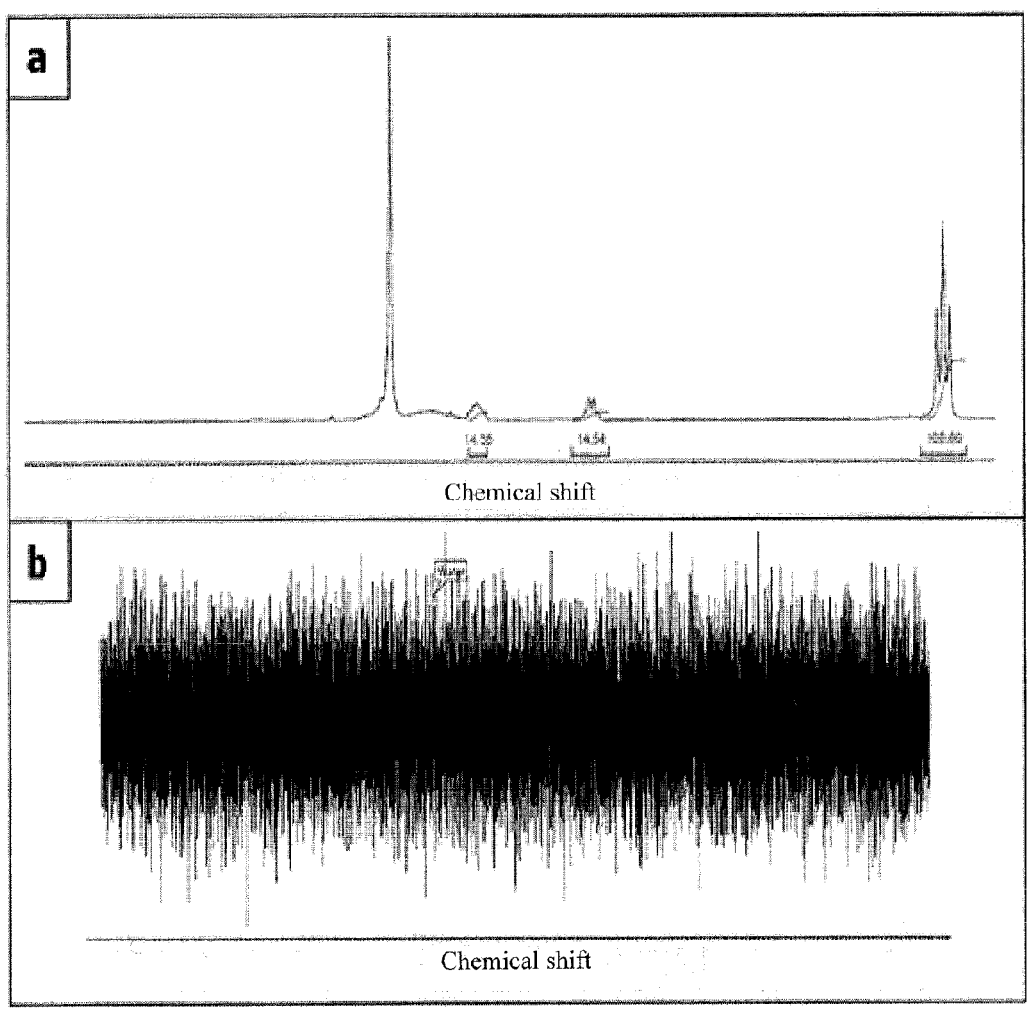

To assess the general viability of alcoholysis reactions involving epoxide 5 (in accordance with pathway 1 in FIG. 8b), we substituted diol 6 in an exploratory experiment with the secondary alcohol i-propanol, that has spectroscopically distinct features. Mixing one equivalent of epoxide 5 with a 78-fold excess of i-propanol in 10 wt. % of $H_3PO_4$ (85% solution in water) produced the regioisomeric alcoholysis products 9a-b in 60% isolated yield (FIG. 10a), while diol 6 was formed in 22. 5% due to hydrolysis. $^1H$ NMR spectroscopy of 9a-b revealed the presence of both alcoholic and ethereal C—H bonds in a 1:1 ratio by integration (FIG. 11a). With the help of $^1H$-$^1H$ COSY NMR (FIG. 10c), we were able to unambiguously identify the signal for the isopropyl-ether proton (C—$H^k$ in FIG. 10) at δ 3.64 due to its cross-peaks with characteristic isopropyl methyl signals at δ 1.10 and δ 1.07. Further analysis of the $^1H$-$^1H$ COSY NMR spectrum revealed the occurrence of a set of diastereotopic protons for either $H^e$ or $H^h$ with a combined total of three different signals. This indicates the proximity of $H^e$ and $H^h$ to a nearby stereocenter(s) consistent with the chiral nature of 9a-b. A similar splitting also occurred for the diastereotopic methyl groups bearing $H^1$. This observation confirms the stereospecific attachment of the isopropyl group to a chain that already contains stereocenters, which is expected for an $S_N2$ attack of the alcohol to a cis-epoxide 5. The complete chemical shift assignment can be found in FIG. 8. A silent $^{31}P$ NMR spectrum (FIG. 11b) for 9a-b confirms the notion that phosphate esters are not part of this covalent scaffold. The formation of hydroxyethers 9a-b is in support of the general feasibility of an alcoholysis reaction (pathway 1, FIG. 8b). The 3:1 product ratio of alcoholysis adducts 9a-b and hydrolysis product 6 compared to a 311:1 ratio of i-propanol and water (from the 85% aqueous solution of $H_3PO_4$) mean that the relative rate of alcoholysis to hydrolysis is 1:103.

Figure 12:
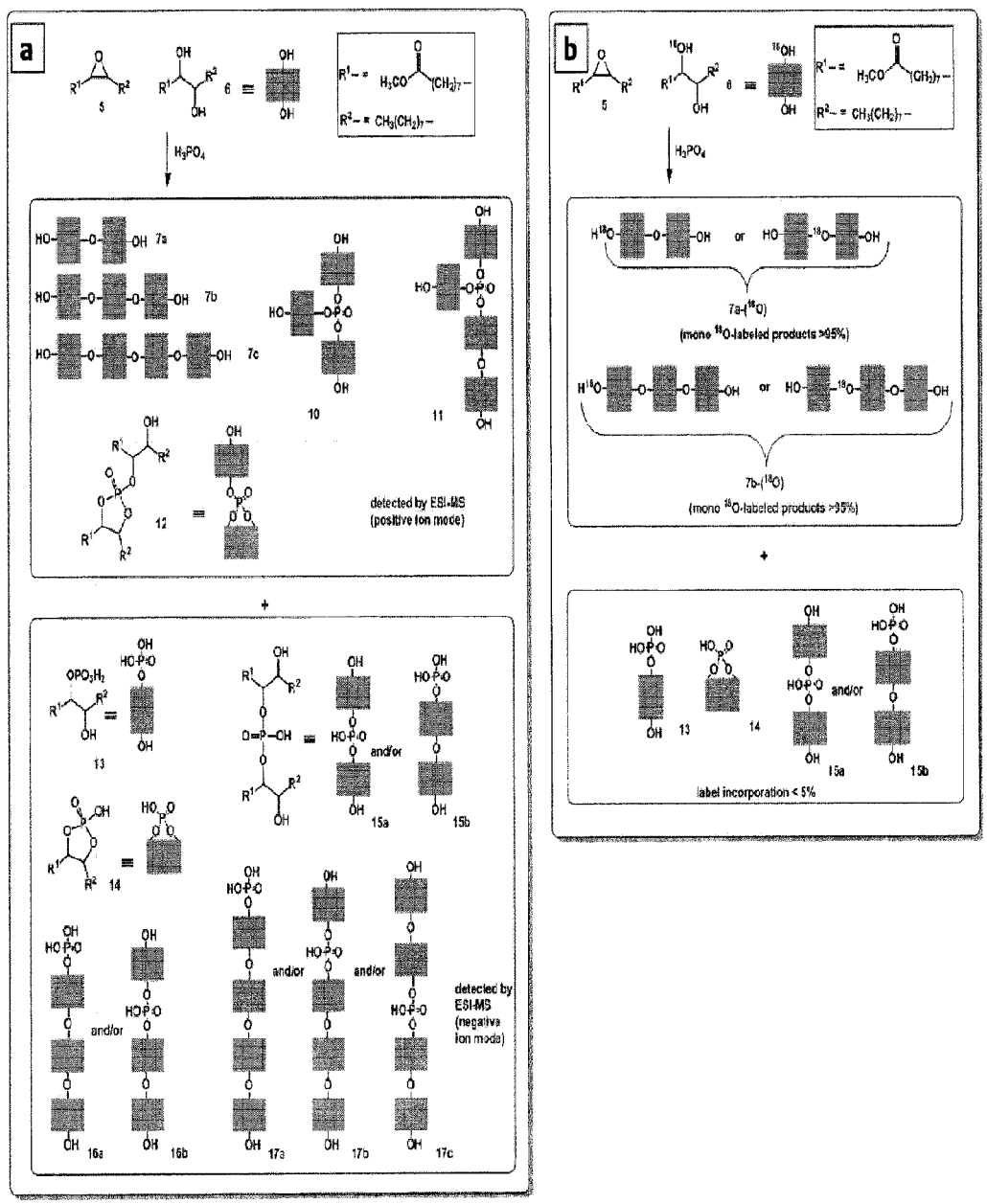
FIGS. 12a-12b are reaction schemes showing the potential incorporation of the diol into polymeric products using isotopically labeled starting materials of diol 6-($^{18}$O)

While alcoholysis is in principle possible with 5 and an excess of a secondary alcohol, we still needed to unambiguously differentiate between pathway 1 or pathway 2 during polyether formation in Polymer-5-6-P (FIG. 8b). Using isotopically labeled starting materials of diol 6-($^{18}O$) would allow us to use mass spectroscopy to determine the potential incorporation of the diol into polymeric products (FIG. 12).

For that purpose, we synthesized the mono-$^{18}O$-enriched diol 6-($^{18}O$) from acid-catalyzed hydrolysis of epoxide 5 and $H_2^{18}O$. Subsequently, a 2:1 mixture of 5 and 6-($^{18}O$) was reacted in the presence of 10 wt. % $H_3PO_4$ (*5% solution in water), and the resultant product mixture [Polymer-5-6-($^{18}O$)—P] was analyzed by ESI-MS (FIG. 12b). Compounds 7a-($^{18}O$) and 7b-($^{18}O$) were identified as mono-labeled ethers with isotopic enrichments of 95%. Interestingly, the trimeric bis-ether 7b-($^{18}O$) also carried only one $^{18}O$-label. The formation of 7a-($^{18}O$) and 7b-($^{18}O$) provides strong evidence for an alcoholysis mechanism (Pathway 1, FIG. 8b) that is based on the nucleophilic attack of 6-($^{18}O$) to unlabeled intermediate A to form 7a-($^{18}O$) in the initiation step. Addition of 'dimer' 7a-($^{18}O$) to another unlabeled molecule A produced mono-labeled trimer 7b-($^{18}O$), underscoring a living polymerization mechanism. This is consistent with the view that 6-($^{18}O$) is an initiator but not a propagator.

The ESI-MS spectrum of Polymer-5-6-($^{18}O$)—P in the negative ion mode produced peaks for 13, 14, and 15 as the phosphate-containing species in this run (FIG. 12b). None of these signals displayed any appreciable $^{18}O$-incorporation (<5%). This finding supports the notion that phosphate ester cross-links are generated from 5 and $H_3PO_4$ but not from potential condensation reactions between 6-($^{18}O$) and $H_3PO_4$.

A. Experimental

1. General. NMR Analyses.

$^1H$ NMR, $^1H$-$^1H$ COSY NMR and $^{31}P$ NMR spectra for our samples were recorded quantitatively using a Varian S spectrometer (Varian Inc, Palo Alto, USA) at observing frequencies of 499.84 for $^1H$ and 202.35 MHz for $^{31}P$, respectively, on a 3 mm penta probe. The sample solutions were prepared in $CDCl_3$ in 15% v/v concentrations. $^1H$ NMR spectra were obtained with 32 scans at a delay time of 1 s between scans. $^1H$-$^1H$ COSY spectra were obtained with 128 increments and 4 scans for each increment. A sinebell function was used during processing for both dimensions. $^{31}P$ NMR spectra were obtained with 1000 scans at a delay time of 3 s between scans. ESI-MS. Electrospray Ionization spectra were acquired on a LCT Premier (Waters Corp., Milford Mass.) time of flight mass spectrometer. The instrument was operated at 10,000 resolution (W mode) with dynamic range enhancement that attenuates large intensity signals. The cone voltage was 60 eV. Spectra were acquired at 16666 Hz pusher frequency covering the mass range 100 to 1200 u and accumulating data for 2 seconds per cycle. Mass correction for exact mass determinations was made automatically with the lock mass feature in the MassLynx data system. A reference compound in an auxiliary sprayer was sampled every third cycle by toggling a "shutter" between the analysis and reference needles. The reference mass was used for a linear mass correction of the analytical cycles. Samples were presented in acetonitrile as a 20 ul loop injection using an auto injector (LC PAL, CTC Analytics AG, Zwingen, Switzerland).

2. 9,10-Epoxy Methyl Stearate (5).

A solution of methyl oleate (4.5 g, 15 mmol) in 100 mL dichloromethane was stirred at 0° C., and a solution of mCPBA (4) (7.9 g, 46 mmol) in 50 mL dichloromethane was added gently. After completion, the temperature was raised to room temperature, and the mixture was stirred for another 18 h. Subsequently, the solvent was removed via a rotary evaporator. In a separatory funnel, the crude material was washed with 2×120 mL saturated sodium bisulfite solution and extracted with 2×150 mL diethyl ether. The ethyl ether solution was separated and washed with 120 mL sodium bicarbonate. The organic layer was dried over anhydrous magnesium sulfate and filtered, and the solvent was removed by a rotary evaporator. The crude material was purified by column chromatography (silica; hexane/ethyl acetate 99:1 to 80:20 gradient), producing 9,10-epoxy methyl stearate (5) as a clear oil in 87% yield after drying under high vacuum. $^1H$ NMR ($CDCl_3$, 500 Mhz): δ 3.61 (s, 3H), 2.84 (m, 2H), 2.25 (t, J=7.5 Hz, 2H), 1.57 (m, 2H), 1.50-1.17 (m, 24H), 0.83 (t, J=7.6 Hz, 3H).

3. 9,10-Dihydroxy Methyl Stearate (6).

5 (3.0 g, 9.6 mmol) was stirred with 15 mL perchloric acid (10% in water) in 150 mL THF/water (3/2) for 20 h. Subsequently, 120 mL diethyl ether was added, and the aqueous layer was removed in a separatory funnel. The organic layer was then washed with 2×150 mL saturated sodium bicarbonate, dried over anhydrous magnesium sulfate, and filtered. After the solvent was removed with a rotary evaporator, the crude material was purified by column chromatography (silica; hexane/ethyl acetate 99:1 to 80:20 gradient) and dried under high vacuum to obtain a white powder in 80% yield. $O^{18}$ labeled 6 for mechanistic study was synthesized in 1/10 scale. $^1H$ NMR ($CDCl_3$, 500 Mhz): δ 3.66 (s, 3H), 3.39 (m, 2H), 2.29 (t, J=7.5 Hz, 2H), 2.1 (bs, 2H), 1.57 (m, 2H), 1.55-1.20 (m, 24H), 0.87 (t, J=7.6 Hz, 3H).

4. Reaction of Epoxide 5 and Diol 6 in the Presence of $CF_3SO_3H$.

A 2:1 mixture of 5 (0.06 g, 0.192 mmol) and 6 (0.0317 g, 0.096 mmol with 10 w/w % of trifluoromethanesulfonic acid (0.006 g, 0.039 mmol) in $CDCl_3$ (200 μL) within an NMR tube (3 mm). ESI-MS, $^1$H NMR and $^1$H-$^1$H COSY in CDCl$_3$ (500 MHz) were acquired. Key signals were identified for 7: δ 3.22 and 3.31 (R"R'HCOC(R$_2$)—H$_{alcohol}$ for various R' and R"); δ 3.53 (broad) for various HOC(R$_2$)—H$_{ether}$. A side product [9(10)-hydroxy-10(9)-di (or tri) stearate (8)] resulting from transesterification was detected: δ 4.81 RCO$_2$CR'R" and alcohol signal coupling with ester at δ 3.57 in 8.

5. Reaction of Epoxide 5 and Diol 6 in the Presence of H$_3$PO$_4$.

A 2:1 mixture of 5 (0.06 g, 0.192 mmol) and 6 (0.0317 g, 0.096 mmol) together with 10 w/w % (0.006 g, 0.06 mmol) of H$_3$PO$_4$ were agitated in CDCl$_3$ (200 μL) within an NMR tube (3 mm). ESI-MS, $^1$H NMR and $^1$H-$^1$H COSY in CDCl$_3$ (500 MHz) were acquired. For kinetic NMR experiment, avoiding of unclear analysis interrupted by water signal in spectrum, 99.99% phosphoric acid was used. Disappearance of the epoxide chemical shift in the mixture of starting materials [5: δ 2.84 (CH$_{epoxide}$); 6: δ 3.39 (HOC—H$_{alcohol}$] as well as appearance of product 7 and 9-17 [δ 3.53-3.63 (COC(R$_2$)—H$_{ether}$); δ 4.09-4.32 [(R'—O)$_2$(O)POC(R$_2$)—H$_{phosphate}$)] was monitored by $^1$H NMR spectroscopy at room temperature.

6. Reaction of 5 with i-Propanol in the Presence of H$_3$PO$_4$.

A solution of 9,10-epoxy methyl stearate (5) (0.50 g, 1.66 mmol) and 10 wt % (0.05 g) phosphoric acid (85% solution in water) in isopropanol (10 mL, 130.78 mmol) was stirred continuously at room temperature for 12 h. After purification by column chromatography (hexane/ethyl acetate gradient 99/1 to 90/10), 9a,b as a light yellow oil (yield: 0.36 g, 0.96 mmol) was obtained. $^1$H NMR (CDCl$_3$, 500 Mhz, integrals are set for a 1:1 mixture of 9a and 9b): δ 3.66 (m) and 3.65 (s) (both signals have a combined integral of 8H), 3.55 (m, 2H), 3.44 (m, 2H) 3.16 (m, 2H), 2.29 (t, J=7.3 Hz, 4H), 1.60 (m, 4H), 1.50-1.17 (m, 48H), 1.15 (d, J=6.1 Hz, 3H), 1.13 (d, J=6.1 Hz, 3H), (t, J=6.8 Hz, 6H). Diol 6 was isolated as a side product that eluted after 9a/9b from the silica column (yield: 0.12 g, 0.36 mmol, white powder).

7. Reaction of Epoxide 5 and Diol 6-($^{18}$O) in the Presence of H$_3$PO$_4$.

Respectively, a 2:1 mixture of 5 (0.6 g, 1.92 mmol) and 6 (0.317 g, 0.96 mmol) with 10 w/w % phosphoric acid (85% in water, 0.06 g), (b) 2:1 mixture of 5 (0.6 g) and 6-($^{18}$O) (0.0317 g) with 10 w/w % phosphoric acid (85% in water, 0.06 g) were stirred in a round-bottom flask in CH$_2$Cl$_2$ (0.3 ml) at room temperature for 12 h. ESI-MS and $^1$H NMR spectra were acquired.

B. Conclusions

Copolymerization of epoxidized and hydroxylated soybean oils (1 and 2) in the presence of phosphoric acid produced an adhesive material. Mechanistic studies of this reaction were conducted on analogous single-chain epoxide and diol model systems 5 and 6. In the reaction of 5 with H$_3$PO$_4$ (85% in water), the phosphate ester cross-linkages in the resultant product were formed in the absence of added alcohols. However, partial hydrolysis of 5 with residual water from the aqueous H$_3$PO$_4$ produced 6 in situ, leading to additional ether moieties in the polymeric network. Similarly, the reaction of 5, 6, and H$_3$PO$_4$ produced a polymer that contained both ether-moieties as well as phosphate ester units in the polymer backbone. In contrast, polymerizations of 5 and 6 in the presence of CF$_3$SO$_3$H produced only the expected polyether network. In studies with model compound 5 and excess isopropanol with H$_3$PO$_4$, acid-catalyzed alcoholysis was the main reaction in the epoxide functionalization. This result highlights that alcoholysis reactions can become the main reaction pathway (at the expense of phosphate ester formation) if ratios of alcohol and H$_3$PO$_4$ are adjusted.

Figure 13:
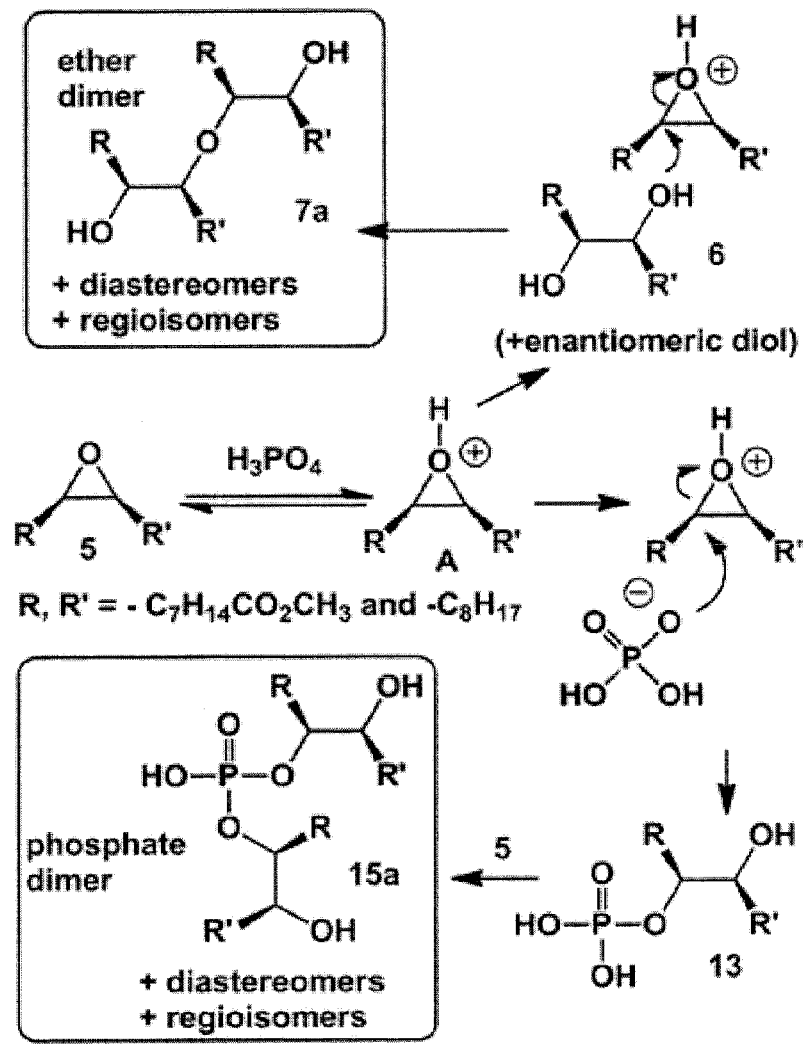
FIG. 13 is a reaction scheme for studying the chemical pathways of epoxidized and hydroxylated fatty acid monoesters and triglycerides with phosphoric acid to yield ether or phosphate ester crosslinks.

The role of 6 as a nucleophilic initiator in the formation of polyethers from 5 and 6 (and by analogy 1 and 2) was confirmed in studies with the mono-$^{18}$O-labeled compound 6-($^{18}$O), which produced mono-$^{18}$O-labeled ether dimer 7a-($^{18}$O) and mono-$^{18}$O-labeled ether trimer 7b-($^{18}$O). Mechanistically, a picture arises in which O-protonated oxonium ion A is subjected to nucleophilic attack by either diol 6 or its counter-anion H$_2$PO$_4^-$ (FIG. 13).

The former pathway produces a dimeric diol 7a that can subsequently react with another epoxide molecule 5 (without any further involvement of 6). The latter pathway can produce mono-, di-, and tri-phosphate esters with 5. Phosphoric acid and diol 6 do not form covalent bonds with each other. The identification of chemical pathways of epoxidized and hydroxylated fatty acid monoester and triglycerides with phosphoric acid herein can provide a rational platform for optimizations of their properties and reaction methodology for industrial applications.

Example 40

Thermally Stable Transparent PSA from ESO

Figure 14:
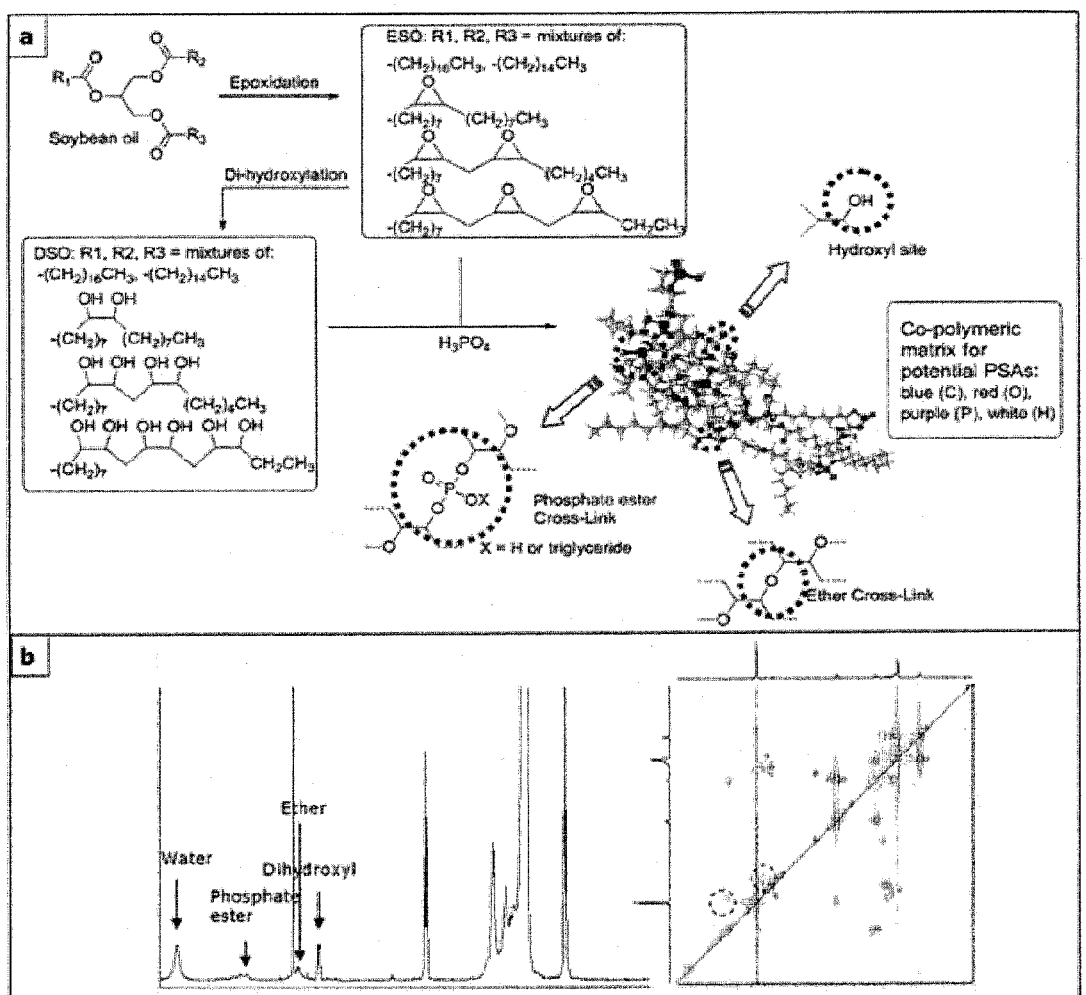

In this work, we proposed the chemical scaffold (FIG. 14a) that ESO was used as starting materials in the presence of phosphate acid as catalyst to form and ESO PSA. DSO was developed from the ESO, and then added to ESO PSA at a designed ratio to improve its tackiness in advance of providing more hydroxyl moieties. This chemistry was confirmed using NMR studies (FIG. 14b) with a model system using epoxidized methyl oleate (EMO) to avoid the influence of the complexity of multiple functional moieties in triglycerides. NMR spectra indicated the EMO polymer from EMO/H$_3$PO$_4$ consists of hydroxyl polar sites (signal at δ 3.38 and 3.39) which provide tackiness and crosslinkages of ether (broad signal at δ 3.6) and phosphate ester (signal at δ 4.1-4.3) (FIG. 14b).

Figure 15:
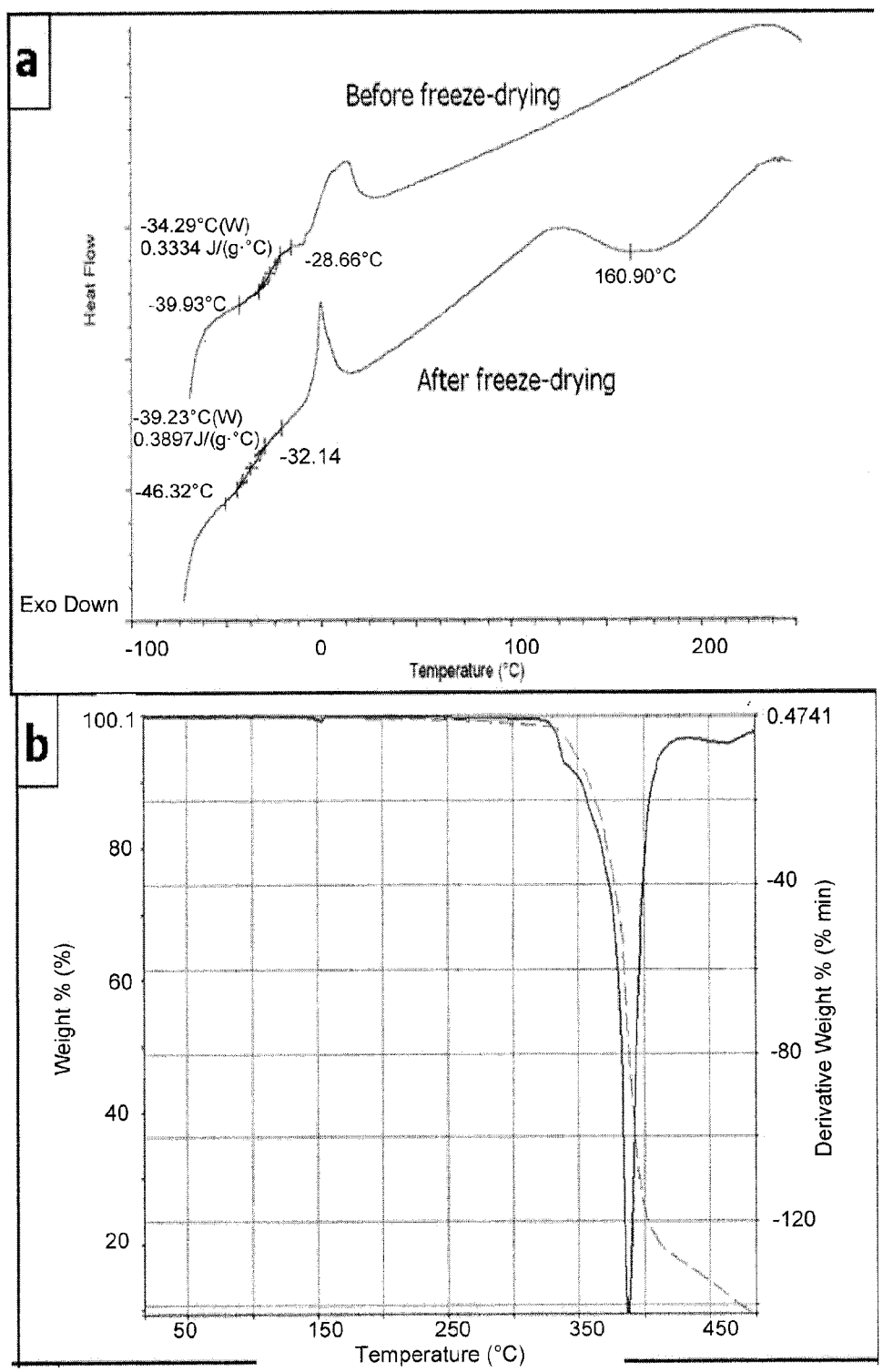
FIG. 15a is a graph of the differential scanning calorimetry (DSC) of the PSA in Example 40.
FIG. 15b is a graph of the Thermogravimetric Analysis (TGA) of the PSA in Example 40.
FIG. 15c a graph comparing the % transmittance of the PSA to glass, polyethylene, and polypropylene in Example 40.
FIG. 15d is a graph of the peel strength of the PSAs in Example 40 when tested under various conditions.
FIG. 15e is a graph comparing the peel strength and cohesion of the PSAs in Example 40 to commercially-available Scotch® Magic Tape and Post-it® notes.
FIG. 15f is a graph comparing the peel strength of the inventive PSAs in Example 40 to Post Post-it® notes, after repeated removal and rebonding with a substrate.
Figure 15:
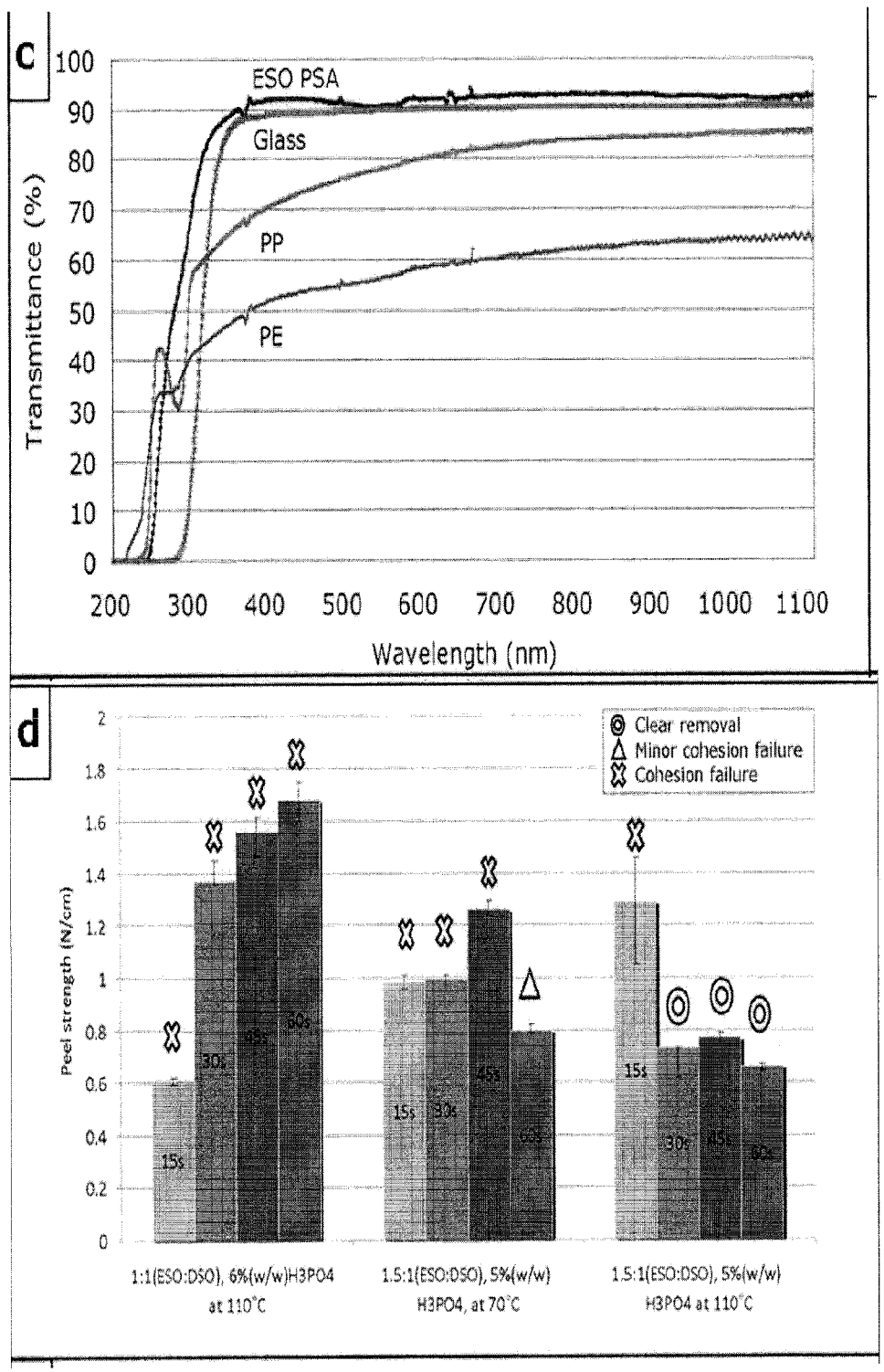
Figure 15:
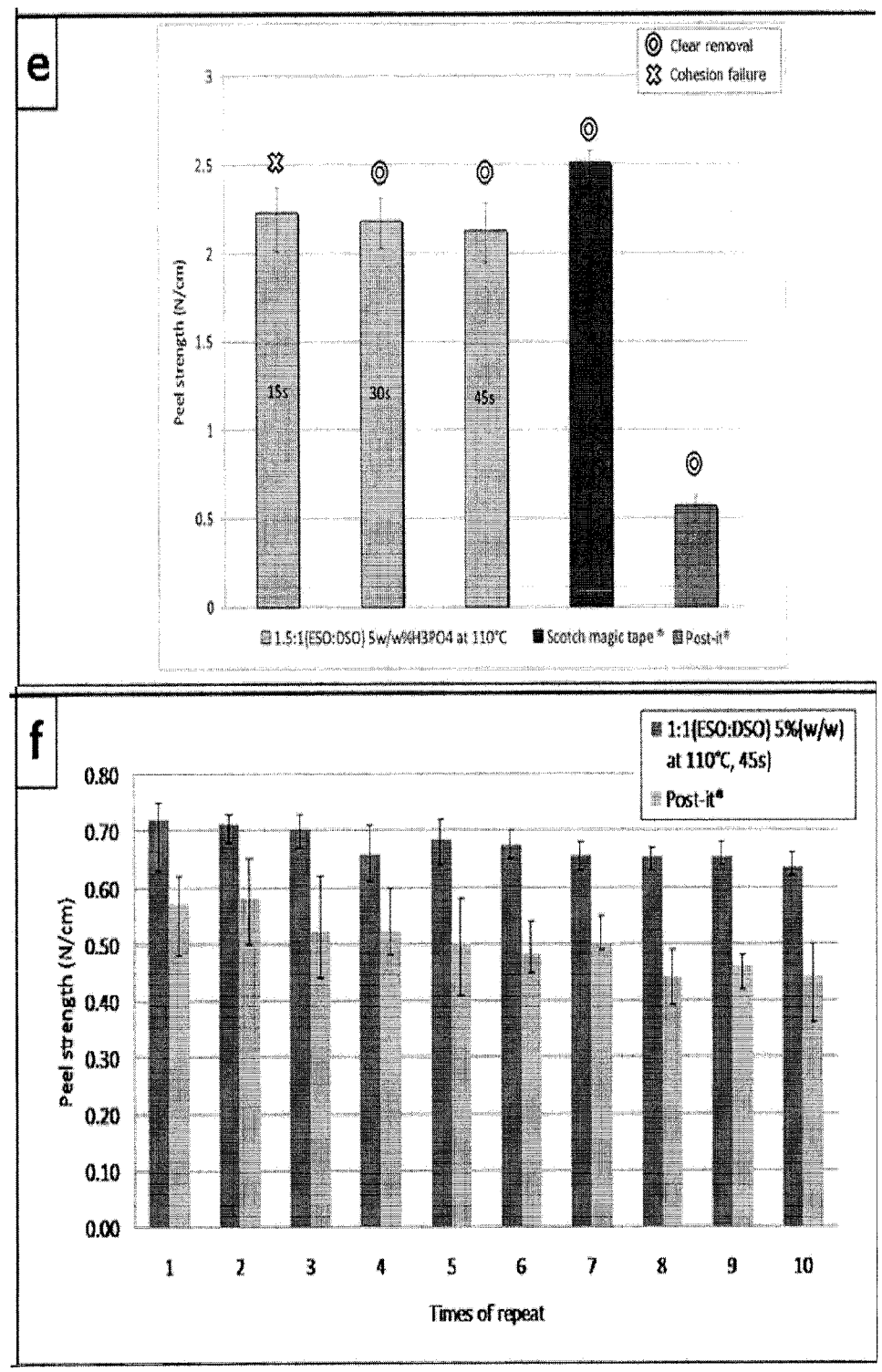
Figure 16:
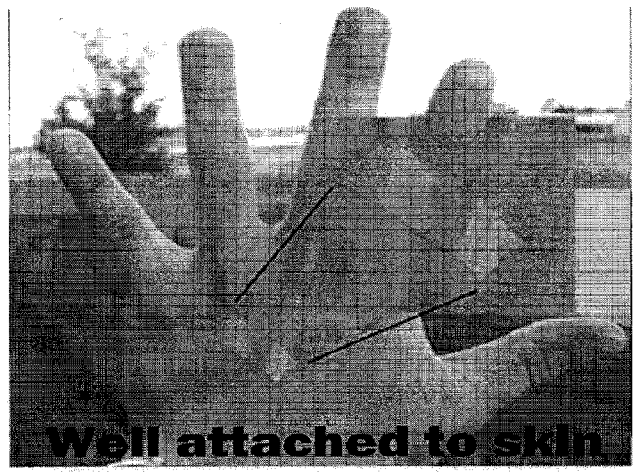
FIGS. 16-19 are photographs demonstrating the attachment of the PSA to the skin, clear removal, flexibility, and transparency of the inventive PSAs.
Figure 17:
Figure 18:
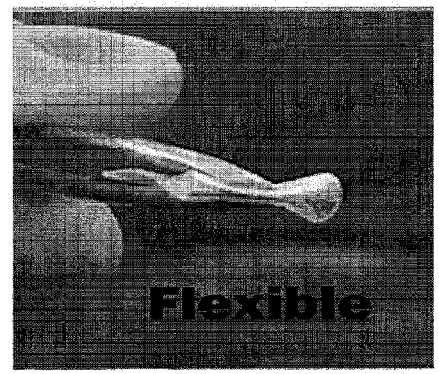
Figure 19:
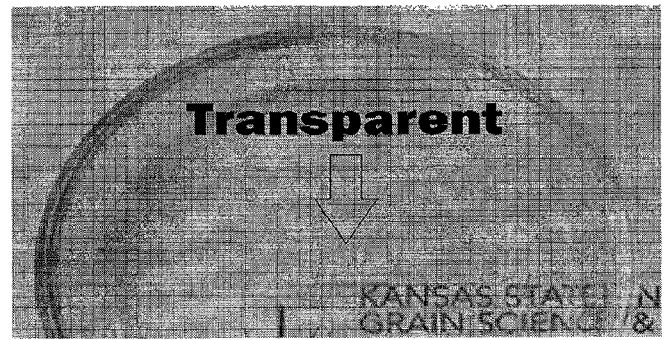

The newly developed ESO PSA had a small linear CTE (14.08 ppm K−1) comparable to the CTE of glass (8.5 ppm K−1), and much lower than that of most flexible plastics (approx. 50 ppm K−1). The differential scanning calorimetry (DSC) (FIG. 15a) indicated the ESO PSA has great thermal stability (e.g., Tg was −34.29° C. and Tm of ESO PSA were above 250° C.) compared to other PSAs and flexible plastics including polyisoprene, polyacrylate (PMMA) (Tm is about 160° C.), polyethylene (PE) (Tm is about 120-150° C.), and polypropylene (PP) (Tm is about 160° C.). After freeze drying the ESO PSA film, water moieties trapped in its matrix was slightly removed, the Tg was reduced to −39.23° C. and crystallization was observed at 160° C. (FIG. 15a). This demonstrates that the ESO PSA film contained moisture and can be a candidate for flexible electronic applications with multiple —OH groups in its matrix. Thermogravimetric Analysis (TGA, FIG. 15b) indicated that the thermal degradation of the ESO PSA was at 388° C. The light transmittance of the elastomer was above 90% in visible range (390-750 nm) that is comparable to glass (microscope slide) transparency and much higher than PE and PP. Besides, the ESO PSA was more optically stationary than other flexible plastics. At 300 nm, more than 80% of light passed through the ESO PSA while glass blocked more than 90% of light (FIG. 15c).

The ratio of tacky groups and the degree of crosslinking should be balanced to achieve the most desirable properties.

A strong crosslink will make the film too stiff, however, cohesion failure will occur if the crosslink is not sufficiently stronger than the adhesion force. Since obtaining a fast reaction and short curing time was essential for commercialization in terms of manufacturing process, we targeted the curing time to be no longer than 60 seconds. In this novel technology, curing was achieved by air drying to remove the solvent. The ESO PSAs were dried on the one side of the adhesive treated polyethylene terephthalate (PET) film. Various conditions (ratio, time, temperature) were adjusted to vary the peel strength of the PSAs. Based on preliminary peel strength test, we selected several samples with varied ratios of ESO/DSO/$H_3PO_4$ using PET plastic film as the substrate. The ESO PSA of 1.5:1 [ESO/DSO (w/w)] with 5% (w/w) $H_3PO_4$ (ESO PSA I) showed fastest drying time (30 s) at 110° C. and had comparable peel strength without cohesion failure (clear removal) (FIG. 15d). The ESO PSA I dried at 110° C. for 45 s had an optimum peel strength of 0.77 N/cm (FIG. 15d) with glass as a substrate. The ESO PSA I was selected and evaluated using aluminum foil as carrier, and the peel strength on glass substrate was 2.18 N/cm at 30 s drying, which was comparable to Scotch® Magic tape and much stronger than to Post-it® (FIG. 15e). Reusability of the ESO PSA I with PET film as carrier on glass substrate had comparable peel strength to Post-it® after repeating 10 times (FIG. 15f). In addition, the ESO PSA I was tolerant to organic solvents as well as water; once it was dried, it was not soluble in most organic solvents including chloroform, methane chloride, tetrahydrofuran, ethyl acetate, methyl acetate, acetone, ethyl ether, dimethylformamide and hexane.

In summary, we designed and synthesized the ESO PSAs via one pot, single step, fast reaction at moderate temperature and the tapes were produced via fast air drying processing. This ESO PSA has great potential to replace the petro-based PSAs for a broad range applications, for example, for flexible electronic devices (e.g., solar cell, semiconductor, organic light-emitting diode and display), reusable tapes, and medical and pharmaceutical devices such as skin wound care with its advantages of thermal stability, transparency, chemical resistance, and potential biodegradability from triglycerides (FIGS. 16-19).

A. Experimental Details:

1. Model System (EMO) for NMR Analysis:

9,10-epoxideized methyl oleate (EMO) was prepared following the method described by Holland et al [reference 6]. Then the EMO polymer was prepared: EMO (0.06 g, 0.192 mmol) was agitated with 5 w/w % (0.003 g, 0.03 mmol) $H_4PO_3$ (85% solution in water) in CDCl3 (200 μL) for 1 min then transferred to an NMR tube (3 mm). $^1$H NMR and $^1$H-$^1$H COSY in CDCl3 (500 MHz) were acquired. $^1$H NMR (CDCl3, 500 Mhz): δ 3.39 (HOC-Halcohol), δ 3.53-3.63 [COC(R2)-Hether], δ 4.09-4.32 [(R'—O)2(O)POC(R2)-Hphosphate)]

2. NMR Analyses.

$^1$H NMR spectra for the EMO polymer were recorded quantitatively using a Varian S spectrometer (Varian Inc, Palo Alto, USA) at observing frequencies of 499.84 for $^1$H on a 3 mm penta probe. The sample solutions were prepared in CDCl3 at 15% v/v concentrations. $^1$H NMR spectra were obtained with 32 scans at a delay time of 1 s between scans. $^1$H-$^1$H COSY spectra for the EMO polymer were obtained with 128 increments and 4 scans for each increment. A sinebell function was used during processing for both dimensions.

3. Preparation of ESO PSA Film.

ESO PSA film without addition of DSO was prepared in a petridish for CTE, DSC, TGA, transmittance, and photoimage characterization. ESO (1 g, 10 mmol) was dissolved in methyl acetate (1 ml) and cooled down to 0° C., then 5% (w/w) H3PO4 (0.005 g, 0.51 mmol) was added to the ESO solution. Subsequently, the solution was agitated in warmed sonicator bath (50° C.) and on a vortex for 5 min, then the solution was poured into a petridish, kept in atmosphere for 24 h. The ESO was purchased from Scientific Polymer Products, Inc.

4. Thermal Properties of ESO PSA Film.

The CTEs of ESO PSA film (10 mm×5 mm) were measured using dynamic thermomechanical analysis (Perkin Elmer DTMA 7e) following ISO standard (ISO 11359) and the method of Nogi et al. at a heating rate of 5° C. min$^{-1}$ in helium atmosphere under tensile mode with 1 mN load. The CTE values were the mean values at 20-150° C. Thermal transitions (Tg and Tm) were obtained with a TA DSC Q200 instrument. About 5 mg of ESO PSA film sample was sealed in an hermetic pan. The sample was heated from –80 to 250° C. at a rate of 10° C./min, isothermally conditioned at –80° C. for 5 min, and the freeze dried sample was heated at the same rate. The samples were characterized in an inert environment by using nitrogen with a gas flow rate of 50 mL/min. Decomposition characteristics were determined with a Perkin-Elmer Pyris1 TGA (Norwalk, Conn.). About 5 mg of each sample was placed in the pan and heated from 40 to 800° C. at a heating rate of 20° C./min under air atmosphere.

5. Transmittance.

Light transmittances were measured by UV spectrometer (Hewlett-Packard 8453). The thickness of specimens was 0.36 mm for ESO PSA, 0.91 mm for glass, 0.27 mm for PP, and 0.1 mm for PE.

6. DPO Synthesis.

ESO (20 g, 20 mmol) was stirred in 500 mL THF/water (300 mL:200 mL) with 10% (v/v) of perchloric acid for 20 h at room temperature. Subsequently, diethyl ether (150 mL) was added, and perchloric acid was removed in aqueous layer via repeated washing in a separatory funnel with saturated sodium bicarbonate until pH test litmus paper strip appeared 7.0. The organic layer was dried over anhydrous magnesium sulfate, and celite-filtered. After the solvent was removed with a rotary evaporator and dried under high vacuum to obtain sticky clear oils in 80% yield (colorless oil). $^1$H NMR (CDCl3, 500 Mhz): δ 5.23 (m, $^1$H), 4.26 (m, 2H), 4.11 (dd, J=11.7 Hz, J=6.2 Hz, 2H), a total of hydroxyl multiplets were found at 4.20, 3.99, 3.91, 3.71, 3.57, 3.43, 3.34; the combined integral was approx. 10H, 2.25 (t, J=7.5 Hz, 2H), 1.68-1.17 (m, approx. 46.5H), 0.86 (m, 9H).

7. Preparation of ESO PSA Tapes.

Mixtures of ESO (1 g, 1.5 g, 2 g) and DSO (1 g) at ratio of 1:1, 1.5:1, and 2:1 by weight, respectively, were dissolved in methyl acetate (2 mL) to obtain a dilute solution, then cooled down to 0° C. Then H3PO4 was added to the solution at 4, 5, and 6% (w/w), respectively based on ESO concentration. The solution was agitated in a sonicator bath at 50° C. for 30 s and then on a vortex mixer at room temperature for 30 s; this agitating was repeated 5 times (for 5 min). Appropriate amount of methyl acetate (4 mL) was added to the solution to facilitate easy spreading over a 75 cm2 either PET film (200 gauge adhesive treated side) or aluminum foil (non-shiny side) carrier. The ESO PSAs were then dried at, 75° C. and 110° C. for 15, 30, 45, 60 seconds, respectively, with a hairdryer (Revlon 1875W) at low or high rate. The distance between tape and dryer was 3.5 mm.

8. Peel Strength of ESO PSAs.

The 90° peel adhesion test was conducted according to ASTM method D3330/D3330M-04 (ASTM, 2004). The glass specimen was placed on a fixture clamped to the moving steel panel of the peel adhesion tester (Vertical Motorized Test Stand, MV-110-S). The non-adhesive-coated end of each strip was doubled back at a 90° angle and clamped into the moving jaw to ensure a peel angle of 90° during peel testing. The speed of the moving jaw for the peel test was 5.0±0.2 mm/s. Data were collected after first 25 mm of tape was peeled, and average peel adhesion strength was obtained for peeling the rest of the tape. Reported values are the average of the three replications for each treatment.

Example 41

UV-Curable Biobased PSAs

In this study, we examined the possibility of preparation of solvent-free and biobased PSA from AESO using only UV radiation without any other petrochemicals as additives (photoinitiator, hardener and tackifier) to demonstrate PSA properties of the genuine polymer. The tack of the PSA means the instantaneous wetting of PSA on a substrate with a little pressure followed by measurable adhesion to applied surface. If adhesives are too stiff (or soft), adhesion (or cohesion) failure occurs. Therefore, appropriate viscoelasticity must be achieved to optimize both cohesion and adhesion strength for PSA application. We, therefore, characterized the viscoelastic properties of the UV cured AESO polymer for PSA applications. The most important advantage of free radical polymerization is to conveniently control chain length by modulating the radiation source so as to achieve desirable viscoelasticity of the polymer.

The free-radical polymerization was monitored by Fourier transform infrared spectroscopy (FTIR). Viscoelasticity was measured by dynamic rheometer, and mechanical properties (loop tack, peel, and shear strength) were demonstrated according to the American Standard Testing Method (ASTM). In addition, thermal properties of the polymer were examined by differential scanning calorimetry (DSC) and thermogravimetric analysis (TGA).

In general, the Johnson-Kendall-Roberts (JKR) experiment consists of a loading and an unloading portion. The raw data obtained from the JKR test are the load (P) and the contact radius (a). Using an energy balance approach, Johnson, Kendall, and Roberts developed a relationship between the contact area and the applied load as:

$$a^3 = \frac{R}{K}\left[P + 3\pi RW + \sqrt{(3\pi RW)^2 + (6\pi RPW)}\right] \quad (1)$$

where R is the radius of the curvature of the probe, K is the reduced bulk modulus given by equation (2), and W is the thermodynamic work of adhesion.

$$\frac{1}{K} = \frac{3}{4}\left(\frac{1-v_1^2}{E_1} + \frac{1-v_2^2}{E_2}\right) \quad (2)$$

where $E_i$ and $v_i$ are the Young's modulus and the Poisson's ratio of the probe and substrate. Typically K and W are obtained by fitting the raw data to the JKR relationship given in equation (1). In the case where the hemispherical probe and the substrate are made of the same material (self-adhesion or cohesion), W=2γ where γ is the surface free energy of the material.

Originally, the JKR theory was developed for reversible systems showing similar loading and unloading behavior. For many polymeric systems, however, the loading and unloading behavior observed during the contact is dissimilar. This discrepancy is referred to as the adhesion hysteresis. For non-hysteretic systems the energy that is required to detach two surfaces in unloading is equal to the energy that brings these surfaces into contact in loading (W). For hysteretic systems, however, the pull-off energy exceeds the thermodynamic work of adhesion. Using the analogy between a circumferential crack in fracture mechanics and receding contact area in the unloading portion of the JKR experiments, Maugis was able to formulate the relationship for the energy release rate (G) in terms of the applied load and contact radius as:

$$G = \frac{\left(\frac{Ka^3}{R} - P\right)^2}{6\pi a^3 K} \quad (3)$$

The adhesion hysteresis is defined as the difference between G in unloading and W in loading. The adhesion hysteresis is indicative of bulk viscoelasticity, chemical changes in the interface of the materials, or surface roughness.

In this study, the JKR technique was used as a quantitative and qualitative method to evaluate the surface energy (or solid-solid wetting) of these AESO PSA polymers as well as the interactions that are developed at the interface of AESO with itself or another polymer. The JKR information was used to study the adhesion/cohesion behavior of the PSAs derived from AESO.

A. Materials and Methods

1. UV System.

The Fusion UV system (Gaithersburg, Md.) consisted of a 300 watt/inch H-mercury lamp and LC6B benchtop conveyor belt. The lamp distance from the conveyor belt was 10 cm. This UV system recorded UVA Band (320-390 nm) and 615-660 mJ/cm² of UV radiation dose with EIT Power Puck 1 Radiometer (Sterling, Va.) at a belt speed of 20 feet/min at focus.

2. AESO PSA.

Acrylated epoxidized soybean oil (AESO) was purchased from Sigma-Aldrich (St. Louis, Mo.). The PSAs were prepared via free radical polymerization of AESO under UV radiation. AESO (0.1 g) was spread in the marked area (4.5×16 cm) on polyester (PET) carrier, and then the prepared films were scanned through the Fusion UV system (Gaithersburg, Md.). The belt speed was set up at 7 feet/min (UV radiation dose/pass: 215-231 mJ/cm²) and repeated UV scans from 3 to 9 times until the polymer of AESO lost its tackiness almost completely.

Polymers were also with a photoinitiator (DAROCUR 1173), which was kindly provided from BASF resins (Wyandotte, Mich.). 3 w/w % of DAROCUR 1173 (3 mg) was added to neat AESO (1 g). The belt speed was decreased from 7 ft/min (UV radiation dose/pass: 215-231 mJ/cm²) to 45 ft/min (UV radiation dose/pass: 35-38 mJ/cm²).

3. Fourier Transform Infrared Spectroscopy (FTIR).

FTIR spectra of the samples were obtained using FT-IR/FT-NIR spectrometer (Perkin Elmer Spectrum 400). To prepare FTIR specimens, AESO was filled in a round mold (1 mm thin, 1 cm diameter), and passed through UV system from 3 to 9 times at 7 ft/min of the belt speed (UV radiation dose: 215-231 mJ/cm$^2$), then the UV cured AESO polymer was removed from the mold.

4. Viscoelasticity.

The viscoelasticity of the UV cured AESO PSA polymers was measured by a Bohlin CVOR 150 rheometer (Malvern Instruments, Southborough, Mass.) with a PP 8 parallel plate at room temperature. Frequency sweep of the specimen was measured from 0.01 to 100 rad/s, and single frequency as a function of time was tested at a constant shear rate of 1 Hz.

5. Tack, Peel, and Shear Strength of AESO PSAs.

The AESO PSA tapes were prepared on PET film via UV initiated polymerization. 90° peel, loop tack, and shear adhesion were tested according to D3330/D3330M-04, ASTM D6195-03, and D3654/D3654M-06, respectively. A strip of tape was applied to a glass panel for all tests using 2 passes of a 2 kg steel roller. The glass specimen was placed on a fixture clamped to the moving steel panel of the peel adhesion tester (Vertical Motorized Test Stand, MV-110-S). The non-adhesive-coated end of each strip was doubled back at a 90° angle and clamped into the moving jaw to ensure a peel angle of 90° during peel testing. The speed of the moving jaw for the peel test was 5.0±0.2 mm/s. Loop tack and static shear test specimens were adhered to a 2.54 cm by 2.54 cm portion. For the shear strength, a 1 kg weight was hung at end of the tape and the failure time in minutes was recorded.

6. JKR Tests.

The JKR tests were performed using a flat substrate and a hemispherical lens probe. AESO samples cured under UV radiation of 6, 7, 8 and 9 times passed at times at 7 ft/min of the belt speed (UV radiation dose: 215-231 mJ/cm$^2$) were evaluated using the JKR technique. For self-adhesion study, the flat substrate and the hemispherical lens were prepared from the UV cured AESO polymers. The AESO substrate was formed using a mold on an aluminum plate and then UV cured following the same UV condition described above. The AESO lens was formed by placing small drops of AESO on a fluorinated glass slide and curing the lenses for the indicated UV cycles. The radius of curvature of the hemispherical lens is calculated from the side image of the lens on the glass slide taken with a microscope. The radii of the curvature of AESO lenses used are typically in the range of 0.9-1.5 mm. For adhesion, a polydimethylsiloxane (PDMS) lens was used to probe the AESO substrate. PDMS samples were prepared from 2-part Sylgard 184. In Sylgard 184, the base mixture was dimethylvinyl-terminated dimethyl siloxane, and the curing agent was dimethyl methylhydrogen siloxane. PDMS was prepared by mixing the base and the curing agent at a ratio of 10:1 by mass. The PDMS hemispherical lenses were formed using the same technique described above for the AESO material. The radii of the curvature of PDMS lenses used were typically in the range of 0.9-1.1 mm 7. Thermal Properties of AESO PSA.

Thermal transitions ($T_g$ and $T_m$) were obtained with a TA DSC Q200 (New Castle, Del.) instrument. About 5 mg of AESO PSA film sample was sealed in an hermetic pan. The sample was heated from −80 to 250° C. at a rate of 10° C./min, isothermally conditioned at −80° C. for 5 min. Decomposition characteristics were determined with a Perkin-Elmer Pyris1 TGA (Norwalk, Conn.). About 5 mg of each sample was placed in the pan and heated from 25 to 850° C. at a heating rate of 20° C./min under nitrogen atmosphere.

B. Results and Discussion

Figure 20:
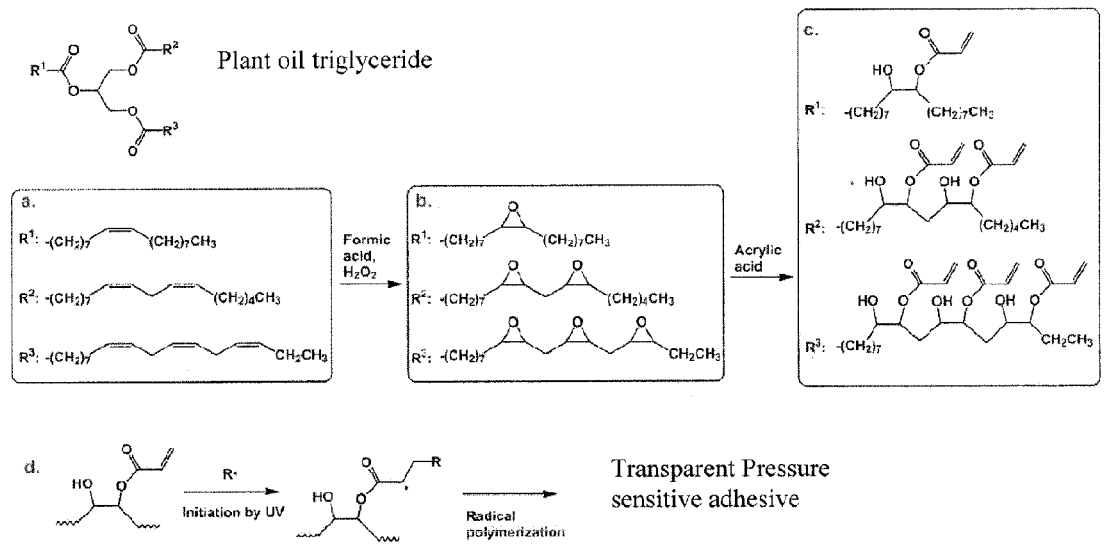
FIG. 20 is a reaction scheme for the synthesis of acrylated epoxidized soybean oil (AESO) in Example 41, and its free radical polymerization: (a) Chemical structures of soybean oil; (b) Structures of ESO; (c) Structures of AESO; and (d) General mechanism for the free-radical-process of acrylates of AESO under UV.

Pure AESO was used to prepare PSAs via free radical polymerization with the use of UV radiation (FIG. 20). Theoretically, faster UV curing (less energy) and tackier properties on demand can be achieved with the addition of petrochemicals such as a photoinitiator, crosslinking agent, and/or hardener. In this study, we focused on free-radical polymerization of pure AESO under UV radiation though we prepared AESO with a photoinitiator as comparison.

Figure 21:
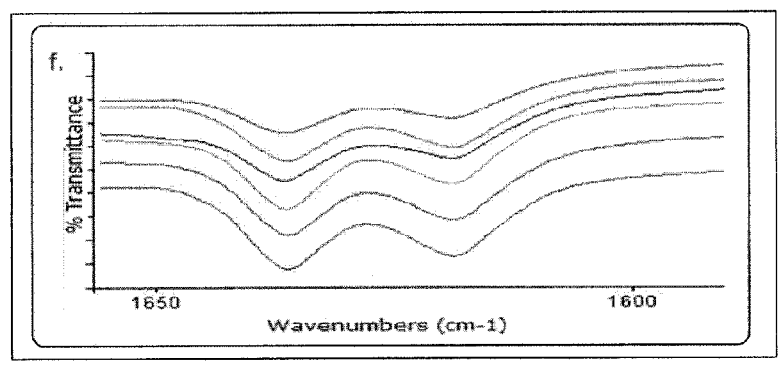
FIG. 21 is the FTIR spectra of UV-scanned AESO from 4 to 9 times (bottom to top) from Example 41.
Figure 22:
FIG. 22 is a photograph of the transparent PSA derived from AESO via UV curing from Example 41.

The kinetic profiles of the UV radical polymerization of AESO can be monitored by FTIR absorbance bands at 1600 cm$^{-1}$ (C=C) as a function of increasing UV dose in proportion to the number of UV scans (FIG. 21). This FTIR kinetic study showed C=C of the acrylates decreased related to an increasing number of UV scans. Interestingly, the AESO PSA cured under 7-9 UV scans attracted only polished surfaces such as glass or plastic coating but not rough surfaces such as textile fibers, hairs, fibers, minerals, and skins. Therefore, there would be non-residue of removal lines on the applied surface and non-hand print on adhesive coated surface on the tape. This PSA can possibly replace petrochemical-based, removable, surface-protective, transparent tapes which are broadly applied on highly polished surfaces such as electronic displays to protect from scratching (FIG. 22), glass bottle labeling, or reusable tapes for office supplies with low tack but high chemical and temperature resistance. Interestingly, we found that the AESO with 6 scans (UV radiation total dose: 1290-1386 mJ/cm$^2$) had a comparable tackiness to commercial band aids on our fingers (or skin) without cohesion failure, even though it showed low cohesion and adhesion strength on a glass substrate. Therefore, it could be a great candidate for biological applications.

Although the AESO PSA had excellent PSA properties without UV initiator, the high amount of UV radiation dose could hinder its practical application. Thereby, we used 3 w/w % of UV radical initiator (DAROCUR 1173) to reduce the UV radiation dose to 43-46 mJ/cm$^2$. The PSA with 3 w/w % of DAROCUR 1173 showed relatively low peel, tack strength than that without UV initiator with UV radiation dose at 1720-1848 mJ/cm$^2$, yet presented similar peel, tack strength to the commercial reusable PSA (Post-it® made by 3M, St. Paul, Minn.). This study showed that low UV energy consumption can be achieved by using 3 w/w % of petroleum-based initiator which would be practical when faster process and lower energy consumption are required.

Figure 23:
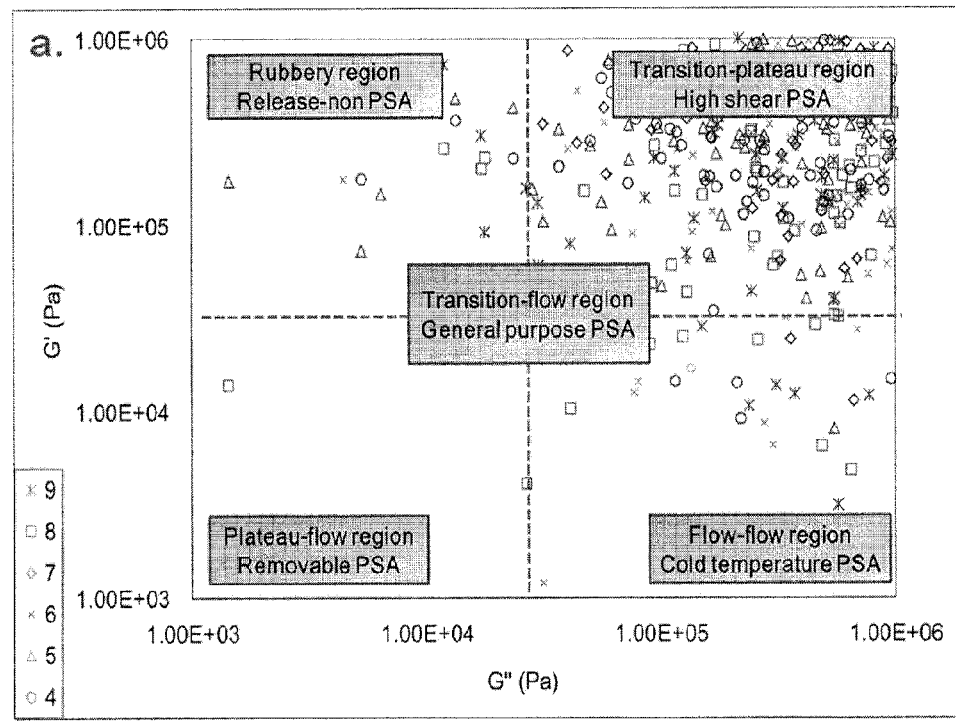
FIG. 23a is a graph of the viscoelastic windows of PSAs as related to different regions based on their rheological behavior from Example 41.
FIG. 23b is a graph of the loss modulus (elastic modulus, G') and storage modulus (viscous modulus, G") as a function of time at constant shear rate (1 Hz) from Example 41.
FIG. 23c is a graph of G' and G" as a function of frequency (rad/s) from Example 41.
FIG. 23d is a graph of the peel and loop tack strength with cohesion/adhesion balance from Example 41.
Figure 23:
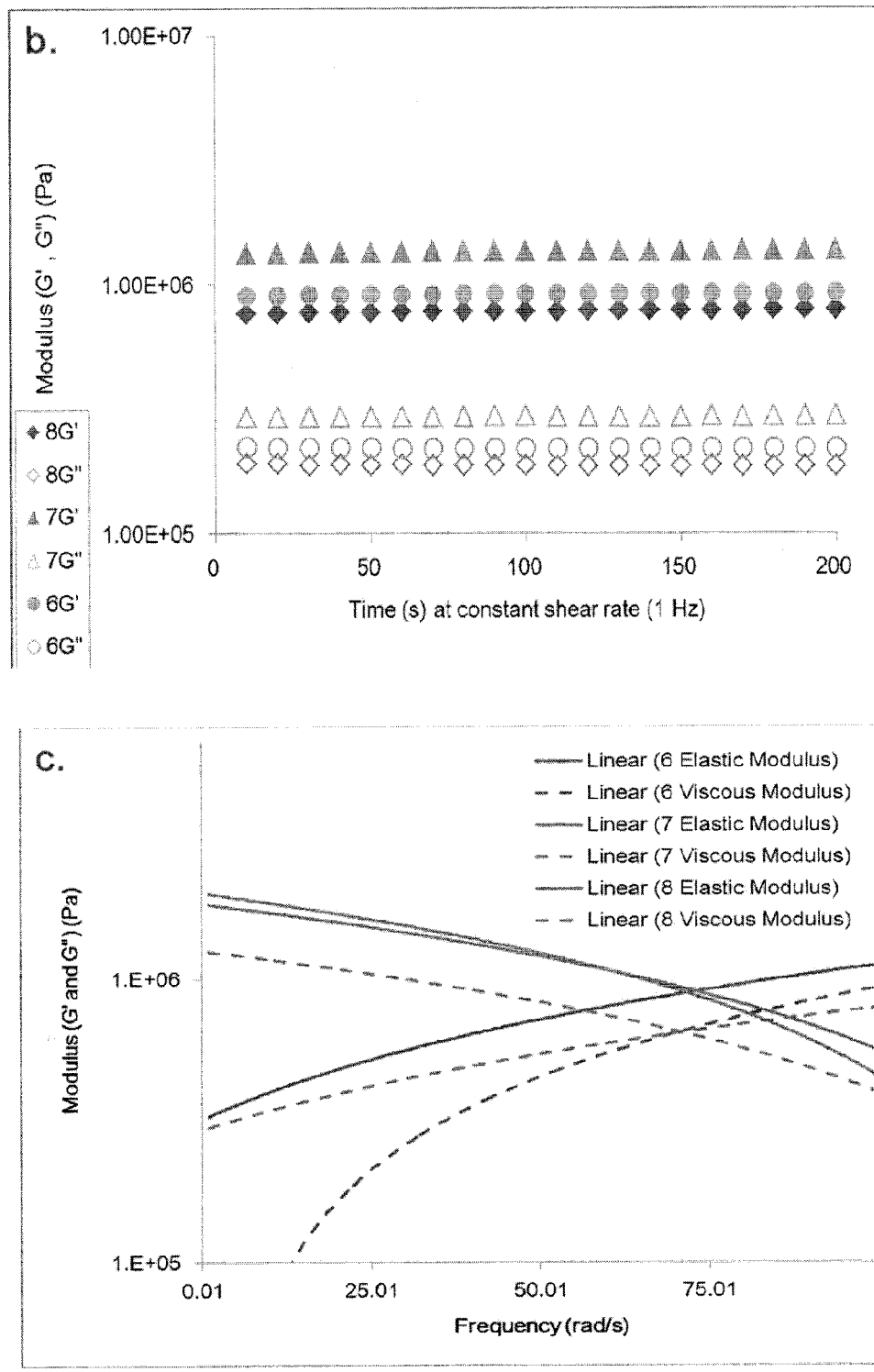
Figure 23:
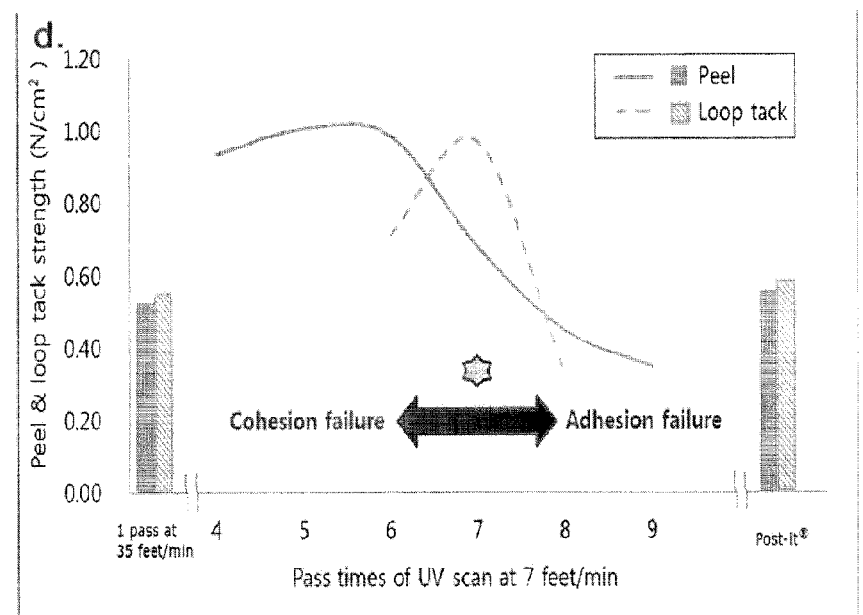

In viscoelastic windows of PSAs, the viscoelastic properties of the AESO PSAs presented a transition-plateau region (high modulus and high dissipation) for high shear PSA (FIG. 23a). Comparison between AESO PSAs with 4-9 UV sans showed the PSA with 7 UV scans had relatively higher loss modulus (G") and storage modulus (G') as a function of time (FIG. 23b) and frequency (FIG. 23c). Different polymerization degrees from UV radiation which affected mechanical peel, tack, and shear strength of the PSA tapes which highly corresponded to FTIR analysis. AESO PSA with 7 UV scans (UV radiation dose: 1505-1617 mJ/cm$^2$) had the most balanced cohesion/adhesion strength as shown in FIG. 23d. The tape had relatively low peel and tack strength of around 1 N/cm$^2$ and 0.98 N/cm$^2$ comparable to general purpose PSA tapes (located in the middle window at FIG. 23a), yet stronger peel and tack strength than low tack reusable PSA tape such as Post-it® (3M, St. Paul, Minn.) with a strength at around 0.5 N/cm$^2$. In addition, the shear hang time of PSA tapes with 6-8 scans (sample 6-8) recorded excellent shear strength (+30000 min) on a glass plate compared to sample 9 (45 min) with 9 UV scans. It was hung until the end of the test (30000 min) and was much stronger than the Post-it® (less than 1 min). This result also corresponded to the viscoelastic window analysis (FIG. 23a, Transition-plateau region) that AESO polymer can be defined as a high shear PSA. Therefore, this AESO PSA tape has potential for a high shear reusable tape application for polished surfaces such as a glass, but it did not adhere at all to unpolished surfaces such as paper and skin. However, the AESO PSAs with 5-6 UV scans adhered well to human skin, but showed cohesion failure on glass.

Figure 24:
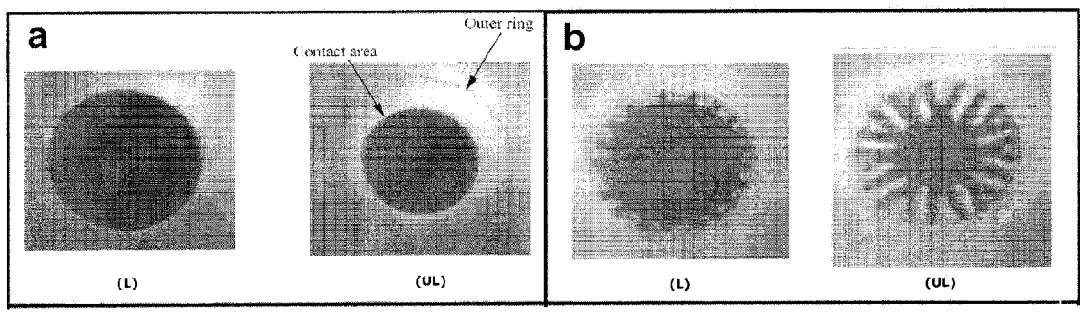
FIGS. 24 a-b are images of the contact area viewed in loading (L) and unloading (UL) of AESO PSA self-adhesion (a) AESO PSA sample 7; and (b) AESO PSA sample 6 from Example 41.
Figure 24:
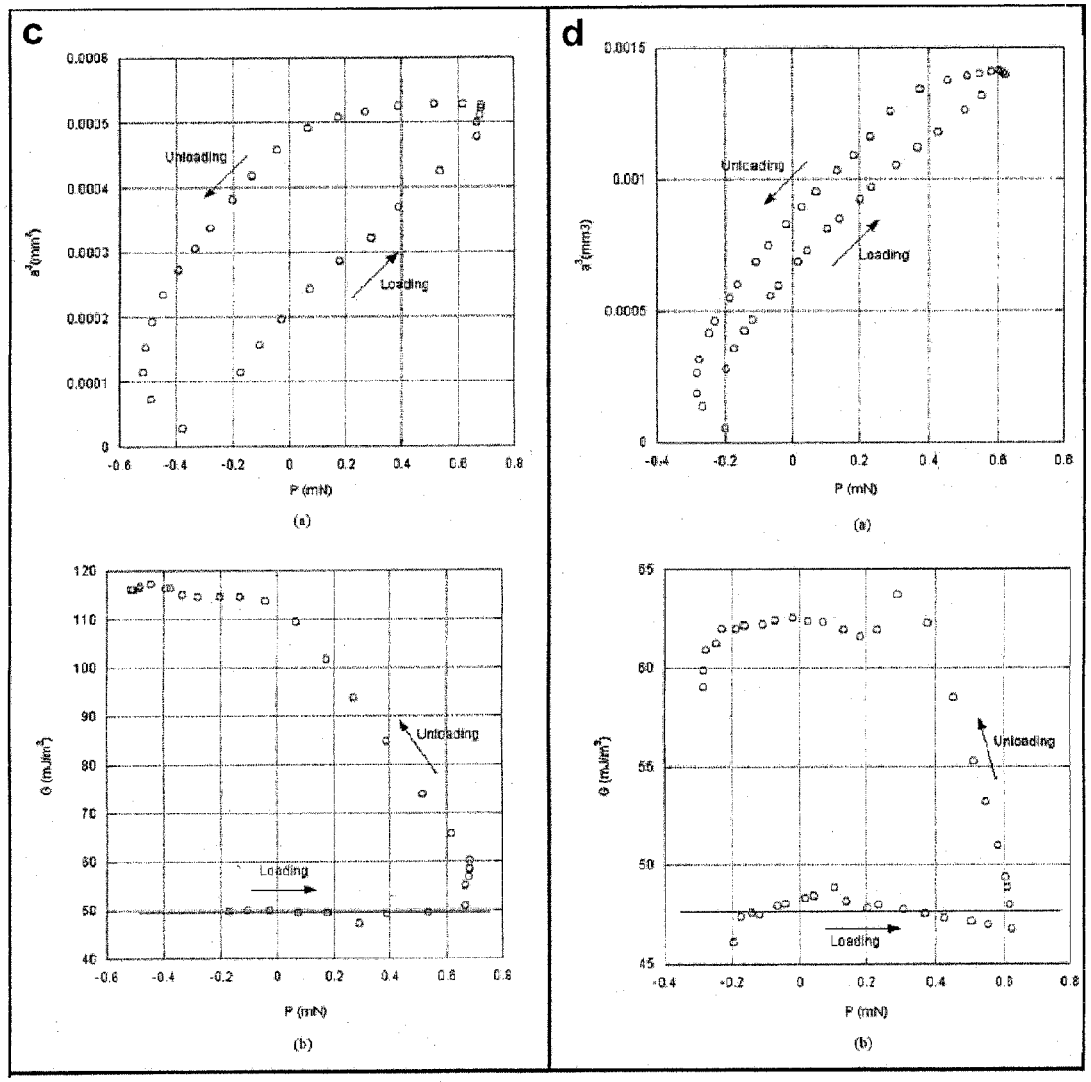

The JKR experiments were performed to evaluate the self-adhesion (or cohesion) behavior of AESO PSA samples as well as the adhesion of these samples with PDMS in a qualitative and quantitative manner. Qualitative results were used to compare the shape or the trend of the contact area during the loading and unloading, and quantitative results were used to determine the reduced bulk modulus (K), work of adhesion (W), and the fracture energy (G). Typical images of the contact area developed during the self-adhesion study of AESO polymers are depicted in FIG. 24a for loading (L) and unloading (UL), respectively. The horizontal line in loading (b) shows the average value of W. The radius (a) of the contact area was approximately between 0.04 mm and 0.1 mm. During unloading, a circular edge was observed around the contact area (see the outer ring in FIG. 24b). The radius of this circular edge is close to the radius of the maximum contact area in the loading portion. In self-adhesion of glucose, the outer ring was defined as the boundary of the initial contact area, and the inner ring was defined as the peeling front. Similarly, the viscoelastic behavior of AESO PSA samples caused this peeling effect observed as a circular region around the contact zone in our case. The self-adhesion experiments of samples with 7, 8, and 9 UV scans showed the loading and unloading contact areas similar to those depicted in FIG. 24a. The contact areas observed during the self-adhesion of sample 6 was, however, markedly different, as shown in FIG. 24b. During both loading (L) and unloading (UL), the contact areas showed a "fingering effect" around the edge of the contact region. This fingering effect in unloading has been observed earlier in viscoelastic materials, such as self-adhesion of uncross-linked PSAs. The fingering effect observed in unloading has been associated with viscoelastic dissipation in adhesion of PSAs. The fingering effect in loading, however, has not been previously reported. We believe this was associated with the less-cured (or tackiness) behavior of sample 6, because the contact area was circular without fingering effect after 7 or more of UV scans.

In the loading portion of the JKR test, the quantitative results include the calculation of reduced bulk modulus (K) and the work of adhesion (W), using equation (1) in introduction. In unloading portion, the quantitative results consist of the calculation of the energy release rate (G), using equation (3), but only if adhesion hysteresis is observed, while G=W if hysteresis is not observed. FIG. 24c, graph (a) shows $a^3$ (a=the contact radius) vs P (P=the applied load) and G vs P plots for self-adhesion of AESO PSAs. Noticeable adhesion hysteresis was shown in FIG. 24c, graph (b), which implied that G was significantly larger than W (FIG. 24c, graph (b)). Table 27 shows the quantitative results for the self-adhesion of AESO PSAs with 7, 8, and 9 UV scans. For the self-adhesion of the AESO PSA with 6 UV scans, JKR results cannot be used due to the fingering effect observed during loading. Other than a slightly lower K value for sample 7, there is very little difference between the calculated W and K values for the three samples. Based on the values of W, the surface energy of the AESO PSAs range was approximately 61-65 mJ/m$^2$, which was significantly higher than that of PDMS (ca. 45-51 mJ/m$^2$). The noticeable adhesion hysteresis observed from AESO PSAs demonstrated that specific bonds occurred between surfaces. The trend in unloading behavior also confirms that there is a hydrogen-bonding formed between the molecules of AESO polymer. In addition AESO PSA with 7 UV scans showed a slightly higher adhesion hysteresis (G-W) within the data scatter as compared to other AESO PSAs' self-adhesion, which corresponded to the mechanical and rheological properties.

TABLE 27

JKR results of AESO PSAs' self-adhesion and AESO PSAs-PDMS adhesion with various UV irradiation cycles

| AESO PSAs with UV scan times | Self Adhesion | | | PDMS-Adhesion | | |
|---|---|---|---|---|---|---|
| | Loading | | Unloading G | Loading | | Unloading |
| | K (MPa) | W (mJ/m$^2$) | (mJ/m$^2$) | K (MPa) | W (mJ/m$^2$) | G (mJ/m$^2$) |
| 9 (UV dose ≈1935 mJ/cm$^2$) | 4.13 ± 0.28 | 61.91 ± 6.09 | 104.3 ± 9.8 | 1.6048 ± 0.02 | 46.07 ± 0.81 | 59.3 ± 1.15 |
| 8 (UV dose ≈1720 mJ/cm$^2$) | 4.15 ± 0.21 | 64.95 ± 3.70 | 108 ± 6.93 | 1.58 ± 0.03 | 48.38 ± 0.95 | 60.5 ± 2.12 |
| 7 (UV dose ≈1505 mJ/cm$^2$) | 3.85 ± 0.01 | 63.28 ± 2.14 | 114 ± 2.83 | 1.58 ± 0.03 | 45.20 ± 0.66 | 60.67 ± 0.58 |
| 6 (UV dose ≈1290 mJ/cm$^2$) | NA | NA | NA | 1.68 ± 0.01 | 51.70 ± 1.20 | 63.70 ± 0.58 |

To demonstrate adhesion of AESO PSAs with different polymer surfaces, PDMS was used. Prior to AESO-PDMS adhesion experiments, self-adhesion of PDMS samples was carried out to determine its K, W, and G values. K, W, and G values of PDSM were 1.43±0.15 MPa, 43.7±0.8 mJ/m$^2$, and 54±2.1 mJ/m$^2$, respectively. In FIG. 24d, insignificant adhesion hysteresis was shown between AESO PSAs and PDMS, which implied that G should be fairly close to W [FIG. 24d, graph (b)]. The quantitative results for the self-adhesion of AESO PSAs and adhesion between AESO PSAs and PDMS are listed in Table 27. The JKR results of adhesion between AESO PSAs and PDMS showed similar K, W, and G values for all AESO PSAs. The values of W for adhesion between AESO PSAs and PDMS were also close to the values of PDMS self-adhesion. These results demonstrated that the adhesion behavior of AESO PSAs mostly dominated by an applied surface.

Figure 25:
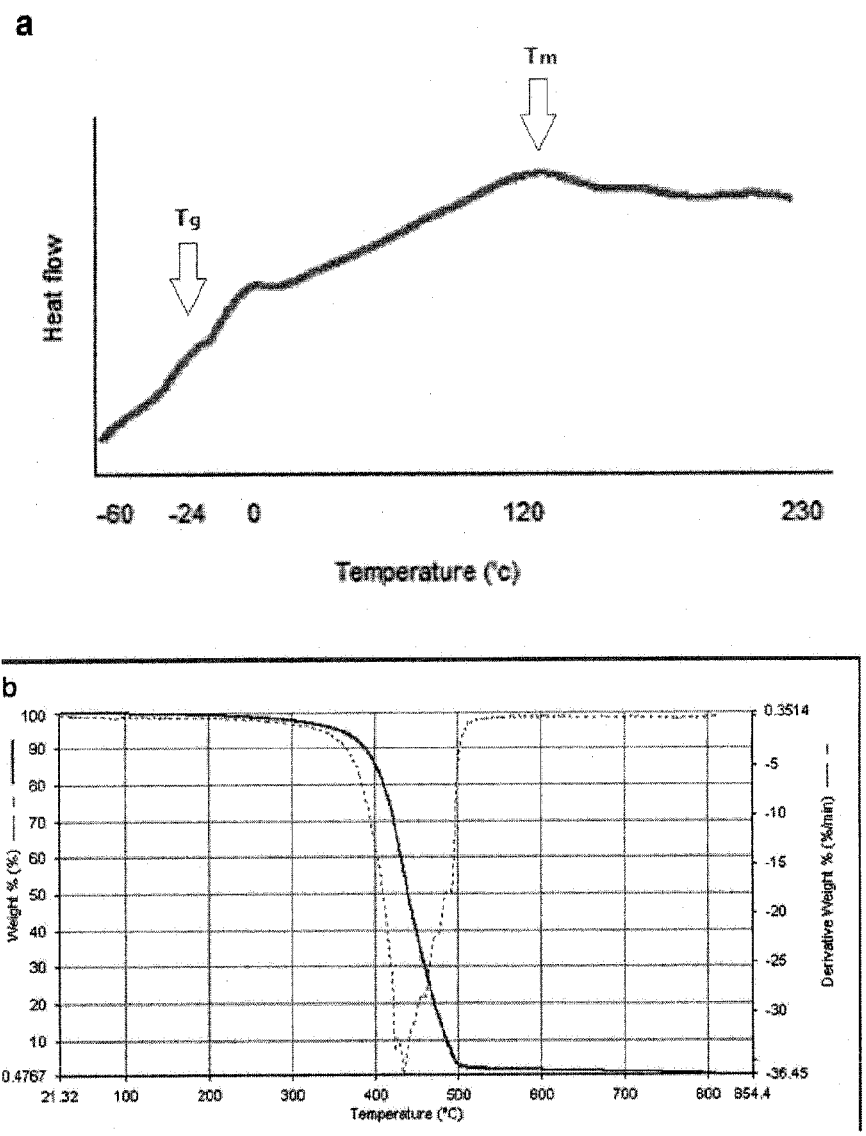
FIGS. 25a-b are graphs of the (a) DSC of AESO sample 7; and (b) TGA of AESO sample 7 from Example 41.

We selected AESO PSA with 7 UV scans for thermal analyses using DSC and TGA, since this sample showed the most promising physical properties for PSA applications. DSC recorded its low glass transition temperature ($T_g$) at −24° C., which is desirable for PSA applications (FIG. 25a). The melting temperature ($T_m$) was shown at 120° C. Meanwhile, the discrete endotherm at around 0° C. seems to be entrapped water molecules which often occurs in oleopolymers. The TGA result of the AEMO PSA (FIG. 25b) indicated a major weight loss (thermal degradation) at around 430° C. with an onset at around 200° C. that was completed at 700° C.

C. Conclusions

Solvent-free AESO PSA was prepared via UV free-radical polymerization. The UV cured AESO had excellent mechanical properties in reusable high shear PSA applications, especially on glass. The UV cured AESO polymer with UV radiation dose of 1505-1617 mJ/cm$^2$ showed comparable peel and loop tack strength but superior shear strength to Post-it®. In addition, the UV radiation dose was able to be reduced to 43-46 mJ/cm$^2$ with 3 w/w % of a photoinitiator: DAROCUR 1173, and showed similar mechanical properties to Post-it®. Further viscoelastic behavior analysis revealed that the UV cure AESO PSAs is a high shear PSA. These PSA tests with rheology and JKR techniques showed corresponding results to the mechanical properties. The AESO PSA also showed $T_g$ at −24° C., $T_m$ at 120° C., and thermal degradation at around 430° C. In addition, its inherently low toxicity and high biodegradability promise great potential for possible biological applications.

Example 42

UV-Curable PSAs from Functionalized Plant Oils and Rosin Esters

In this study, we designed and synthesized a novel plant oil-based PSA via UV-initiated cationic polymerization of ESO copolymerized with DSO and rosin ester. The PSA was up to 97% biobased contents that can be cured with an affordable green manufacturing process via a solvent-free UV curing system. In this study, we elucidated the scaffold of UV-cured ESO PSA with the aid of $^1$H NMR, 2D $^1$H-$^1$H COSY NMR, and electrospray ionization-mass spectrometry (ESI-MS). In addition, the covalent bond (copolymerization) between ESO and the rosin ester was investigated by thermal analyses with differential scanning calorimetry (DSC) and thermogravimetric analysis (TGA). The peel, tack, and shear strength of the PSA, three main mechanical properties of PSAs, were varied by modulating the ratio of ESO:DSO:rosin to change the balance between adhesion and cohesion. The adhesion/cohesion balance is very important for PSA to generate an instant wetting of the surface by light pressure and to provide clear removal without residues on the applied surface. Rheological properties of the PSAs were also investigated to demonstrate their viscoelastic properties. In addition, thermal properties were studied for particular applications that demand thermal stability, such as electronics.

A. Materials and Methods

1. Plant Oil, Rosin, and Catalyst

Epoxidized soybean oil (ESO) was purchased from Scientific Polymer Products, Inc. (Ontario, N.Y.). PC-2506 ([4-(2-hydroxy-1-tetradecyloxy)-phenyl]phenyliodonium hexafluoroantimonate; Polyset company, Mechanicville, N.Y.), and Sylvalite (Arizona Chemical, Jacksonville, Fla.) were kindly provided.

2. Epoxidized Methyl Oleate.

9,10-Epoxidized methyl oleate (EMO) was prepared following the method generally described above. Briefly, a solution of methyl oleate (4.5 g, 15 mmol) in 100 mL dichloromethane was stirred at 0° C., and a solution of meta-chloroperoxybenzoic acid (7.9 g, 46 mmol) in 50 mL dichloromethane was added gently. After completion, the temperature was raised to room temperature and the mixture was stirred for another 18 h. After the work-up and purification, 9,10-epoxy methyl oleate was obtained as a clear oil in 87% yield. $^1$H NMR (CDCl$_3$, 500 Mhz): δ 3.61 (s, 3H), 2.84 (m, 2H), 2.25 (t, J=7.5 Hz, 2H), 1.57 (m, 2H), 1.50-1.17 (m, 24H), 0.83 (t, J=7.6 Hz, 3H).

3. Mono-$^{18}$O-Labeled Dihydroxyl Methyl Oleate.

EMO (0.30 g, 0.96 mmol) was stirred with 0.15 mL perchloric acid in 15 mL THF/O$^{18}$ water (3/2) for 20 h. Subsequently, 15 mL diethyl ether was added, and the aqueous layer was removed in a separatory funnel. The organic layer was then washed with 2×150 mL saturated sodium bicarbonate, dried over anhydrous magnesium sulfate, and filtered. After the solvent was removed with a rotary evaporator, the crude material was purified by column chromatography (silica; hexane/ethyl acetate 99:1 to 80:20 gradient) and dried under high vacuum to obtain a white powder at 80% yield. $^1$H NMR (CDCl$_3$, 500 Mhz): δ 3.66 (s, 3H), 3.39 (m, 2H), 2.29 (t, J=7.5 Hz, 2H), 2.1 (bs, 2H), 1.57 (m, 2H), 1.55-1.20 (m, 24H), 0.87 (t, J=7.6 Hz, 3H).

4. Model Cationic Reaction for Chemical Analyses.

A mixture of EMO (30 mg, 0.096), DMO (30 mg, 0.091 mmol), glycerol (21 mg, 0.22 mmol), and PC-2506 (0.9 mg, 0.001 mmol) was added to a petri dish, and stirred at an elevated temperature (120° C.), then the mixture in a petri dish was UV scanned (radiation dose: 5.1-5.4 J/cm$^2$).

5. NMR Analyses.

$^1$H NMR and $^1$H-$^1$H COSY NMR spectra for our samples were recorded quantitatively using a Varian S spectrometer (Varian Inc, Palo Alto, Calif.) at observing frequencies of 500 MHz for $^1$H on a 5 mm triple resonance probe. The sample solutions were prepared in CDCl$_3$. $^1$H NMR spectra were obtained with 32 scans at a delay time of 1 s between scans. $^1$H-$^1$H COSY spectra were obtained with 128 increments and 4 scans for each increment. A sine bell function was used during processing for both dimensions

6. ESI-MS.

Electrospray Ionization spectra were acquired on an LCT Premier (Waters Corp., Milford, Mass., USA) time of flight mass spectrometer. The instrument was operated at 10,000 resolution (W mode) with dynamic range enhancement that attenuates large-intensity signals. The cone voltage was 60 eV. Spectra were acquired at 16666 Hz pusher frequency covering the mass range of 100 to 1200 u and accumulating data for 2 s per cycle. Mass correction for exact mass determinations was made automatically with the lock mass feature in the MassLynx data system. A reference compound in an auxiliary sprayer was sampled every third cycle by toggling a "shutter" between the analysis and reference needles. The reference mass was used for a linear mass correction of the analytical cycles. Samples were presented in acetonitrile as a 20 ul loop injection using an autoinjector (LC PAL, CTC Analytics AG, Zwingen, Switzerland).

7. Dihydroxylated Soybean Oil (DSO).

DSO was synthesized as described above. Briefly, ESO (20 g, 20 mmol) was stirred in 500 mL THF/water (300 mL:200 mL) with 1% (v/v) of perchloric acid for 20 h at room temperature. Subsequently, the organic layer was extracted after several work-ups with water and saturated sodium bicarbonate. After the solvent was removed, sticky clear oil was obtained in 84% yield (colorless oil). $^1$H NMR (CDCl$_3$, 500 MHz): δ5.23 (m, 1H), 4.26 (m, 2H), 4.11 (dd, J=11.7 Hz, J=6.2 Hz, 2H), a total of hydroxyl multiplets were found at 4.20, 3.99, 3.91, 3.71, 3.57, 3.43, 3.34; the combined integral was approximately 10H, 2.25 (t, J=7.5 Hz, 2H), 1.68-1.17 (m, approx. 46.5H), 0.86 (m, 9H).

8. PSA Via UV System.

The UV-curable PSAs were prepared at various ratios of ESO, DSO, and rosin ester tackifier to optimize their mechanical strength. ESO and DSO were mixed at w/w ratio of 1:0.5, 1:1, and 1:1.5 respectively, then rosin ester tackifier was added at w/w ratio of 0.1, 0.3, 0.5, 0.7, and 0.9, respectively. The mixture was mixed well while being heated, then a cationic photoinitator such as PC-2506 (Polyset company, Mechanicville, N.Y.) was added and mixed well. The mixtures were spread over a 4.5 cm by 16 cm (75 cm$^2$) substrate on a PET film (200 gauge, adhesive-treated side) using a glass rod. An appropriate amount (1 g) of the films were passed three times at 7 ft/min of conveyor speed rate (radiation dose, each pass: 1.7-1.8 J/cm$^2$) through the UV system: F300S[1.8 kW, 6-inch (300 watt/inch) lamps]-mounted LC6B benchtop conveyor (Fusion UV system, Gaithersburg, Md.). The lamp distance from the conveyor belt was 10 cm.

9. Peel, Tack, and Shear Strength of ESO/DSO/Rosin Ester PSAs.

The 90° peel, loop tack, and shear adhesion were tested based on ASTM D6195-03, D3330/D3330M-04, and D3654/D3654M-06, respectively. The glass specimen was placed on a fixture clamped to the moving steel panel of the peel adhesion tester (Vertical Motorized Test Stand, MV-110-S). The non-adhesive-coated end of each strip was doubled back at a 90° angle and clamped into the moving jaw to ensure a peel angle of 90° during peel testing. The speed of the moving jaw for the peel test was 5.0±0.2 mm/s. A strip of tape was applied to a glass panel for all tests using 2 passes of a 2 kg steel roller. Loop tack and static shear test specimens were adhered to a 2.54 cm by 2.54 cm portion. For the shear strength, a 1 kg weight was hung at end of the tape and the failure time in minutes was recorded.

10. Viscoelasticity.

The viscoelasticity was measured by a Bohlin CVOR 150 rheometer (Malvern Instruments, Southborough, Mass.) with a PP 8 (parallel plate) at room temperature. The mixtures of ESO/DSO/rosin ester was filled in a round mold (1 mm thin, 1 cm diameter) and passed through the UV system. Frequency sweep of the specimen was measured from 0.01 to 100 rad/s.

11. Thermal Properties of PSA.

Thermal properties were obtained using TA DSC Q200 (New Castle, Del.) and Perkin-Elmer Pyris1 TGA (Norwalk, Conn.). DSC and TGA were obtained from the PSA sample at 1:1:0.7 w/w ratio of ESO:DSO:rosin ester. Thermal transitions ($T_g$, $T_g$ and $T_m$) were obtained with a TA DSC Q200 instrument. About 5 mg of the ESO PSA film sample was sealed in a hermetic pan. The sample was heated from −80 to 200° C. at a rate of 10° C./min. Decomposition characteristics were determined with a Perkin-Elmer Pyris1 TGA (Norwalk, Conn.). About 5 mg of each sample was placed in the pan and heated from 20 to 700° C. at a heating rate of 20° C./min under a nitrogen atmosphere.

B. Results and Discussion

As a preliminary study, various ratios (1:0.1-0.9) of ESO and the rosin ester (Sylvalite, Arizona Chemical, Jacksonville, Fla.) were mixed, then UV-cured with a total UV dose of 5.1-5.4 J/cm$^2$. Peel strength was measured subsequently; however, the PSA derived from a mixture of ESO and Sylvalite was too stiff and brittle, causing a rupture of the matrix during the PSA's peel test. As a result, residues remained on the applied surface (glass plate) after the tapes were removed. PSAs were also formulated using DSO tackifier.

Figure 26:
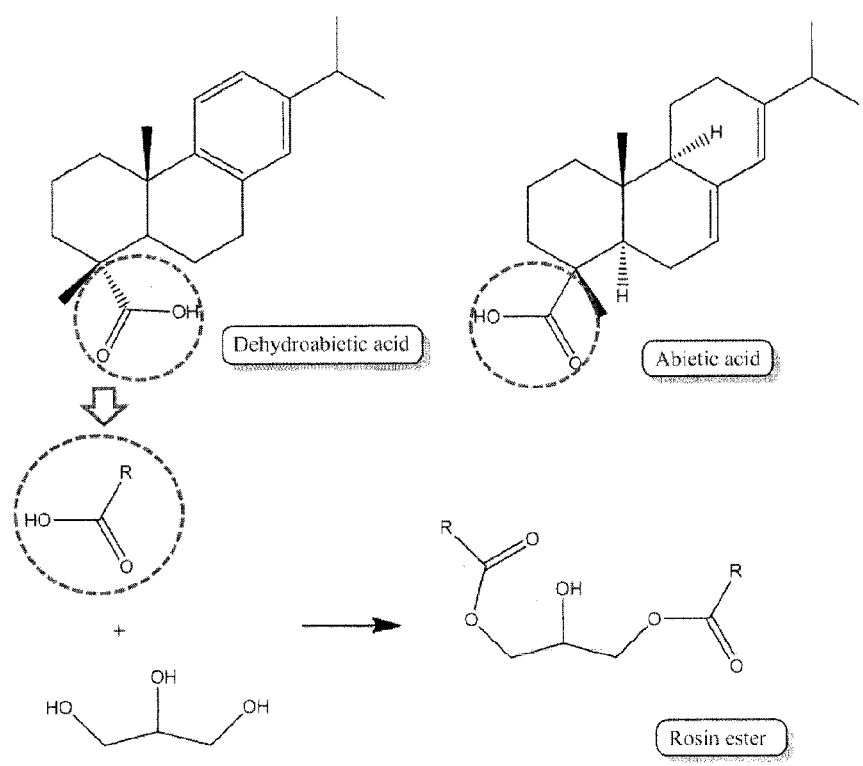
FIG. 26 is a general reaction scheme for rosin acids (abietic acid and dehydroabietic acid) and their esterification pathway with glycerol for a rosin ester synthesis from Example 42.

Rosin esters can be used as a tackifier. Rosin contains 85-95% of rosin acids such as abietic acid and dehydroabietic acid, and the rosin acids are esterified with various alcohols such as glycerol or pentaerythritol to form a rosin ester for applications in food additives, PSA tackifiers, and so forth (FIG. 26—the scheme shows only di-, but mono- or tri-ester is also available via the same reaction mechanism).

To shed light on chemical pathways and incorporation between epoxides of ESO and alcohols in DSO or in a partially hydrogenated rosin ester during the photoinitiated cationic polymerization, we conducted $^1$H NMR, 2D $^1$H-$^1$H COSY NMR, and ESI-MS with model compounds to avoid the complexity of large molecules. Epoxidized methyl oleate (EMO) and dihydroxyl methyl oleate (DMO) proved an excellent model system to monitor the reactions of ESO and DSO, respectively. In particular, the mono-$^{18}$O-labeled DMO allowed us to distinguish the cross-coupling between epoxide and diol from the homocoupling of epoxide itself in ESI-MS. In addition, pure glycerol was easier to monitor in the partially unesterifed alcohols in rosin esters than Sylvalite, which is a mixture of partially hydrogenated rosin esters. Therefore, we used EMO, mono-$^{18}$O-labeled DMO, and glycerol as a model compound of, respectively, ESO, DSO, and the rosin ester for NMR and ESI-MS analyses.

Figure 27:
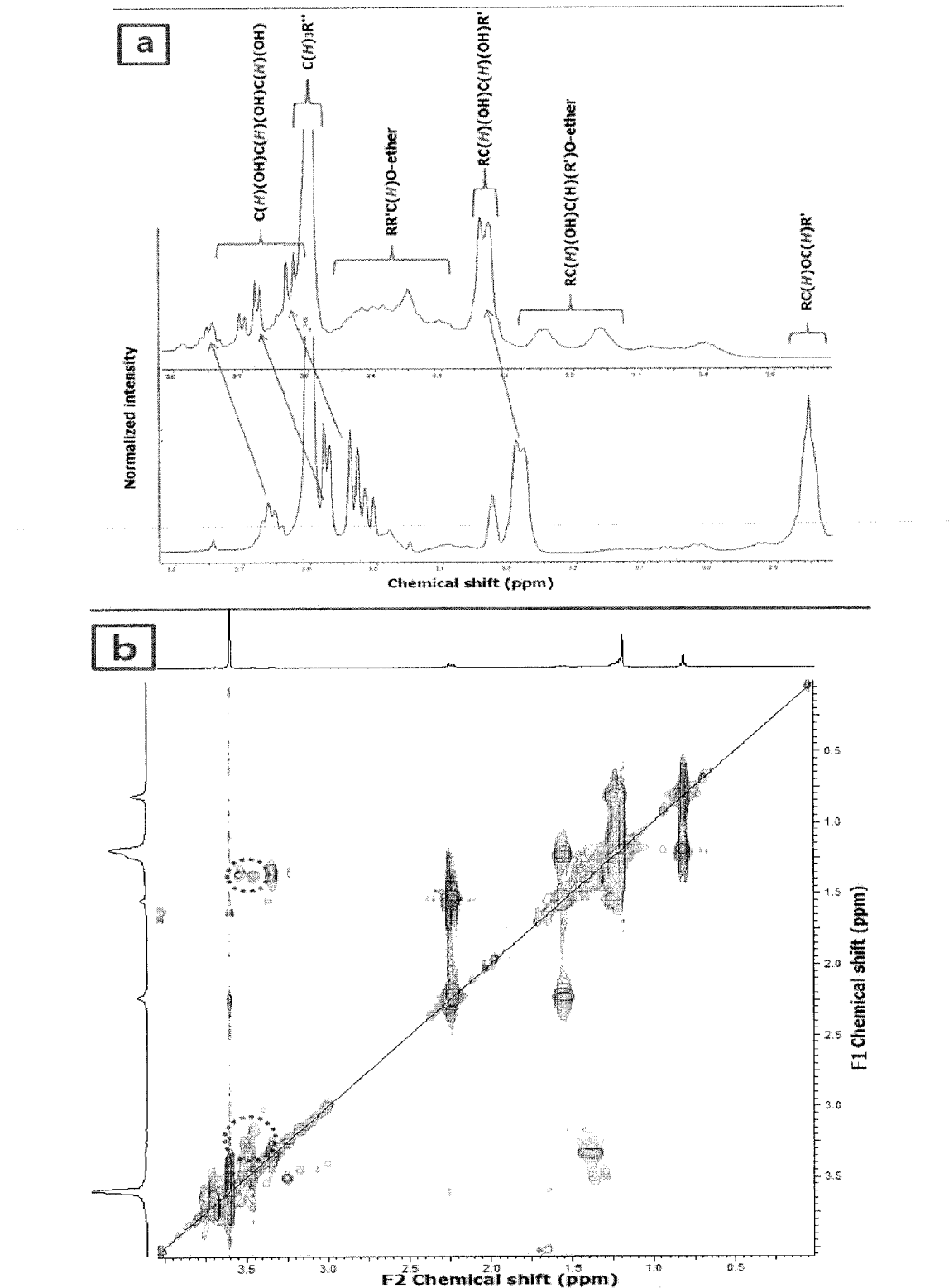
FIG. 27a is a graph of $^1$H NMR of the mixture of EMO/$^{18}$O-labeled DMO/glycerol and the mixture after UV radiation in Example 42.
FIG. 27b is a graph of $^1$H-$^1$H COSY NMR of the mixture in Example 42 after UV radiation.

$^1$H NMR of the mixture of EMO/mono-$^{18}$O-labeled DMO/glycerol after UV radiation has clearly showed the disappearance of the epoxide signal at δ 2.85, and appearance of a broad signal of ether crosslinks at δ 3.41-3.59 (FIG. 27a). In addition, 2D $^1$H-$^1$H COSY NMR of the mixture after UV radiation revealed ether cross peaks between RR'C(H)O-ether at δ 3.42-3.52 and the vicinity RC(H)(OH)C(H)(R')O-ether at δ 3.12-3.28, and ether cross peaks between RC(H)O-ether at δ 3.42-3.52 and vicinity C(H)$_2$R' at δ 1.35 (FIG. 27b). The NMR results demonstrate that cationic polymerization occurred via exposure of UV radiation (645-693 mJ/cm$^2$). In the NMR spectra, the alcohols in glycerol and diols in DMO chemically shifted to smaller values compared with the starting mixture of EMO/mono-$^{18}$O-labeled DMO/glycerol, which is thought to be a result of alcoholysis between EMO and glycerol.

Figure 28:
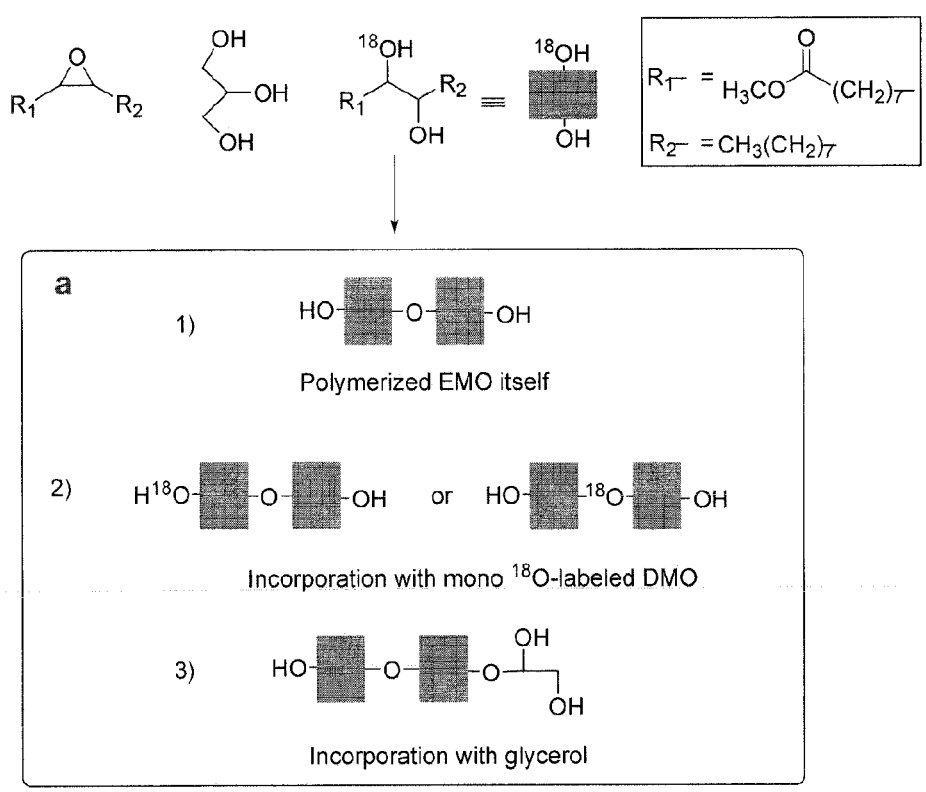
FIG. 28a shows proposed structures of the dimers from photoinitiated cationic polymerization of EMO/$^{18}$O-labeled DMO/glycerol.
FIG. 28b shows the products from UV cationic reaction of EMO/DMO/glycerol confirmed by ESI-MS in positive mode.
Figure 28:
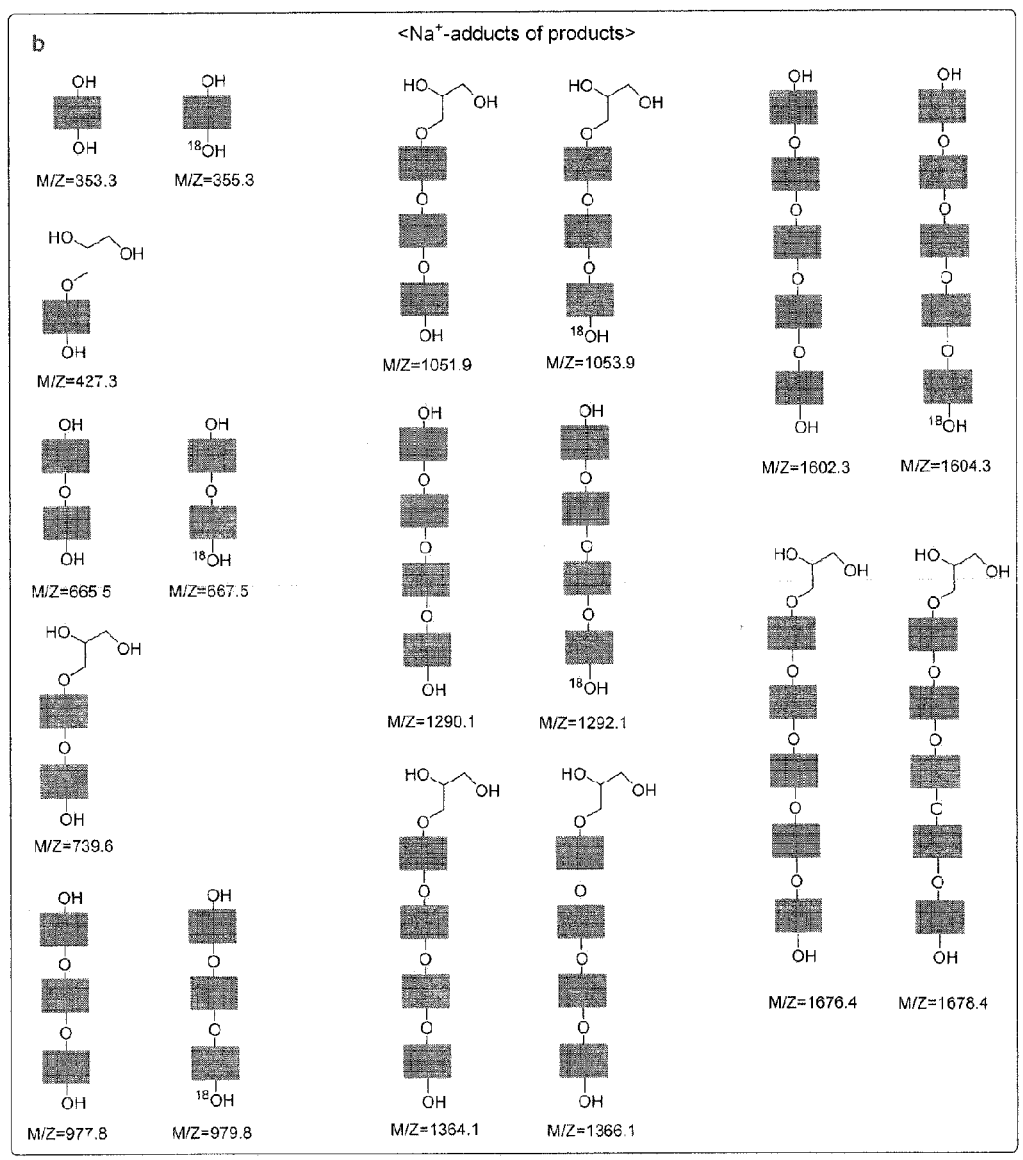

ESI-MS was conducted to elucidate the chemical incorporation between components during the cationic polymerization because the homocoupling of 1) EMO itself should have different molecular weight from the cross-coupling with 2) mono-$^{18}$O-labeled DMO, or 3) glycerol (FIG. 28). As a result, the alcoholysis (cross-coupling) between the EMO and DMO (or glycerol) clearly has been shown in ESI-MS analysis (FIG. 28).

Figure 29:
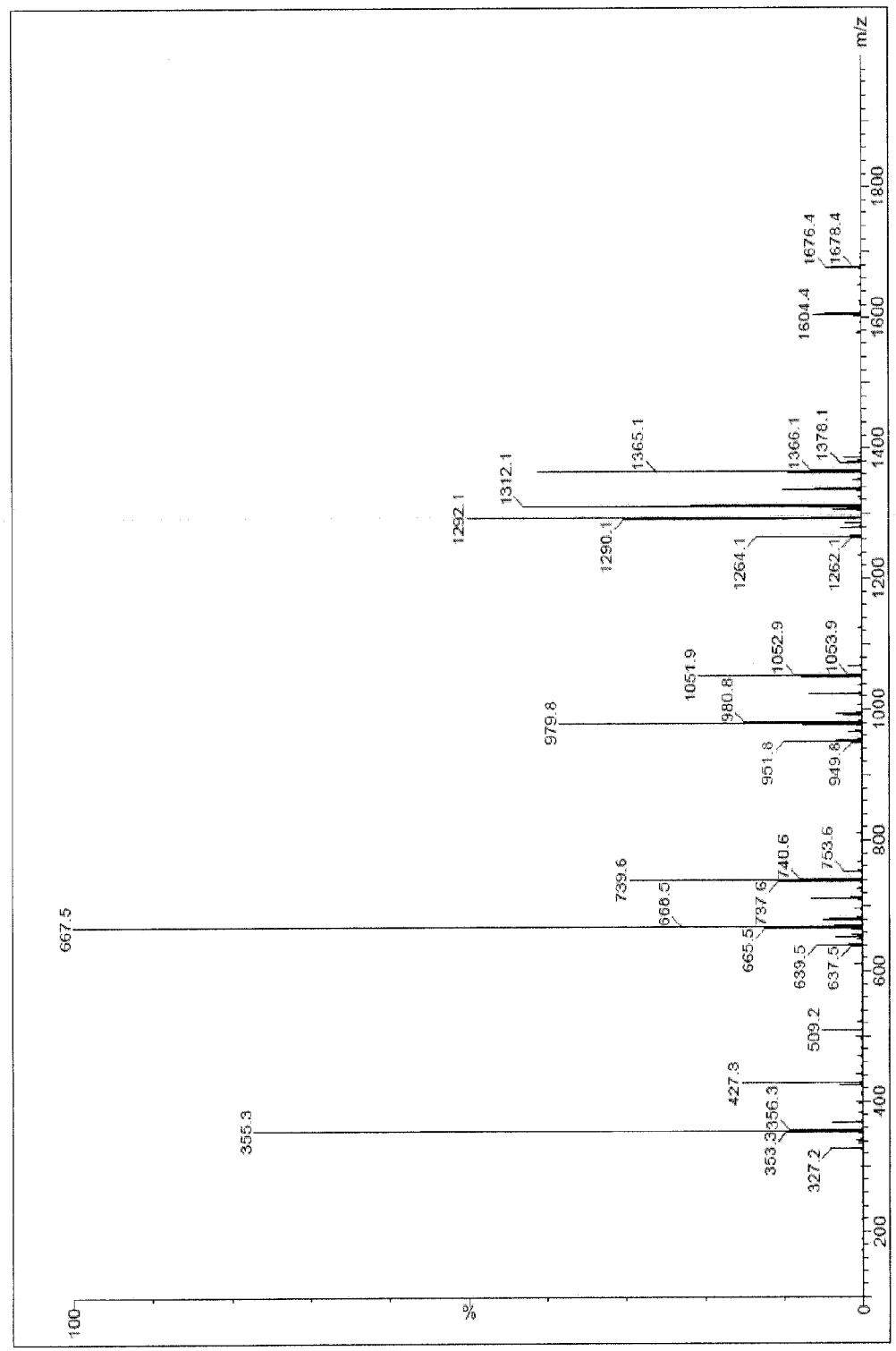
FIG. 29 is a graph of the ESI-MS of the products from UV cationic reaction of EMO/DMO/glycerol in Example 42.

ESI-MS in positive mode (FIG. 29) distinctively presented 1) the homocoupling of EMO itself, 2) the cross-coupling between EMO and mono-$^{18}$O-labeled DMO, and 3) the cross-coupling between EMO and glycerol (FIG. 28a). Na$^+$-adducts of dimers from 1) the homocoupling of two EMO was shown at m/z=665.5 (M$^+$), whereas Na$^+$-adducts of dimers from 2) the cross-coupling between EMO and mono-$^{18}$O-labeled DMO was shown at m/z=667.5 (M$^{+2}$) (FIG. 29). In addition, Na$^+$-adducts dimers from 3) the cross-coupling between epoxide and glycerol was shown at m/z=427.3 (FIG. 29). All the major peaks in positive mode of the ESI-MS (FIG. 29) were assigned from monomer to hexamer and are presented in FIG. 28b. This ESI-MS analysis demonstrated the incorporation between the epoxides and the alcohols during the cationic polymerization, which account for the possible covalent bonds between ESO and DSO (or rosin ester). In addition to NMR and ESI-MS analyses, the study of thermal properties of the UV-cured PSA from ESO/DSO/Sylvlite and Sylvalite itself (which are described later in this manuscript) demonstrated the incorporation between ESO and the rosin ester (Sylvalite).

Figure 30:
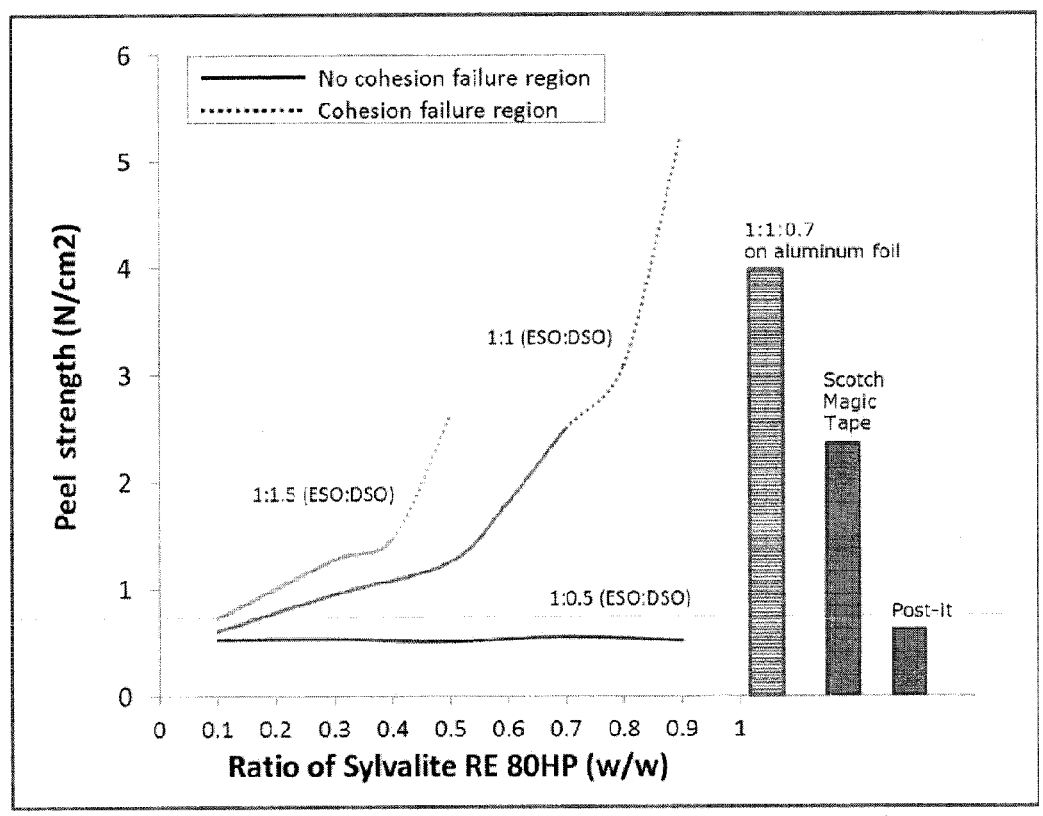
FIG. 30 is a graph of the 90° peel strength of the PSAs at various w/w ratio of ESO:DSO:the rosin ester compared with Scotch® Magic Tape.

The UV-curable PSAs were prepared by mixing various ratios of ESO, DSO, and/or rosin ester tackifier (Sylvalite, Ariz. Chemical, Jacksonville, Fla.) to optimize their PSA properties. The PSA properties include peel, tack, and shear strengths while maintaining a balance of cohesion/adhesion; in other words, an appropriate viscoelasticity. The 90° peel strength results displayed that an ideal ratio between ESO and DSO is 1:1 w/w for a PSA and demonstrated that increasing the amount of rosin ester accelerated the peel strength of the tapes (FIG. 30). However, the PSAs with a higher w/w ratio than 0.7 of rosin ester demonstrated cohesion failure by leaving sticky residues on the applied surfaces (glass) although the PSA at the w/w ratio of 1:1:0.9 (ESO/DSO/Sylvalite) recorded 2.4 times stronger peel strength than the Scotch® Magic Tape (3M, St. Paul, Minn.) and was 10.4 times stronger than the Post-it® (3M, St. Paul, Minn.). Therefore, the preferred w/w ratio of the mixture of ESO, DSO, and Sylvalite rosin ester in this study was 1:1:0.7 for general PSA applications that require a clear removal when they are detached from an applied surface. In addition, the PSA at the ratio 1:1:0.7 (ESO/DSO/Sylvalite) with an aluminum substrate showed about 1.7 times stronger peel strength than the PSA with a plastic substrate and the Scotch® Magic Tape without cohesion failure. This excellent result could be due to either a molecular attraction between hydroxyl groups in the PSA matrix and metal atoms of the aluminum foil or to eliminating resistance of the plastic substrate against a 90° bend because the aluminum substrate was much softer and thinner than the plastic substrate. The result could also be due to a combination of both phenomena. Preferred ratios for other oils and tackifiers will vary.

Figure 31:
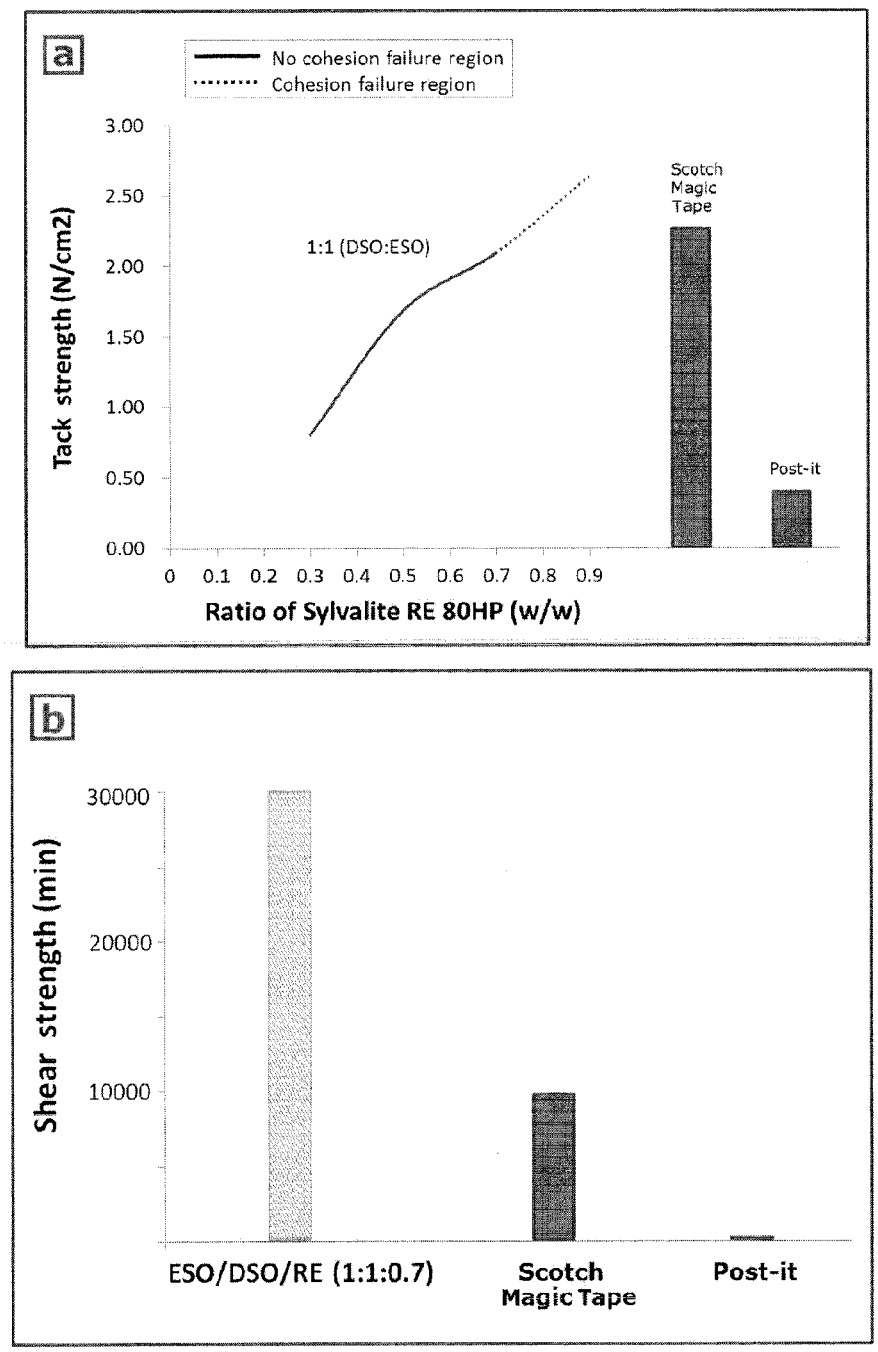
FIG. 31a is a graph of the loop tack strength of the PSAs at 1:1 w/w ratio of ESO:DSO with various w/w ratios (from 0.3 to 0.9) of the rosin ester compared with Scotch® Magic Tape.
FIG. 31b is a graph of the shear strength of the PSAs at 1:1:0.7 w/w ratio of ESO:DSO:rosin ester compared with compared with Scotch® tape and Post-it® notes.

In the loop tack test, we selected the 1:1 w/w ratio of ESO:DSO based on the peel properties. Loop tack properties were monitored by modulating the amount of Sylvalite (FIG. 31a). The loop tack strength of the PSA showed similar strength to the Scotch® tape at the ratio of 1:1:0.7 (ESO/DSO/Sylvalite) without a cohesion failure, which corresponded to the peel test results.

Further, we chose the PSA at the w/w ratio at 1:1:0.7 of ESO/DSO/Sylvalite based on the peel and tack test results to compare shear strength to the commercial PSA tapes. The shear strength of the ESO/DSO/Sylvarite PSA tape at the w/w ratio at 1:1:0.7 of ESO/DSO/Sylvalite was at least 3 times stronger than the Scotch® tape and 30000 times stronger than the Post-it®. For shear strength, the specimens of tape were attached to a glass plate and a 1 kg weight was hung on the end of each of the tapes. The ESO/DSO/Sylvarite PSA tape hung until the end of experiment, for 3 weeks, and could be hung longer than three weeks (+30000 minute) (FIG. 31b). On the other hand, the Scotch® tape and Post-it® failed in 1 week (10000 min) and 1 min, respectively (FIG. 31b).

Figure 32:
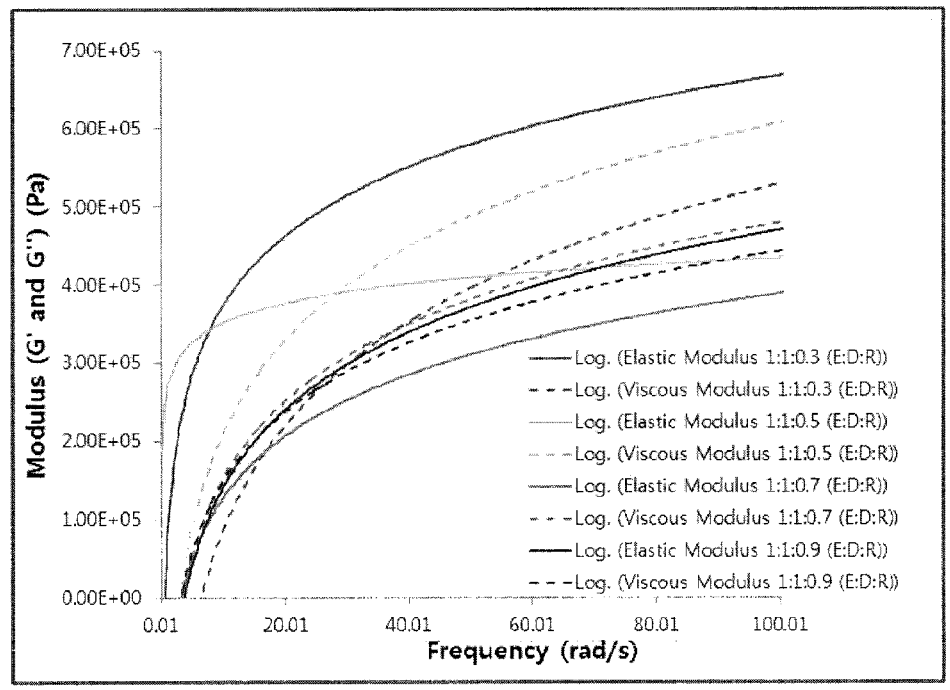
FIG. 32 is a graph of the storage modulus (elastic modulus, G') and loss modulus (viscous modulus, G") as a function of frequency sweep (rad/s) in Example 42.

For general-purpose PSA applications, the instantaneous wetting of a substrate under light pressure followed by measurable adhesion to an applied surface (viscosity) should leave no residue on the applied surface (elasticity). Low adhesion indicates higher storage modulus (elastic modulus) in PSAs. On the other hand, a higher adhesion was achieved with higher loss modulus (viscous modulus) in PSAs, but cohesion failure may occur Therefore, the resin has to have an appropriate viscoelasticity to balance between cohesion and adhesion strength for PSA application. The ratio of 1:1:0.7 (ESO:DSO:rosin ester) had a steady tendency with an appropriate distance between elastic modulus (cohesion) and viscous modulus (viscosity) at frequency sweep from 0.01 rad/s to 100.01 rad/s (FIG. 32). However, the ratio of 1:1:0.3 (ESO:DSO:rosin ester) showed a large gap between elastic modulus (G') and viscous modulus (G"), which led to low adhesion properties, but a narrow gap between viscous modulus and elastic modulus of the ratio of 1:1:0.9 caused cohesion failure. Meanwhile, the ratio of 1:1:0.5 displayed non-steady tendency of the frequency sweep; that is, the viscous and elastic modulus reversed after 30 rad/s.

Figure 33:
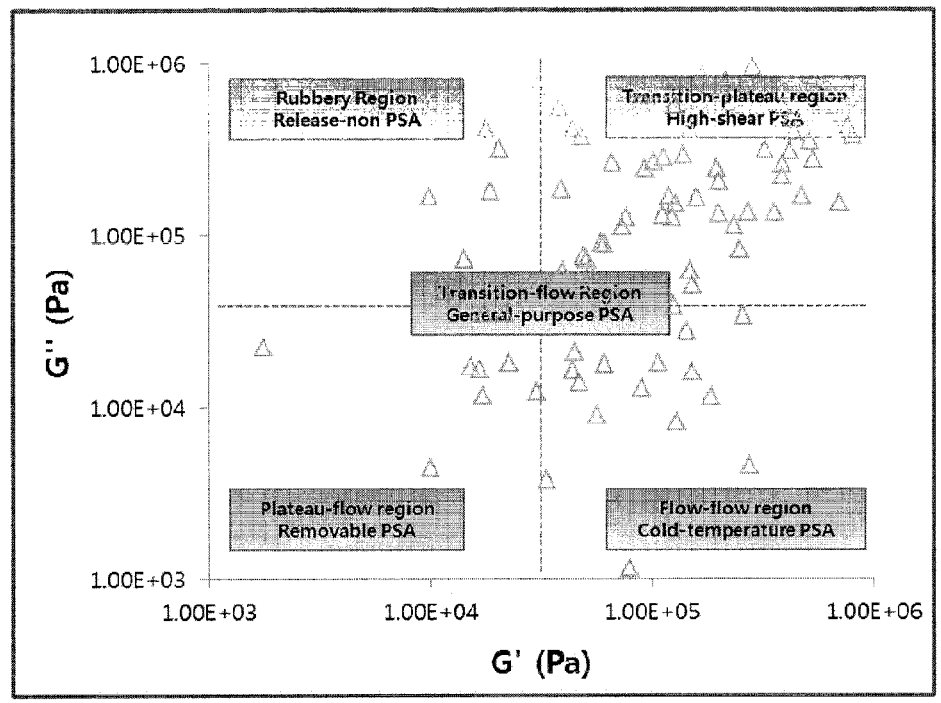
FIG. 33 is a graph of the viscoelastic windows of PSAs based on their rheology at 1:1:0.7 w/w ratio of ESO:DSO:rosin ester in Example 42.

Previous studies on the rheology of PSAs have demonstrated the viscoelastic windows (FIG. 33) of PSAs categorized as different regions. The PSA prepared with the ratio of 1:1:0.7 (ESO:DSO:rosin ester) fell in the window belonging to the region between general-purpose PSA and high-shear PSA.

The rheological behaviors (FIG. 32 and FIG. 33) of the PSAs corresponded to mechanical properties of peel, tack, and shear strength (FIG. 30 and FIG. 31), which showed that the ratio of 1:1:0.7 (ESO:DSO:rosin ester) had comparable peel and tack strengths to the commercial PSA tapes and a better shear strength than the commercial PSA tapes.

Figure 34:
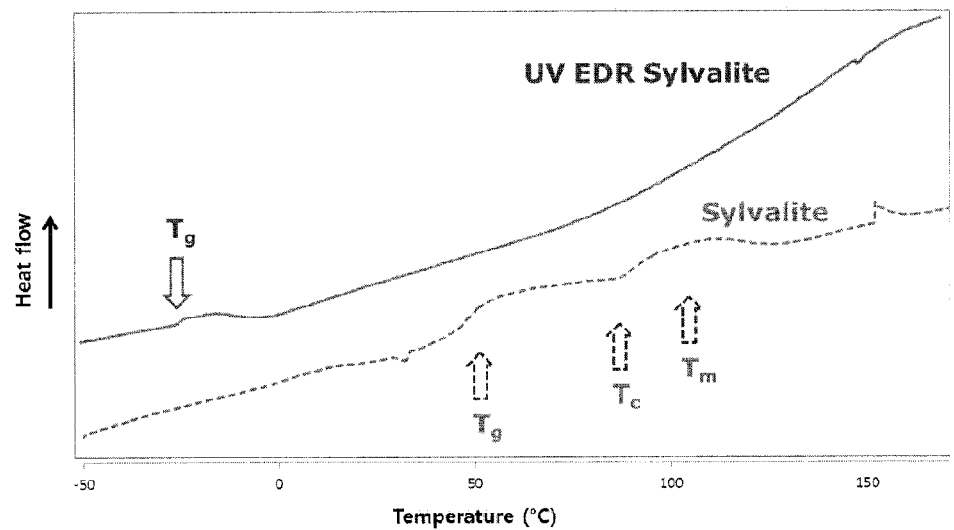
FIG. 34 is a graph of the DSC of the UV-cured PSA at 1:1:0.7 w/w ratio of ESO:DSO:rosin ester in Example 42.

In the DSC (FIG. 34), Sylvalite itself presented glass transition temperature ($T_g$) at 55° C. and melting point ($T_m$) around 90-120° C. Arizona Chemical describes the softening point of Sylvalite as 77-83° C., which could explain the exotherm at 75-90° C. as crystallization temperature ($T_c$) in the DSC graph of the Sylvalite. On the other hand, the DSC of the UV-cured ESO/DSO/rosin ester PSA (UV EDR Sylvalite) indicated $T_g$ around −25° C. and detected no $T_m$ up to 170° C.; instead, there was a long rubbery region (viscoelaticity of PSA) from −10° C. to 150° C. This demonstrated that the PSA could perform between −10° C. and 150° C. with an excellent thermal stability compared with most commercial PSAs ($T_m$ around 100-165° C.).

Figure 35:
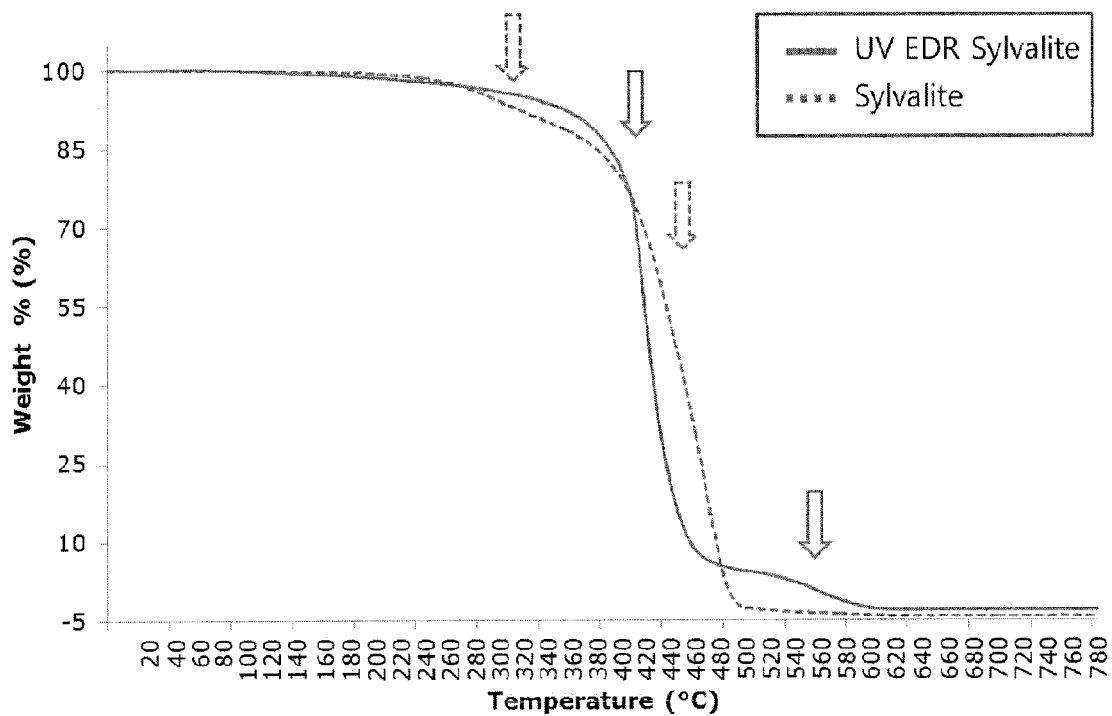
FIG. 35 is a graph of the TGA of the UV-cured PSA at 1:1:0.7 w/w ratio of ESO:DSO:rosin ester in Example 42.

The TGA (FIG. 35) of the PSA indicated a major weight loss (thermal degradation) at 420° C., a minor weight loss at 550° C., and a complete thermal degradation at 600° C., whereas the TGA of Sylvalite presented major weight loss at 480° C., minor weight loss at 300° C., and thermal degradation at 490° C.

These significantly different DSC and TGA patterns between the PSA and Sylvalite demonstrated that the rosin ester (Sylvalite) was covalently incorporated into polymeric matrix as a copolymer block so that any thermal properties of Sylvalite alone were not detected in the PSA matrix.

C. Conclusion

Figure 36:
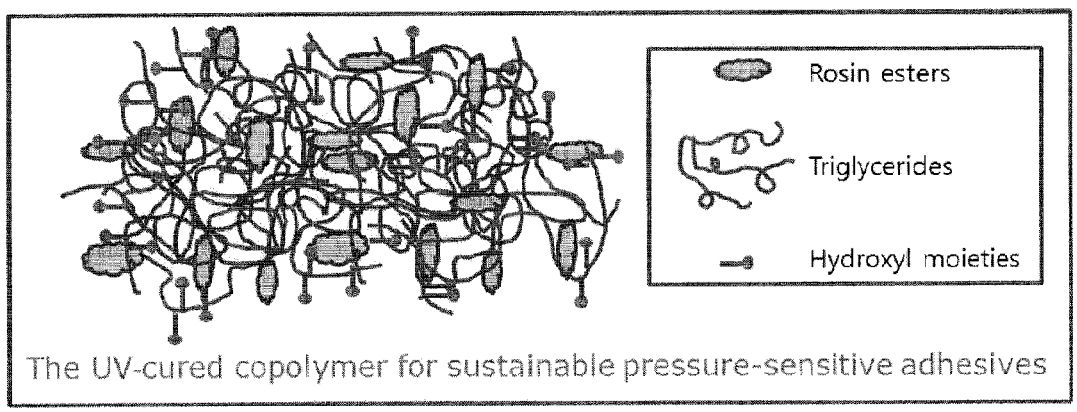
FIG. 36 is schematic illustration of the copolymer matrix of the inventive UV-cured PSAs from Example 42.

We designed and synthesized a sustainable PSA with 97% bio-contents derived from ESO, DSO, and rosin ester via solvent-free UV-initiated cationic polymerization. The chemical pathways of the copolymerization of the renewable feedstocks (ESO/DSO/rosin ester) have been demonstrated using model compounds of EMO, mono-$^{18}$O-labeled DMO, and glycerol with aid of $^1$H NMR, $^1$H-$^1$H COSY NMR, and ESI-MS. In addition, the DSC and TGA results of the PSA showed completely different thermal properties from the rosin ester (Sylvalite) itself, which demonstrated a covalent incorporation of the rosin ester as a copolymer block in the polymeric matrix. Based on the chemical and thermal analyses, the PSA's structure was proposed as ether crosslinked triglycerides functionalized with diols and rosin esters (FIG. 36). In addition, the PSA with an optimized w/w ratio of 1:1:0.7 of ESO:DSO:rosin ester with 3 w/w % of photoinitiator (PC-2506) showed excellent peel and tack properties that were similar to commercial PSA tape such as Scotch® Magic Tape (3M, St. Paul, Minn.), and it recorded significantly stronger shear strength than the commercial PSA tapes. In addition, the PSA tape with an aluminum substrate showed much stronger peel strength than the commercial PSA tapes. DSC and TGA demonstrated its excellent thermal properties as a PSA. This solvent-free UV-curable PSA displayed great potential for commercial applications with its high performance and sustainability. In addition, its inherent biodegradability and low toxicity promise potential biological applications.

We claim:

1. A composition useful as a pressure sensitive adhesive, coating, or film, said composition comprising a polymer matrix comprising crosslinked plant oil triglyceride polymers having crosslinkages selected from the group consisting of esters, ethers, and combinations thereof, wherein said crosslinked plant oil triglycerides are formed from the copolymerization of:
    an epoxidized plant oil triglyceride and a dihydroxylated plant oil triglyceride; or
    an acrylated epoxidized plant oil triglyceride and a dihydroxylated plant oil triglyceride, and
wherein said composition comprises greater than about 50% by weight plant-based materials, based upon the total solids in the composition taken as 100% by weight.

2. The composition of claim 1, wherein said polymer matrix consists essentially of said crosslinked plant oil triglyceride polymers.

3. The composition of claim 1, wherein said composition is substantially free of petroleum-based ingredients.

4. The composition of claim 1, said composition further comprising a rosin ester.

5. A composition useful for forming a pressure sensitive adhesive, coating, or film, said composition comprising a carrier and a tackifier, wherein said carrier is selected from the group consisting of epoxidized plant oil triglycerides and acrylated epoxidized plant oil triglycerides, and said tackifier is a dihydroxylated plant oil triglyceride, wherein said composition comprises greater than about 50% by weight plant-based materials, based upon the total solids in the composition taken as 100% by weight.

6. The composition of claim 5, said composition further comprising a solvent system, said carrier and tackifier being dispersed in said solvent system, wherein said solvent system is selected from the group consisting of water, alcohols, methyl acetate, tetrahydrofuran, methanechloride, and mixtures thereof.

7. The composition of claim 5, said composition being substantially free of any solvents.

8. The composition of claim 5, wherein said composition comprises a mixture of an epoxidized plant oil triglyceride carrier and a dihydroxylated plant oil triglyceride tackifier.

9. The composition of claim 8, said composition further comprising a rosin ester.

10. The composition of claim 5, wherein said composition comprises a mixture of an acrylated epoxidized plant oil triglyceride carrier and a dihydroxylated plant oil triglyceride tackifier.

11. The composition of claim 10, further comprising a rosin ester.

12. The combination of:
    a substrate having a surface; and
    a layer of an adhesive, coating, or film adjacent said substrate surface, wherein said layer is formed from the composition according to claim 5.

* * * * *